United States Patent [19]

Yoshida

[11] Patent Number: 6,072,597

[45] Date of Patent: *Jun. 6, 2000

[54] COMMUNICATION APPARATUS

[75] Inventor: Takehiro Yoshida, Tokyo, Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/885,661

[22] Filed: Jun. 30, 1997

Related U.S. Application Data

[62] Division of application No. 08/409,053, Mar. 23, 1995, Pat. No. 5,671,270.

[30] Foreign Application Priority Data

| Mar. 24, 1994 | [JP] | Japan | 6-78025 |
| May 12, 1994 | [JP] | Japan | 6-123127 |
| Jun. 21, 1994 | [JP] | Japan | 6-162753 |
| Jun. 21, 1994 | [JP] | Japan | 6-162754 |

[51] Int. Cl.[7] ........................ H04N 1/32
[52] U.S. Cl. ........................ 358/435; 358/436
[58] Field of Search ................ 358/434–436, 358/439–440, 442, 468; 379/93.31, 93.32; H04N 1/32

[56] References Cited

U.S. PATENT DOCUMENTS

| 4,727,429 | 2/1988 | Ueno | 358/405 |
| 4,729,033 | 3/1988 | Yoshida . | |
| 4,785,355 | 11/1988 | Matsumoto | 379/100 |
| 4,814,894 | 3/1989 | Yoshida . | |
| 4,885,755 | 12/1989 | Yoshida . | |
| 5,093,857 | 3/1992 | Yoshida et al. . | |
| 5,128,985 | 7/1992 | Yoshida et al. . | |
| 5,307,179 | 4/1994 | Yoshida . | |
| 5,521,719 | 5/1996 | Yamada | 379/100 |
| 5,585,938 | 12/1996 | Imamura | 358/436 |
| 5,671,270 | 9/1997 | Yoshida | 358/436 |

FOREIGN PATENT DOCUMENTS

| 0487308 | 5/1992 | European Pat. Off. . |
| 2665595 | 2/1992 | France . |
| 2233858 | 1/1991 | United Kingdom . |

OTHER PUBLICATIONS

Pat. Abs. Jp., vol. 17, No. 347 (E–1391) Jun. 30, 1993 (JR–A–05048781).

*Primary Examiner*—Kim Yen Vu
*Attorney, Agent, or Firm*—Fitzpatrick, Cella, Harper & Scinto

[57] ABSTRACT

A facsimile apparatus which can make definite the presence or absence of optional signals such as a password signal (PWD), a sub-address signal (SUB), a selective polling signal (SEP) and the like in communication between transmitting and receiving stations, thereby preventing an erroneous operation.

A digital transmit command signal (DTC) is used to notify a remote station whether a transmit command signal includes the password signal (PWD) and selective polling signal (SEP). A digital command signal (DCS) is used to notify a remote station whether a receive command signal includes the password signal (PWD) and sub-address signal (SUB).

67 Claims, 54 Drawing Sheets

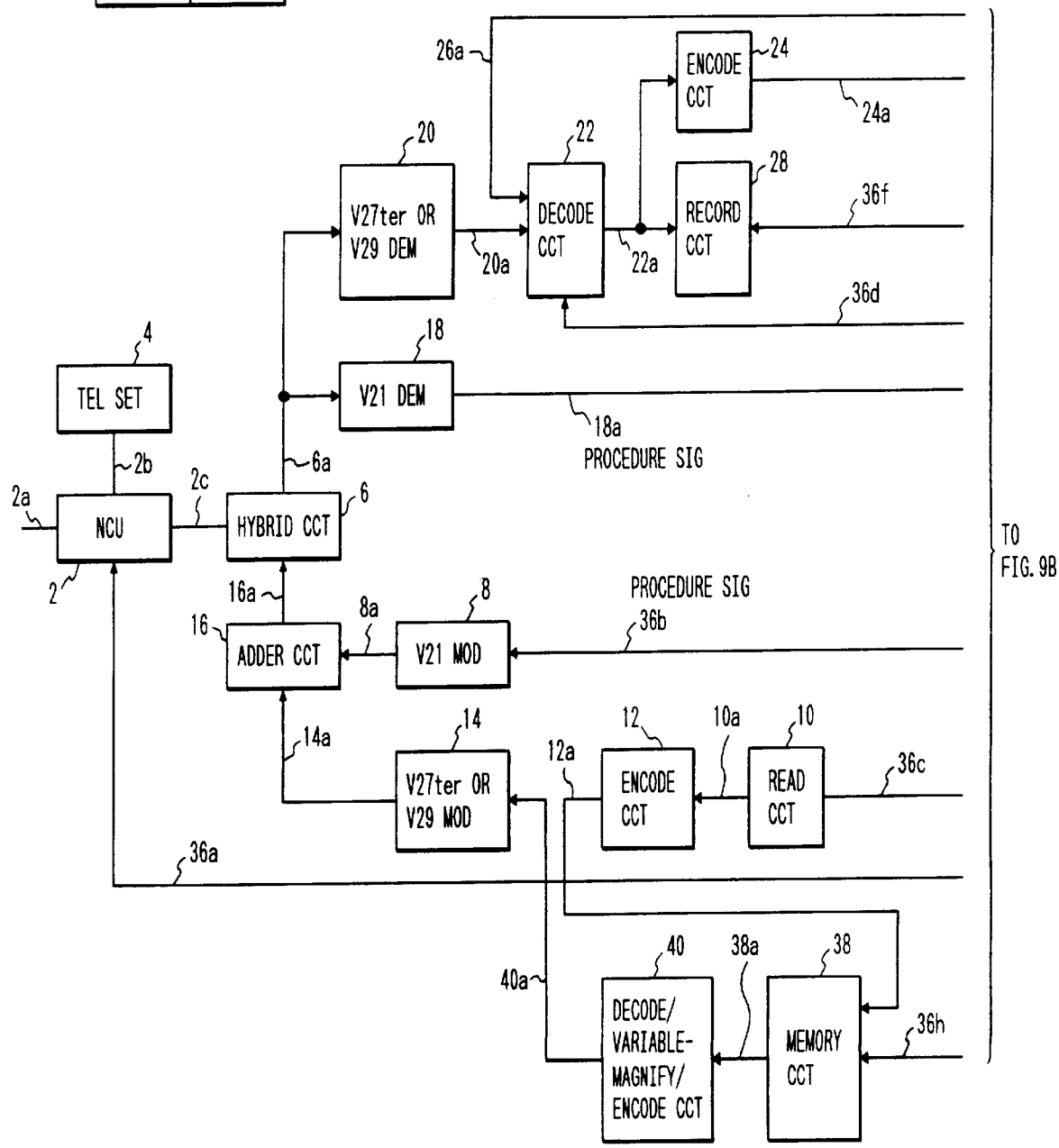

| FIG. 10A |
|---|
| FIG. 10B |

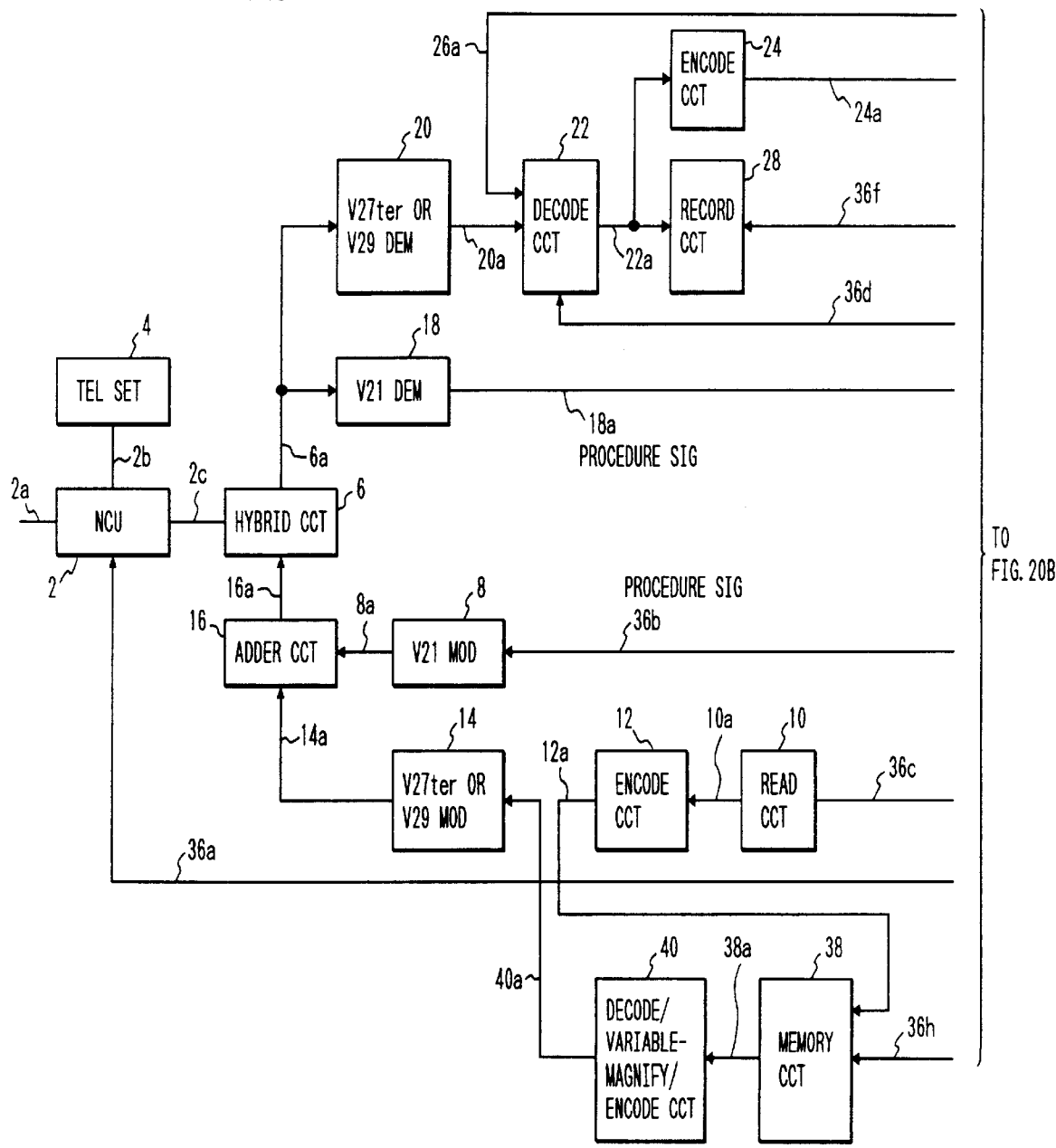

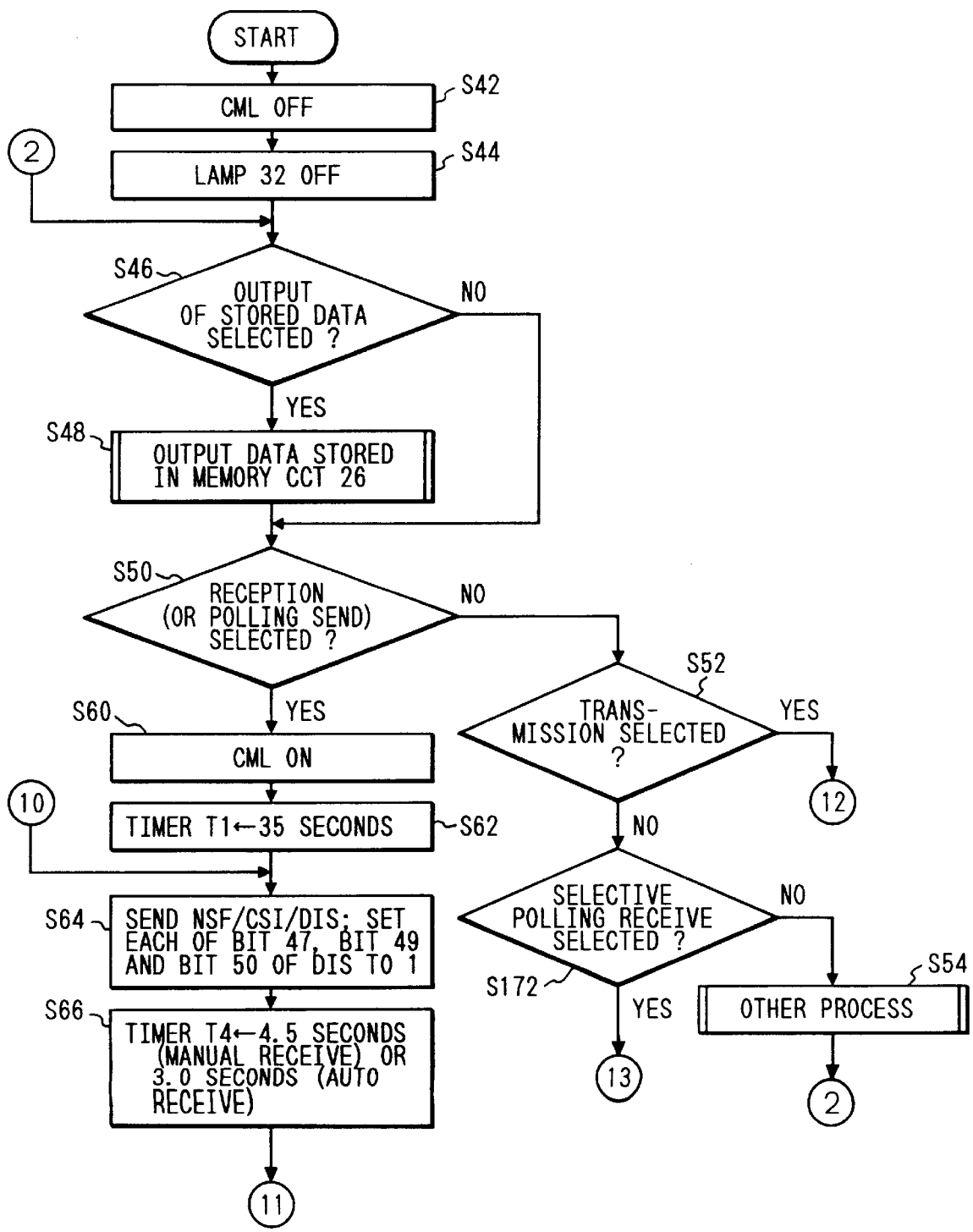

COMMUNICATION APPARATUS

This application is a division of application Ser. No. 08/409,053 filed Mar. 23, 1995, now U.S. Pat. No. 5,671,270.

BACKGROUND OF THE INVENTION

1. Field of the Invention

The present invention relates to transmission of multi-frame in pre-procedure of facsimile.

Also, the present invention relates particularly to a facsimile apparatus having the function of transmitting a sub-address signal, a password signal, and a selective polling signal.

2. Related Background Art

Recently, a sub-address signal (SUB), a password signal (PWD), and a selective polling signal (SEP) have been added as standard signals in ITU-T Additional Recommendations.

In ITU Recommendations, at present, bit 47 in FIF of DIS/DTC is assigned to declaration of the presence or absence of a selective polling capability, bit 49 to declaration of the presence or absence of a sub-address capability, and bit 50 to declaration of the presence or absence of a password capability. In actuality, since the presence or absence of the capabilities can be indicated only by use of bits of DIS, bits 47, 49 and 50 of DTC are all set to "0". As for DCS, bits 47, 49, and 50 thereof are all set to "0".

In the present situation, the following three problems (1)–(3) are involved. The problems will be described with reference to FIGS. 47A to 48B.

(1) In FIG. 47A, first, a receiving station (called side) declares by DIS that it is ready to receive SEP, SUB, and PWD. In response to this, a transmitting station (calling side) sends PWD/SUB/DCS. When the receiving station has only received DCS properly (an error has occurred in transmission of PWD and SUB over a line), it determines that the transmitting station has issued neither PWD nor SUB (FIG. 47B).

Accordingly, the transmitting station sends image data according to transmitted PWD/SUB, while the receiving station performs a receiving process on the assumption that neither PWD nor SUB has been issued. This results in a transmission/reception error between the sending and receiving stations.

(2) In FIG. 48A, first a polling send station (called side) declares by DIS that it is ready to receive SEP, SUB, and PWD. In response to this, a polling receive station (calling side) sends PWD/SEP/DTC. When the polling receive station has only received DTC properly (an error has occurred in transmission of PWD and SEP over a line), it determines that the polling send station has issued neither PWD nor SEP (FIG. 48B).

Accordingly, the polling receive station performs a polling receive for image data according to transmitted PWD/SEP, while the polling send station performs a polling send process on the assumption that neither PWD nor SEP has been issued. This results in a transmission/reception error between the polling receive and send stations.

(3) ITU-T Additional Recommendations has decided to use bits 47, 49, and 50 of DTC for selective polling capability, sub-address capability, and password capability, respectively. However, their usage is not defined.

(4) Furthermore, for example, when a transmitting station sends an NSS signal and a DCS signal to determine a certain mode by the two signals and also when a receiving station receives the DCS signal only, the sending and receiving stations are different in a mode interpreted thereby. This has resulted in a drawback of an erroneous operation. For example, when standard and fine modes are determined by the DCS signal and also when a super fine mode is determined by the NSS signal, the sending and receiving stations are different in a line density interpreted thereby in the above case. This causes a trouble of the recording of an stretched image.

SUMMARY OF THE INVENTION

It is an object of the present invention to improve a communication apparatus.

It is another object of the present invention to provide a communication apparatus utilizing a facsimile procedure capable of effectively preventing an erroneous operation derived from a failure to receive an optional signal.

BRIEF DESCRIPTION OF THE DRAWINGS

FIG. 21 is a flowchart showing operations of the sixth embodiment;

DETAILED DESCRIPTION OF THE PREFERRED EMBODIMENTS

First Embodiment

Figure 1:
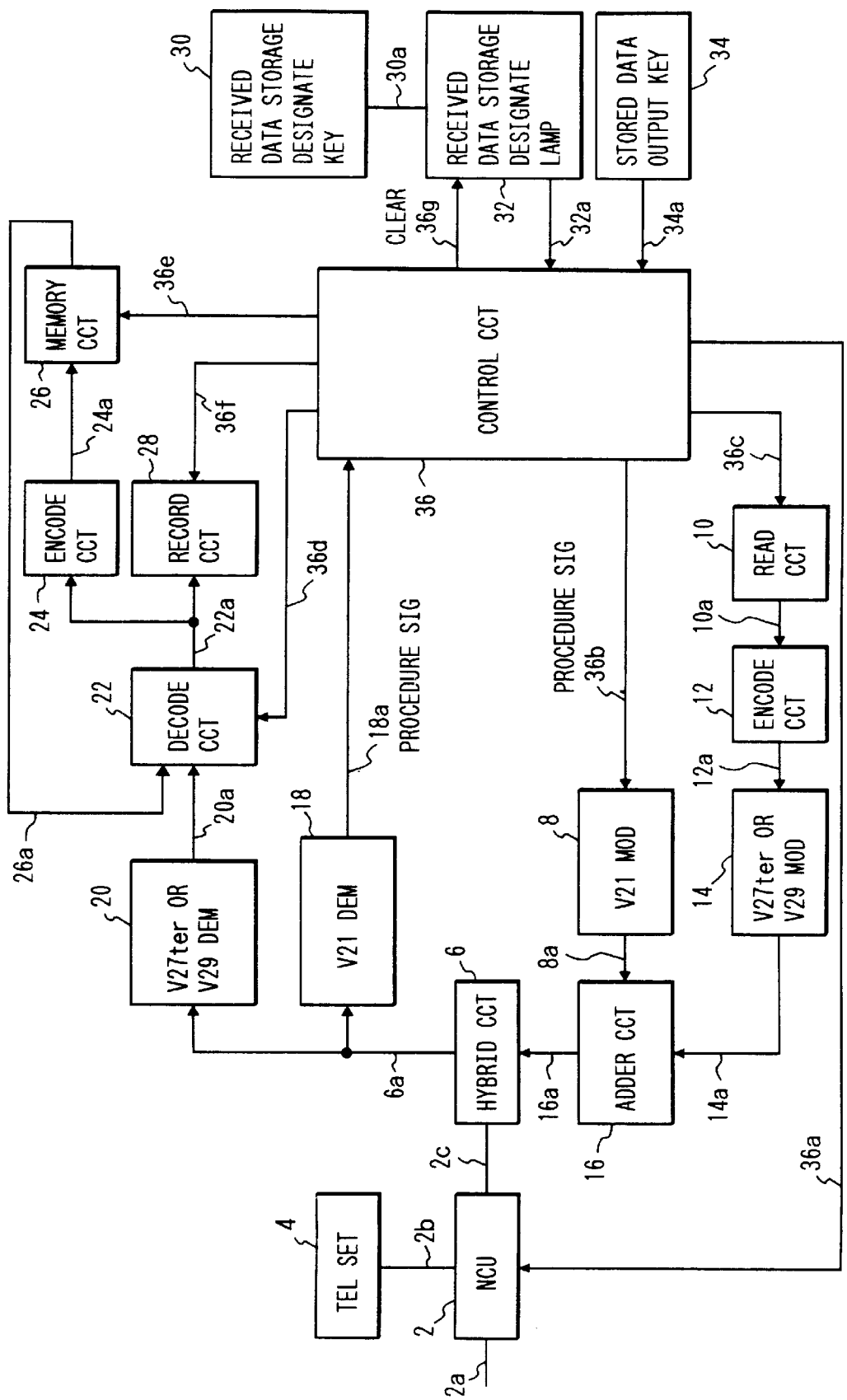
FIG. 1 is a block diagram showing the construction of a facsimile apparatus according to an embodiment of the present invention.
Figure 2:
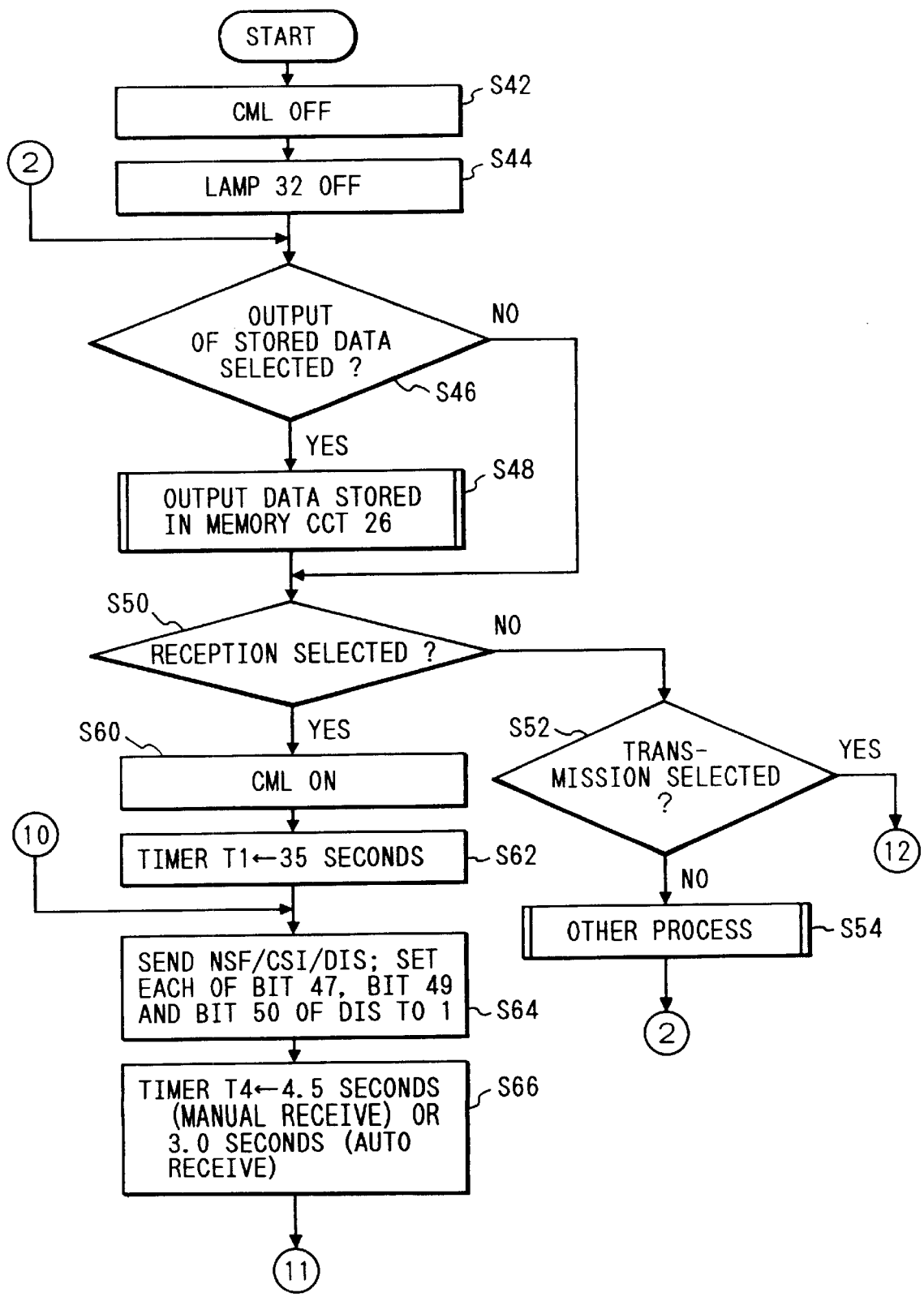
FIG. 2 is a flowchart showing operations of a first embodiment of the present invention.
Figure 3:
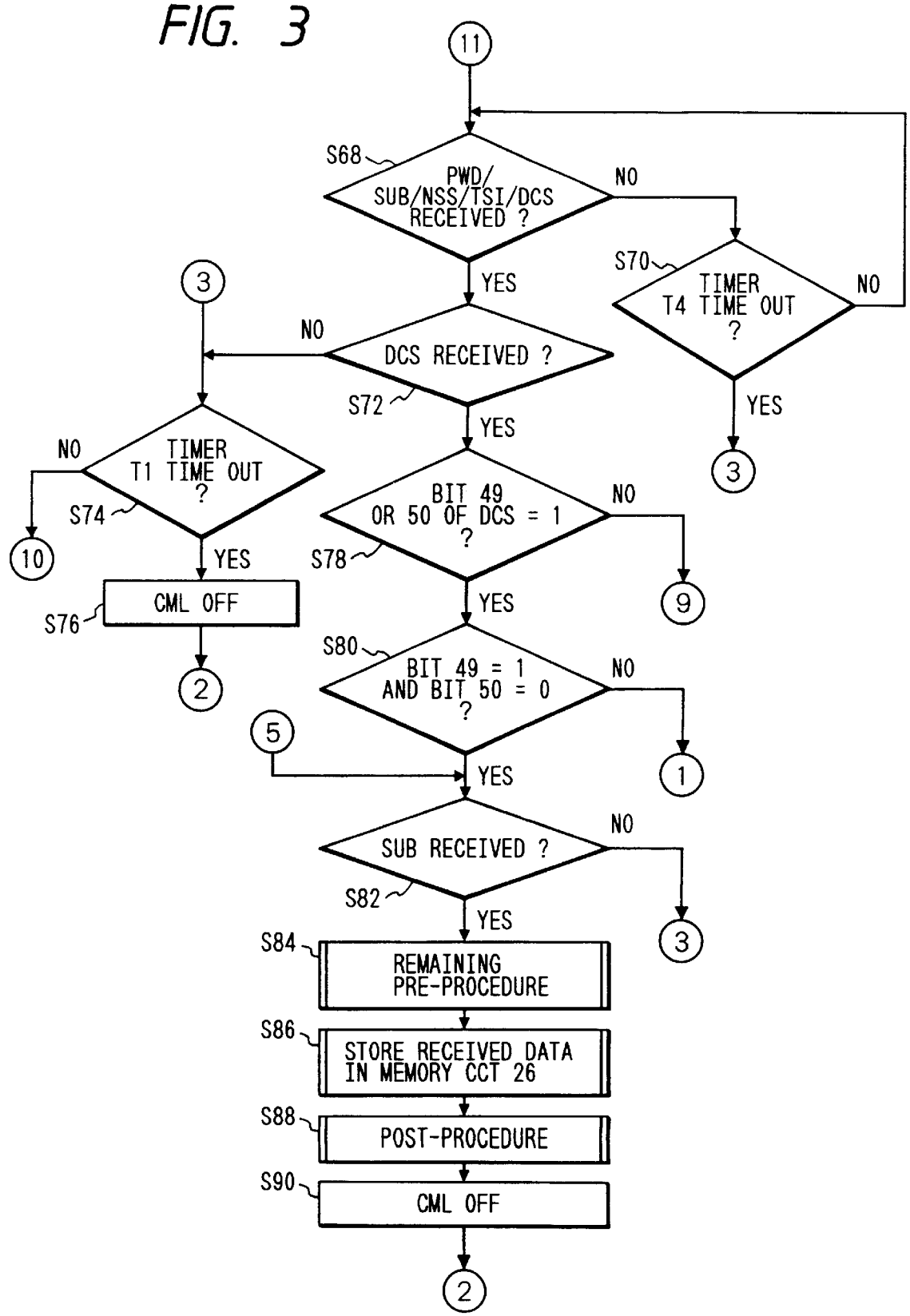
FIG. 3 is a flowchart showing operations of the first embodiment of the present invention.
Figure 4:
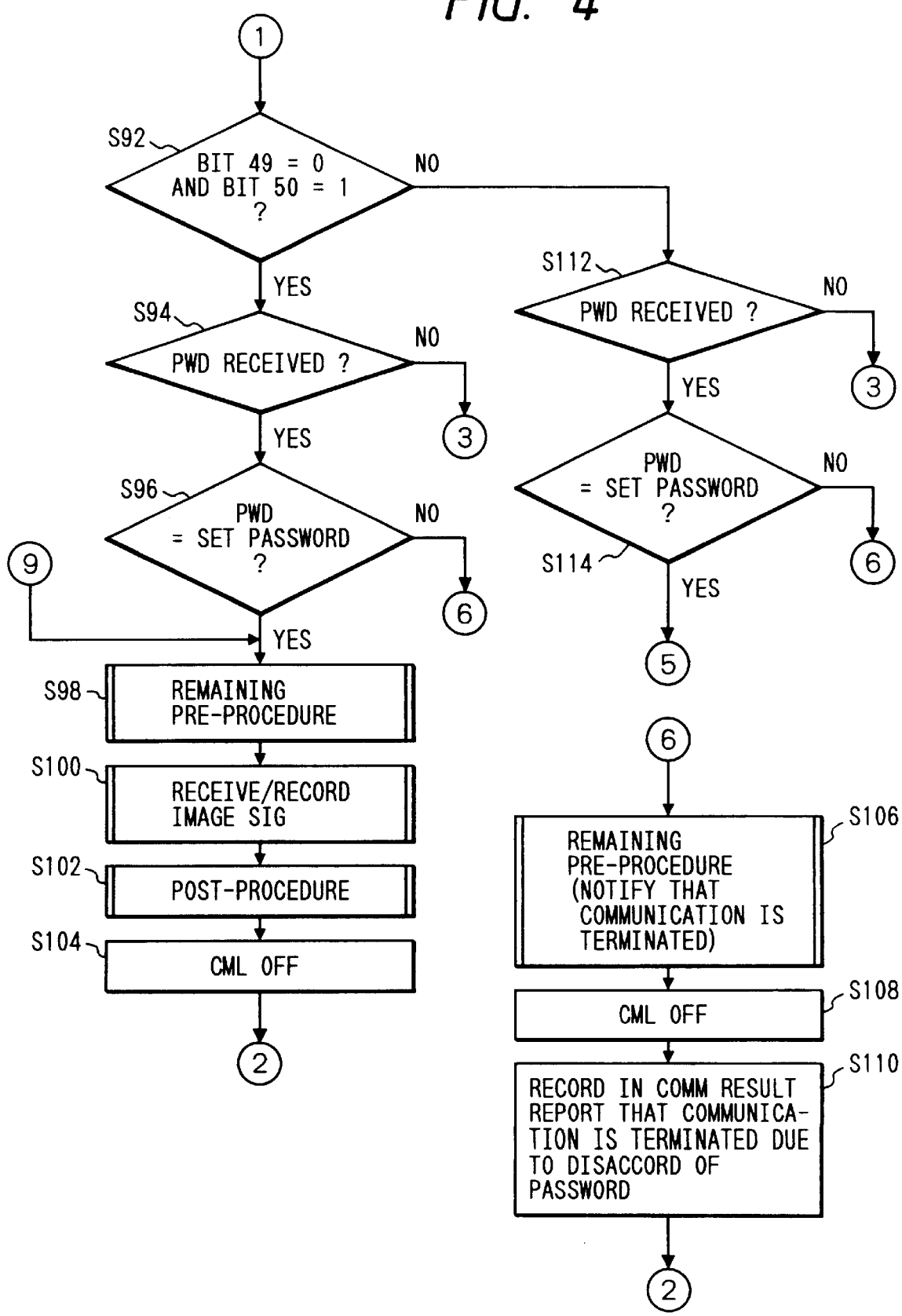
FIG. 4 is a flowchart showing operations of the first embodiment of the present invention.
Figure 5:
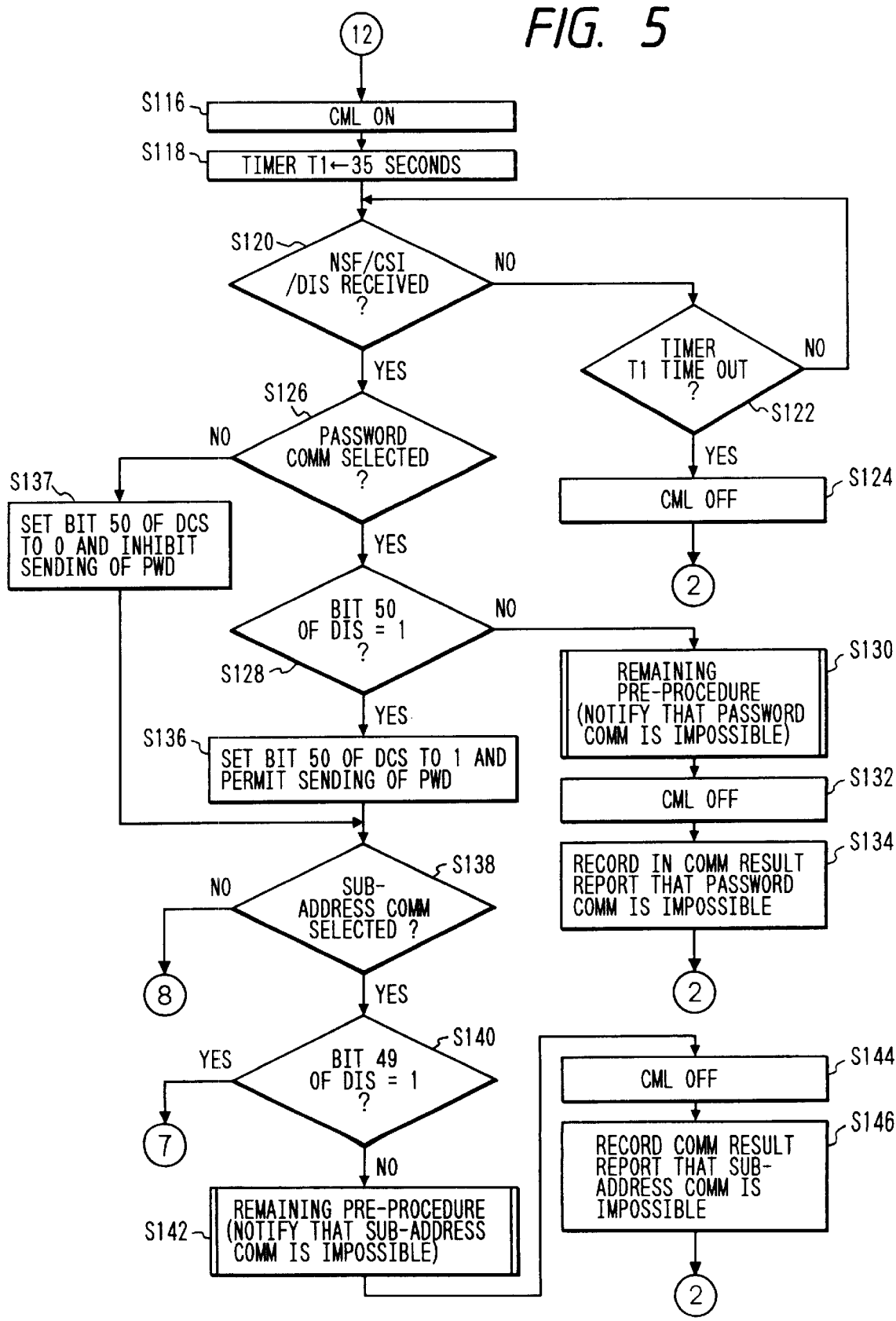
FIG. 5 is a flowchart showing operations of the first embodiment of the present invention.
Figure 6:
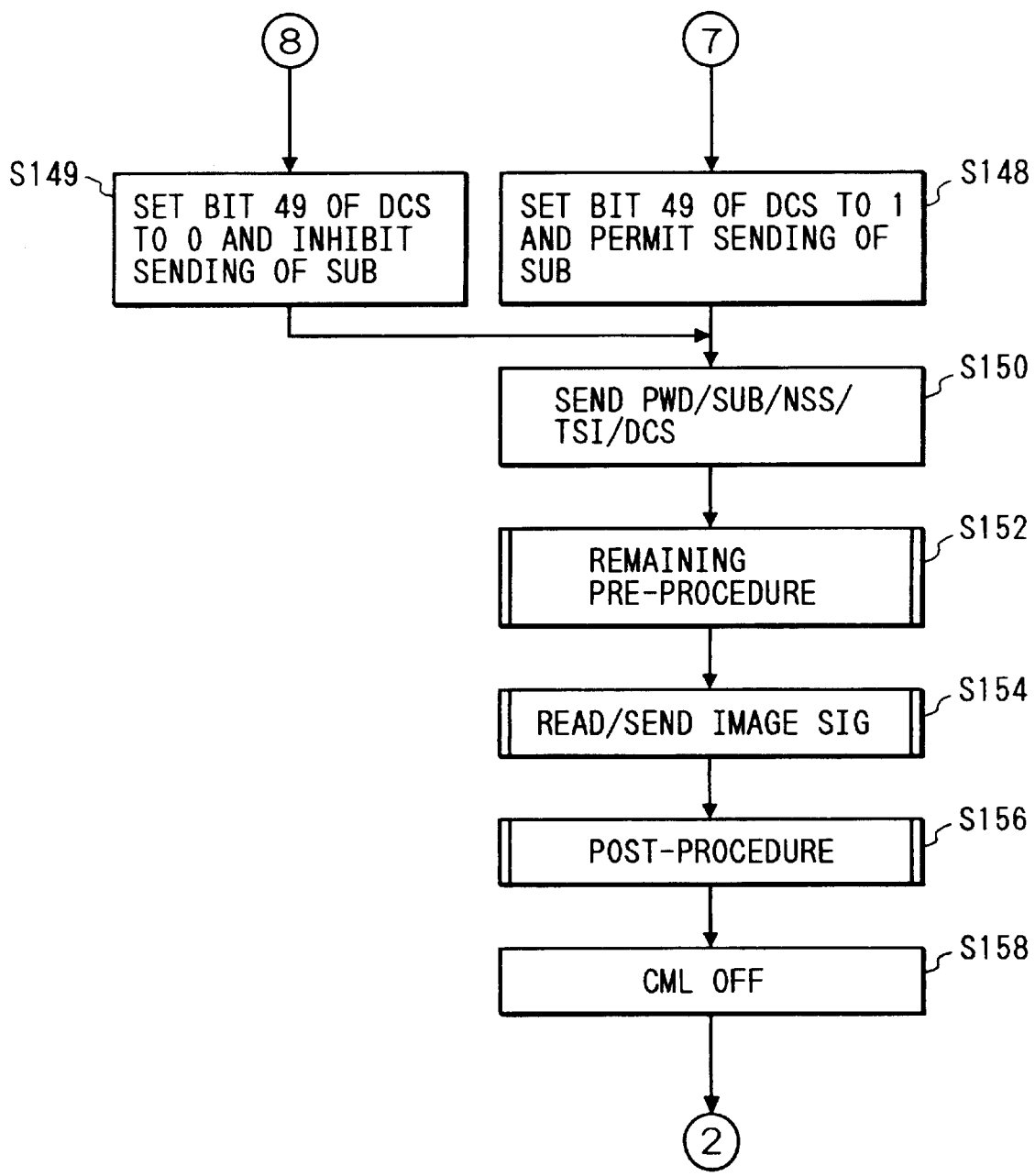
FIG. 6 is a flowchart showing operations of the first embodiment of the present invention.

FIG. 1 is a block diagram showing a first embodiment of the present invention.

An NCU (network control unit) 2 is connected to a terminal of a line thereof for data communication or the like over a telephone network in order to control connection with a telephone switching network, to make a switch to a data communication channel, and to hold a loop. Also, the NCU 2 connects a telephone line 2a to the side of a telephone set 4 when a signal level (signal line 36a) from a control circuit 36 is "0", and the telephone line 2a to the side of a facsimile apparatus when the signal level is "1". In normal state, the telephone line 2a is connected to the side of the telephone set 4.

A hybrid circuit 6 separates signals of a sending system from those of a receiving system, sends a transmission signal from an adder circuit 16 to the telephone line 2a via the NCU 2, receives a signal from a calling station via the NCU 2, and sends the received signal to a V29 demodulator 20 and a V21 demodulator 18 over a signal line 6a.

A V21 modulator 8 performs modulation according to the known ITU-T Recommendations V21. The V21 modulator modulates a procedure signal (signal line 36b) coming from the control circuit 36 and sends the modulated signal to the adder circuit 16 through a signal line 8a.

A read circuit 10 reads an image signal for one line in the main scanning direction in order from a document for transmission, generates a signal string indicating a binary of black and white, and sends the data to an encode circuit 12 through a signal line 10a. The read circuit 10 includes an image pickup element such as CCD (charge coupled device) or the like and an optical system. Here, the read circuit 10 performs a read in the standard mode when signal "0" is outputted to a signal line 36c, a read in the fine mode when signal "1" is outputted, and a read in the super fine mode when signal "2" is outputted.

The encode circuit 12 takes in the read data outputted to the signal line 10a, encodes (MH or MR encoding) the read data, and outputs the encoded data through a signal line 12a.

A V27ter or V29 modulator 14 takes in the encoded data from the signal line 12a, modulates the encoded data according to the known ITU-T Recommendations V27ter (differential phase modulation) or V29 (quadrature modulation), and outputs the modulated data to the adder circuit 16 through a signal line 14a.

The adder circuit 16 adds outputs from the modulators 8, 14. An output from the adder circuit 16 is sent to the hybrid circuit 6.

The V21 demodulator 18 performs a demodulation according to the known ITU-T Recommendations V21. The demodulator 18 takes in a procedure signal from the hybrid circuit 6, performs a V21 demodulation on the procedure signal, and sends the demodulated data to the control circuit 36 through a signal line 18a.

The V27ter or V29 demodulator 20 performs a demodulation according to the known ITU-T Recommendations V27ter or V29 . The demodulator 20 takes in a modulated image signal from the hybrid circuit 6, demodulates the image signal, and sends the demodulated data to a decode circuit 22 through a signal line 20a.

The decode circuit 22 takes in data outputted to the signal line 20a when a signal with signal level "0" is outputted to a signal line 36d and data outputted to a signal line 26a when a signal with signal level "1" is outputted to the signal line 36d. The decode circuit 22 outputs the decoded (MH or MR decoded) data to an encode circuit 24 or record circuit 28 through a signal line 22a.

The encode circuit 24 takes in a signal outputted to the signal line 22a, performs an MR encoding with K=8 on the signal, and outputs the encoded data to a memory circuit 26 through a signal line 24a.

The memory circuit 26 stores the encoded data outputted to the signal line 24a under control of a signal line 36e and outputs the stored data to the decode circuit 22 through the signal line 26a.

The record circuit 28 takes in data outputted to the signal line 22a one line by one line in the standard mode when signal "0" is outputted to a signal line 36f, in the fine mode when signal "1" is outputted, and in the super fine mode when signal "2" is outputted.

A received data storage designate key 30 is used on a transmitting station side to designate a receiving station side to store received data in a memory thereof. When the key 30 is pressed, a press pulse is generated in a signal line 30a.

A received data storage designate lamp 32 goes on when the transmitting station side designates the receiving station side to store the received data in the memory. The lamp 32 goes off when a clear pulse is generated in a signal line 36g. Subsequently, the lamp 32 alternates between on and off each time a press pulse is generated in the signal line 30a. When the lamp 32 is off, a signal with signal level "0" is outputted to a signal line 32a. When the lamp 32 is on, a signal with signal level "1" is outputted to the signal line 32a.

A stored data output key 34 is used to output data stored in the memory circuit 26. When the key 34 is pressed, a press pulse is generated in a signal line 34a.

The control circuit 36 in the first embodiment exercises control in order to notify a calling station by a digital command signal (DCS signal) whether a receive command signal contains a sub-address signal or password signal. A receiving station receives the DCS signal indicating whether the sub-address signal or password signal is contained. If the designated sub-address signal or password signal is not received, the receiving station sends a DIS group signal again to the calling station and then performs a response reception.

In the present embodiment, bits 47, 49, and 50 of DIS and DCS are prescribed as described below.

First, bit 47 of DIS is assigned to indicate "selective polling capability=SEP receive capability available", bit 49 thereof is assigned to indicate "sub-address capability=SUB receive capability available", and bit 50 thereof is assigned to indicate "password capability=PWD receive capability available".

Bit 47 of DCS is fixed to "0". Also, bit 49 of DCS is assigned to indicate "whether a SUB signal has been sent". Bit 49 of DCS is set to "1" when the SUB signal has been sent and to "0" if not. Furthermore, bit 50 of DCS is assigned to indicate "whether a PWD signal has been sent". Bit 50 of DCS is set to "1" when the PWD signal has been sent and to "0" if not.

Figure 47A:
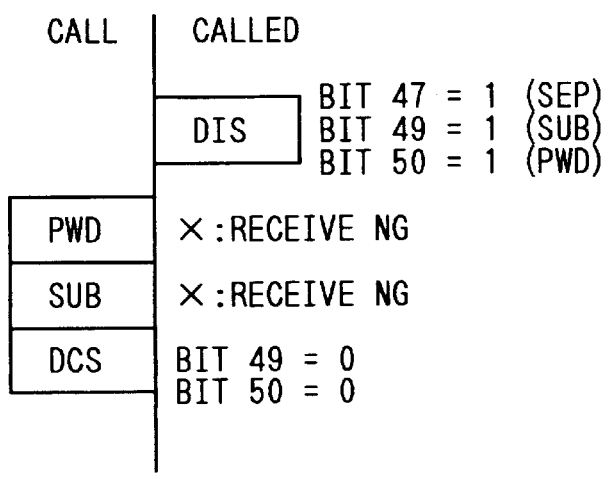
FIGS. 47A to 48B are charts showing transmission and reception of procedure signals of the prior art.
Figure 47B:
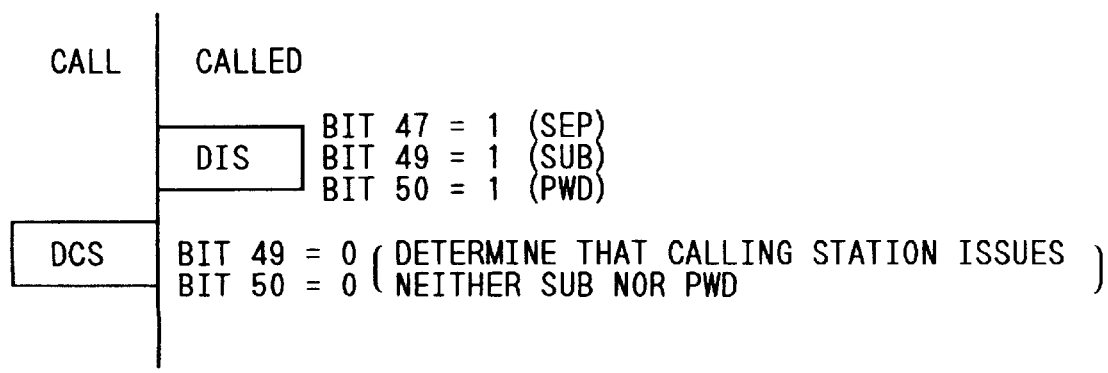
Figure 48A:
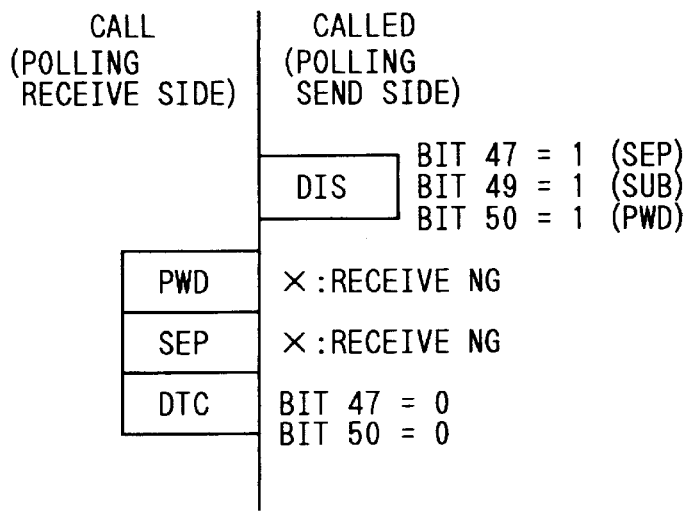
Figure 48B:
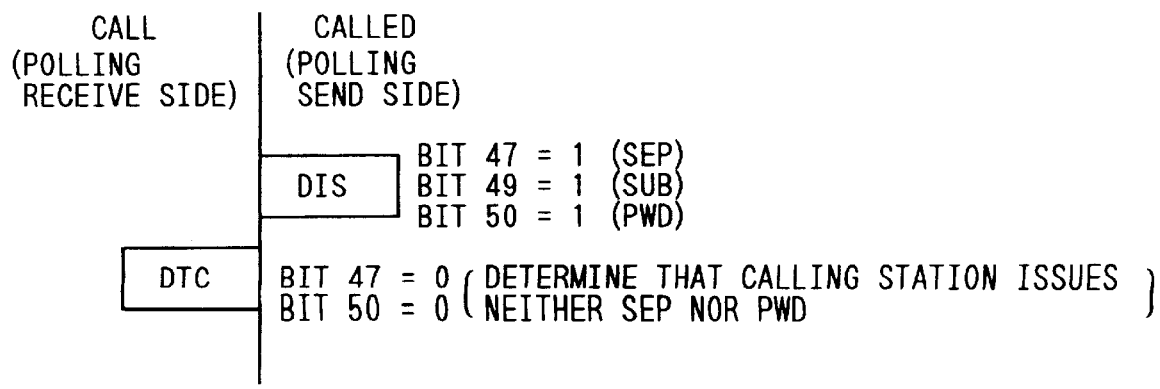

Thus, a station which has received DCS can know whether the SUB and PWD signals have been transmitted, by checking bits 49 and 50 of the received DCS, respectively. Hence, an erroneous assumption as illustrated in FIG. 47B will not occur.

Figure 8A:
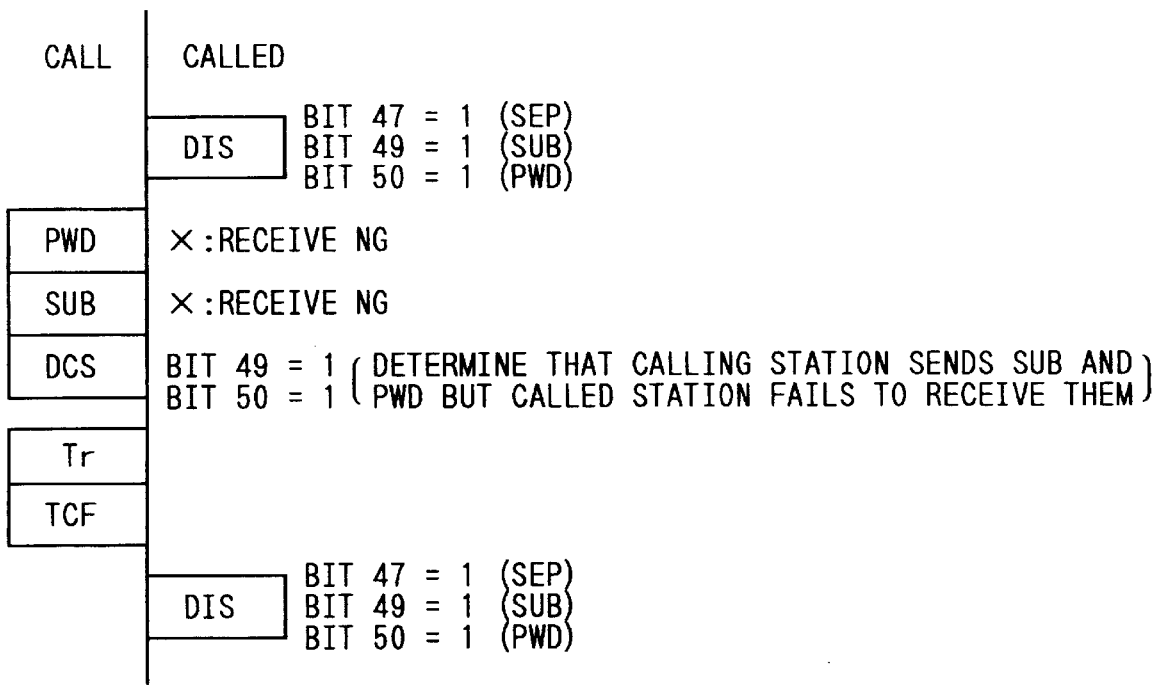
FIGS. 8A and 8B are charts showing transmission and reception of procedure signals of the first embodiment.
Figure 8B:
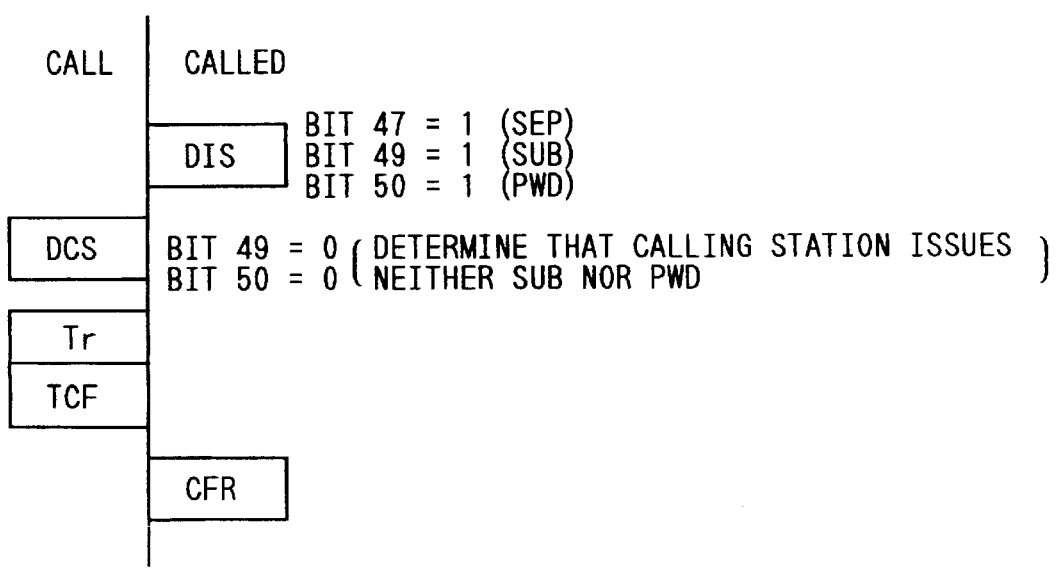

FIGS. 8A and 8B are sequence charts showing procedures of the present embodiment. FIG. 8A shows a procedure of the present embodiment when a called station has failed to receive the SUB and PWD signals.

As illustrated, according to the procedure of the present embodiment of FIG. 8A, since both bits 49 and 50 of DCS are "1", a called station determines that a calling station has sent the SUB and PWD signals, but the called station has failed to receive them. Thus, after receiving a training (Tr) signal and a training check (TCF) signal, the called station sends a DIS signal again.

Also, FIG. 8B shows a procedure of the present embodiment when the calling station has issued neither SUB signal nor PWD signal.

According to the procedure of the present embodiment of FIG. 8B, since both bits 49 and 50 of DCS are "0", the called station determines that the calling station has issued neither SUB signal nor PWD signal. Thus, after receiving the training (Tr) signal and training check (TCF) signal, the called station sends a confirmation to receive for receiving (CFR) signal to the calling station and proceeds to image transmission.

Next, FIGS. 2 to 6 are flowcharts showing operations of the control circuit 36 in the present embodiment.

First, in step S42, the control circuit 36 outputs a signal with signal level "0" to the signal line 36a to turn CML off. Next, in step S44, it generates a clear pulse in the signal line 36g to clear the received data storage designate lamp 32. In the present embodiment, when the lamp 32 is lit, sub-address communication is designated.

In step S46, the control circuit 36 takes in data outputted to the signal line 34a and determines whether the output of data stored in the memory circuit 26 is selected. It proceeds to step S48 if the output is selected and to step S50 if not.

In S48, the control circuit 36 outputs a signal with signal level "1" to the signal line 36d and outputs data stored in the memory circuit 26 through the signal line 36e. On completion of recording, it outputs a signal with signal level "0" to the signal line 36d.

In step S50, the control circuit 36 determines whether reception is selected. It proceeds to step S60 if reception is selected and to step S52 if not.

In step S52, the control circuit 36 determines whether transmission is selected. It proceeds to step S116 if transmission is selected and to step S54 to perform other process if not.

In step S60, the control circuit 36 outputs a signal with signal level "1" to the signal line 36a to turn CML on. In step S62, it sets timer T1 to 35 seconds.

In step S64, the control circuit 36 sends an NSF/CSI/DIS signal. Here, bits 47 (selective polling receive function available), 49 (sub-address receive function available), and 50 (password receive function available) in FIF (Facsimile Information Field) of DIS are all set to 1.

In step S66, the control circuit 36 sets timer T4 to 4.5 seconds for manual reception and to 3 seconds for automatic reception. Then, in step S68, it determines whether a PWD/SUB/NSS/TSI/DCS signal is received. It proceeds to step S72 if received and to step S70 if not.

In step S70, the control circuit 36 determines whether a time out associated with timer T4 has occurred. It proceeds to step S74 if the time out has occurred and to step S68 if not.

In step S72, the control circuit 36 determines whether a DCS signal has been received. It proceeds to step S78 if the DCS signal is received and to step S74 if not.

In step S74, the control circuit 36 determines whether a time out associated with timer T1 has occurred. It proceeds to step S76 if the time out has occurred and to step S64 if not.

In step S76, the control circuit 36 outputs a signal with signal level "0" to the signal line 36a to turn CML off. Then, it returns to step S46.

In step S78, the control circuit 36 determines whether bit 49 or 50 of FIF of the DCS signal is 1. It proceeds to step S80 if YES and to step S98 if NO.

In step S80, the control circuit 36 determines whether bit 49 of FIF of the DCS signal is 1 and also bit 50 is 0, i.e. it checks for the combined state that sub-address reception is designated and that password reception is not designated. It proceeds to step S82 if YES and to step S92 if NO.

According to recommendations of acceleration of ITU-T, bits 47, 49, and 50 of FIF of the DCS signal are all set to 0. However, according to the present embodiment, when bit 49 of FIF of the DCS signal is 1, it indicates that the SUB signal is also sent in multiframe; when bit 49 is 0, it indicates that the SUB signal is not sent in multiframe. Also, when bit 50 of FIF of the DCS signal is 1, it indicates that the PWD signal is also sent in multiframe; when bit 50 is 0, it indicates that the PWD is not sent in multiframe. The present embodiment follows this rule.

In step S82, the control circuit 36 determines whether the SUB signal is received. When the SUB signal is received, it proceeds to step S84 and subsequent steps for reception in memory. When the SUB signal is not received, it determines that receiving the SUB signal has failed and returns to step S74.

In step S84, the control circuit 36 performs remaining pre-procedure. In step S86, it stores received data in the memory circuit 26 through the signal line 36e. Then, in step S88, it performs post-procedure. In step S90, it outputs a signal with signal level "0" to the signal line 36a to turn CML off and returns to step S46.

In step S92, the control circuit 36 determines whether bit 49 of FIF of the DCS signal is 0 and also bit 50 is 1, i.e. it checks for the combined state that sub-address reception is not designated and that password reception is designated. It proceeds to step S94 if YES and to step S112 if NO.

In step S94, the control circuit 36 determines whether the PWD signal is received. When the PWD signal is received, it proceeds to step S96. When the PWD signal is not received, it determines that receiving the PWD signal has failed and returns to step S74.

In step S96, the control circuit 36 determines whether the PWD signal and a password set in the receiving station accord. It proceeds to step S98 if they accord and to step S106 if not.

In step S98, the control circuit 36 performs remaining pre-procedure. In step S100, it receives and records an image signal. Then, in step S102, it performs post-procedure. In step S104, it outputs a signal with signal level "0" to the signal line 36a to turn CML off and returns to step S46.

In step S106, the control circuit 36 performs remaining pre-procedure. Here, it notifies that communication is terminated due to disaccord of passwords. In step S108, it outputs a signal with signal level "0" to the signal line 36a to turn CML off. In step S110, it records in a communication result report that communication has been terminated due to disaccord of passwords.

In step S112, the control circuit 36 determines whether the PWD signal is received. When the PWD signal is received, it proceeds to step S114. When the PWD signal is not received, it determined receiving the PWD signal has failed and returns to step S74.

In step S114, the control circuit 36 determines whether the PWD signal and a password set in the receiving station accord. It proceeds to step S82 if they accord and to step S106 if not.

In step S116, the control circuit 36 outputs a signal with signal level "1" to the signal line 36a to turn CML on. In step S118, it sets timer T1 to 35 seconds.

In step S120, the control circuit 36 determines whether the NSF/CSI/DIS signal is received. It proceeds to step S126 if received and to step S122 if not.

In step S122, the control circuit 36 determines whether a time out associated with timer T1 has occurred. It proceeds to step S124 if the time out has occurred and returns to step S120 if not.

In step S124, the control circuit 36 outputs a signal with signal level "0" to the signal line 36a to turn CML off and returns to step S46.

In step S126, the control circuit 36 determines whether password communication is selected from a console unit, not shown. It proceeds to step S128 if selected and to step S137 if not.

In step S128, the control circuit 36 determines whether bit 50 of FIF of the DIS signal is 1, i.e. whether the password receive function is available. It proceeds to step S136 if YES and to step S130 if NO.

In step S130, the control circuit 36 performs remaining pre-procedure. Here, it notifies that password communication is impossible. In step S132, it outputs a signal with signal level "0" to the signal line 36a to turn CML off. In step S134, it records in the communication result report that password communication is impossible and returns to step S46.

In step S136, the control circuit 36 sets bit 50 of FIF of the DCS signal to 1 to notify the receiving station that the PWD signal is to be sent and permits the sending of the PWD signal.

In step S137, the control circuit 36 sets bit 50 of FIF of the DCS signal to 0 to notify the receiving station that the PWD signal is not to be sent and inhibits the sending of the PWD signal.

In step S138, the control circuit 36 determines whether sub-address communication is selected, i.e. specifically, whether the lamp 32 is lit. It proceeds to step S140 if YES and to step S149 if NO.

In step S140, the control circuit 36 determines whether bit 49 of FIF of the DIS signal is 1, i.e. whether the remote receiving station has the sub-address receive function. It proceeds to step S148 if YES and to step S142 if NO.

In step S142, the control circuit 36 performs remaining pre-procedure. Here, it notifies that sub-address communication is impossible. In step S144, it outputs a signal with signal level "0" to the signal line 36a to turn CML off. In step S146, it records in the communication result report that sub-address communication is impossible and returns to step S46.

In step S148, the control circuit 36 sets bit 49 of the DCS signal to 1 to notify the receiving station that the SUB signal is to be sent and permits the sending of the SUB signal. In step S149, it sets bit 49 of the DCS signal to 0 to notify the receiving station that the SUB signal is not to be sent and inhibits the sending of the SUB signal. In step S150, it sends the PWD/SUB/NSS/TSI/DCS signal according to steps S136, S137, S148, and S149. Furthermore, in step S152, it performs remaining pre-procedure. In step S154, it reads and sends an image signal. Then, in step S156, it performs post-procedure. In step S158, it outputs a signal with signal level "0" to the signal line 36a to turn CML off and returns to step S46.

In the first embodiment described above, the PWD and SUB signals are sent as receive command signals, and at this time, the sending of the signals is notified in FIF of the DCS signal. However, as in a second embodiment of the present invention, the PWD and SEP signals may be sent as a transmit command signal, and the sending of the signals may be notified in FIF of the DTC signal. Here, the presence or absence of the PWD signal is assigned to bit 65 of FIF of the DTC signal, and the presence or absence of the SEP signal is assigned to bit 66 of FIF of the DTC signal.

Also, as a third embodiment of the present invention, whether a non-standard facilities set-up (NSS) signal is included in a receive command signal may be notified to a remote station by a digital command signal (DCS), for example, bit 67 of FIF thereof.

For example, this is effective where the DCS signal is used to designate the standard or fine mode and the NSS signal is used to designate the super fine mode.

Figure 7:
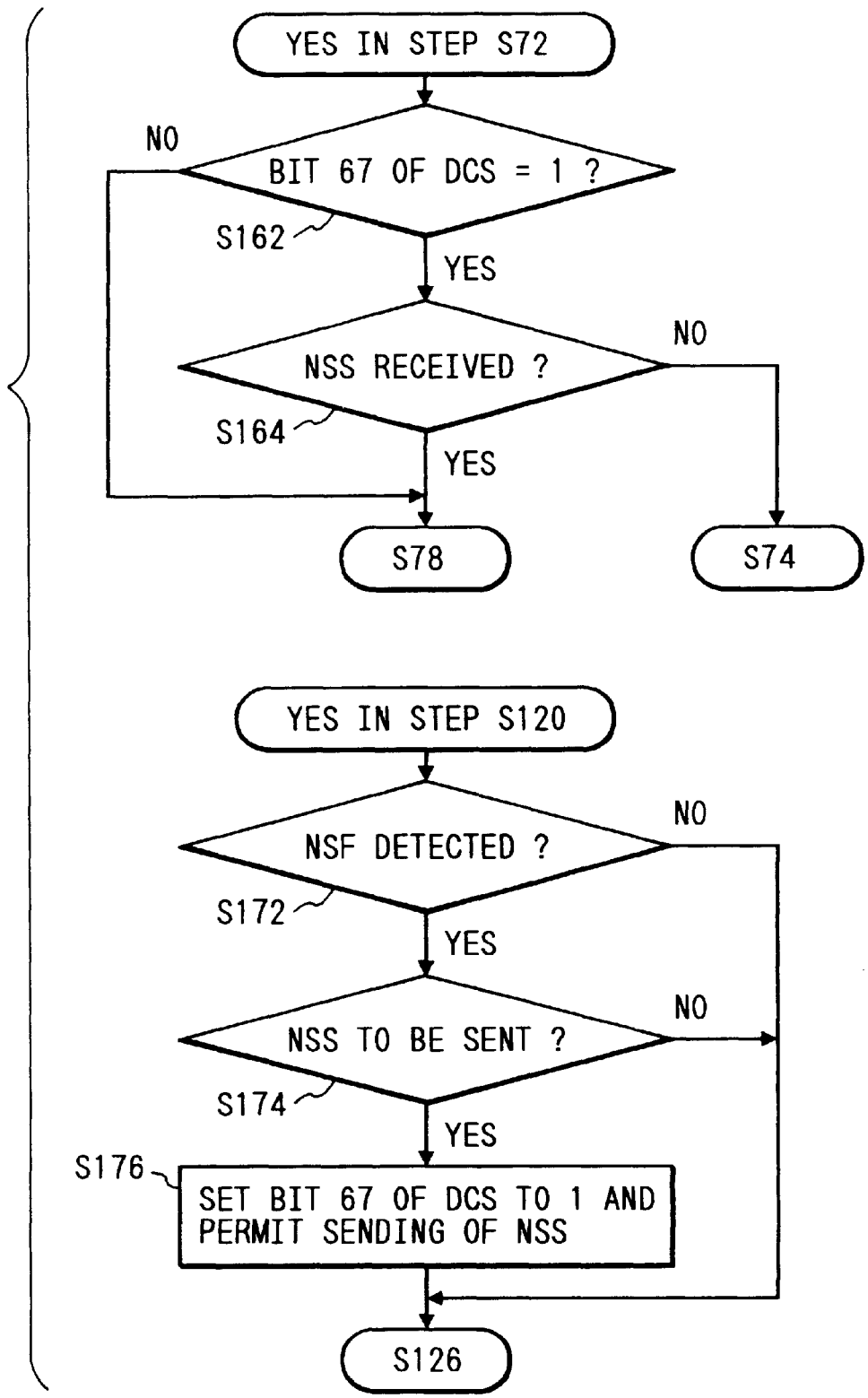
FIG. 7 is a flowchart showing operations of a third embodiment of the present invention.

FIG. 7 is a flowchart showing a different part of control in this case from the first embodiment described above.

First, if YES in step S72 described above, the control circuit 36 proceeds to step S162. In step S162, it determines whether bit 67 of FIF of the DCS signal is 1, i.e. whether the NSS signal is also sent. It proceeds to step S164 if YES and to step S78 described above if NO.

In step S164, the control circuit 36 determines whether the NSS signal is received. It proceeds to step S78 described above if received and to step S74 described above if not.

Also, if YES in step S120 described above, the control circuit 36 proceeds to step S172. In step S172, it determines whether the NSF signal is received. It proceeds to step S174 if received and to step S126 described above if not.

In step S174, the control circuit 36 determines whether the NSS signal is to be sent. It proceeds to step S176 when the NSS signal is sent and to step S126 described above when the NSS signal is not sent.

In step S176, the control circuit 36 sets bit 67 of FIF of the DCS signal to 1 to designate the sending of the NSS signal to a remote receiving station and permits the sending of the NSS signal.

Also, as a fourth embodiment of the present invention, whether a transmitting subscriber identification (TSI) signal is included in a receive command signal may be notified to a remote station by a digital command signal (DCS), for example, bit 68 of FIF thereof. Operations in this case are substantially identical to those of the third embodiment illustrated above in FIG. 7, and hence description thereof is omitted.

Furthermore, an initial identification signal may be applied to the third and fourth embodiments described above, and whether a non-standard facilities (NSF) signal or a called station identification (CSI) signal is included may be notified to a remote station by a digital identification signal (DIS). For example, the presence or absence of NSF is assigned to bit 67 of FIF of DIS, and the presence or absence of CSI is assigned to bit 68 of FIF of DIS.

Also, a transmit command signal may be applied to the third and fourth embodiments described above, and whether a non-standard facilities command (NSC) signal or a calling subscriber identification (CIG) signal is included may be notified to a remote station by a digital transmit command (DTC) signal. For example, the presence or absence of NSC is assigned to bit 67 of FIF of DTC, and the presence or absence of CIG is assigned to bit 68 of FIF of DTC.

As described above, according to the present embodiment, for example, when the DCS signal, DIS signal, DTC signal and the like are in multiframe construction, respectively, the fact can be notified to a remote station by including it in FIF (facsimile information field) of the DCS signal, DIS signal, and DTC signal or the like. Thus, when the DCS signal, DIS signal, DTC signal and the like are sent in multiframe, respectively, and also when a receiving station side fails to receive part of the multiframe of these signals, it is possible for the receiving station side to properly recognize the failure. This prevents a difference in recognition between the sending and receiving station sides, leading to prevention of an erroneous operation.

Fifth Embodiment

Figure 9B:
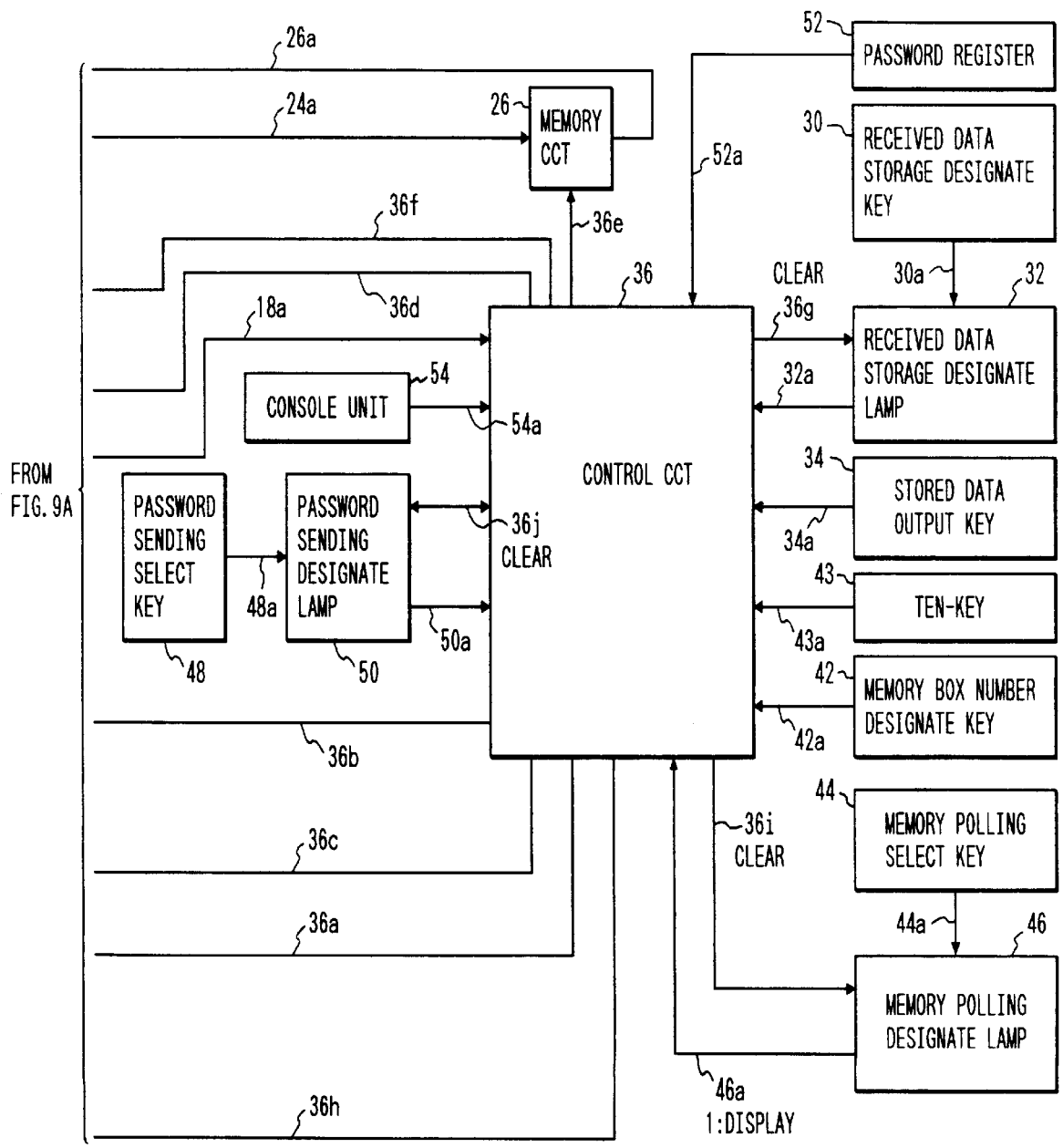
FIG. 9 is comprised of FIGS. 9A and 9B illustrating block diagrams showing the construction of a facsimile apparatus according to a fifth embodiment.

FIGS. 9A and 9B are block diagrams showing a facsimile apparatus according to a fifth embodiment.

In FIGS. 9A and 9B, features functioning in the same manner as in FIG. 1 are denoted by common reference numerals, and description thereof is omitted.

The encode circuit 12 takes in read data outputted to the signal line 10a, encodes (MR encoding with K=8) the read data, and outputs the encoded data through the signal line 12a.

The memory circuit 38 stores the encoded data outputted to the signal line 12a under control of a signal line 36h and outputs the stored data to a signal line 38a.

A decode/variable-magnify/encode circuit 40 takes in the data MR encoded with K=8 and outputted to the signal line 38a. The circuit 40 decodes, variable-magnifies, and re-encodes the data, as needed, and outputs the processed data to a signal line 40a.

The V27ter or V29 modulator 14 takes in the encoded data from the signal line 40a, modulates the encoded data according to the known ITU-T Recommendations V27ter (differential phase modulation) or V29 (quadrature modulation), and outputs the modulated data to the adder circuit 16 through the signal line 14a.

A memory box number designate key 42 is used to designate a memory box number. After pressing the key 42, data is entered using a ten-key 43 to designate a memory box number. Specifically, the key 42 is used on transmitting station side to designate a memory box in order to cause a remote receiving station side to store a received image therein (the memory box is notified to the remote receiving station by the SUB signal). Also, the key 42 is used on a polling receive side to designate a memory box on a remote polling send side data stored in which the polling receive side is to receive by polling (the memory box is notified to the remote polling send station by the SEP signal). When the designate key 42 is pressed, a press pulse is generated in a signal line 42a.

The ten-key 43 is used to enter numerical data for dialing or the like. Data associated with a pressed ten-key is outputted to a signal line 43a.

A memory polling select key 44 is used on the polling receive station side to designate the polling receive of data stored in a memory on the polling send station side. When the key 44 is pressed, a press pulse is generated in a signal line 44a.

A memory polling designate lamp 46 is used to designate memory polling receive. The lamp 46 goes off when a clear pulse is generated in a signal line 36i. Subsequently, the lamp 46 alternates between on and off each time a press pulse is generated in the signal line 44a. When the lamp 46 is off, a signal with signal level "0" is outputted to a signal line 46a. When the lamp 46 is on, a signal with signal level "1" is outputted to the signal line 46a.

A password sending select key 48 is used to select the sending of a password signal in sending image data and at polling receive. When the key 48 is pressed, a press pulse is generated in a signal line 48a. A password is registered on the side of receiving the password signal. If the password signal sent from a password signal transmitting station side does not accord with the registered password, the receiving side rejects communication (reception).

Also, a password is registered on the polling send side. If a password signal sent from the polling receive station side does not accord with the registered password, the polling send side rejects communication (transmission). Here, if a sub-address is designated by the SUB signal, a memory box to store received image data is determined on the side of receiving the image data, and a memory box to be used for polling send is determined on the polling send side. If the SUB signal is not designated, a memory box with address 0 is to be selected. Here, suppose that memory boxes ranging from address 0 to address 99 for example are available.

A password sending designate lamp 50 is used to designate the sending of a password signal in sending image data and at polling receive. The lamp 50 goes off when a clear pulse is generated in a signal line 36*j*. Subsequently, the lamp 50 alternates between on and off each time a press pulse is generated in the signal line 48*a*. When the lamp 50 is off, a signal with signal level "0" is outputted to a signal line 50*a*. When the lamp 50 is on, a signal with signal level "1" is outputted to the signal line 50*a*.

A password register circuit 52 is used to register a station password through a signal line 52*a*.

A console unit 54 includes one-touch dialing keys, abbreviated dialing keys, a ten-key pad, a start key, password register keys, a set key, and other function keys. Data associated with a pressed key is outputted to a signal line 54*a*.

A control circuit 36 performs operations similar to those of the first embodiment. The description of the fifth embodiment, therefore, only covers what is not covered by the description of the first embodiment. The same control features as those of the first embodiment are denoted by common reference numerals, and description thereof is omitted.

When a polling receive is to be executed, if a received DIS signal indicates that the selective polling capability is available (a function of receiving a SEP signal is available; bit 47 of FIF of the DIS signal=1) and also if polling receive with a memory box designated is selected, a SEP signal with a memory box designated is sent, and also a DTC signal with bit 47 of FIF thereof=1 is sent in order to notify a remote station of the sending of the SEP signal. If the received DIS signal indicates that a password capability is available (bit 50 of FIF of the DIS signal=1) and also if password communication is selected, a password registered in the station is sent by a PWD signal, and also a DTC signal with bit 50 of FIF thereof=1 is sent in order to notify a remote station of the sending of the PWD signal.

When the polling receive side does not send the PWD signal, bit 50 of FIF of the DTC signal is set to 0. When the polling receive side does not send the SEP signal, bit 47 of FIF of the DTC signal is set to 0.

The polling send station side sends again an initial identification signal when it detects the presence of the PWD signal from bit 50 of FIF of the DTC signal transmitted from the polling receive station side (bit 50=1) and also has failed to receive the PWD signal or when it detects the presence of the SEP signal from bit 47 of FIF of the DTC signal (bit 47=1) and also has failed to receive the SEP signal.

The fifth embodiment is identical to the first embodiment in definition of bits 47, 49, and 50 of DIS and DCS.

In the fifth embodiment, bit 47 of DTC is assigned to indicate "whether the SEP signal has been sent". This bit 47 is set to "1" when the SEP signal is sent and to "0" if not. Bit 49 of DTC is fixed to "0". Furthermore, bit 50 of DTC is assigned to indicate "whether the PWD signal has been sent". This bit 50 is set to "1" when the PWD signal is sent and to "0" if not.

Thus, in polling send, the polling send station (called) can know whether the SEP and PWD signals have been transmitted, by checking bits 47 and 50 of a received DTC.

Figure 19A:
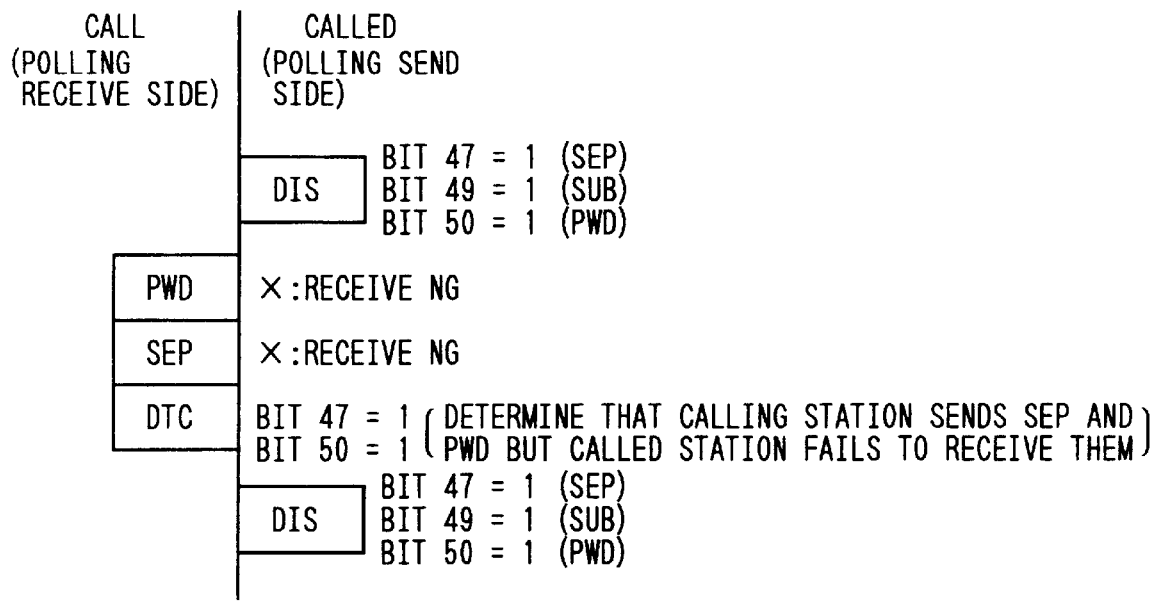
FIGS. 19A and 19B are charts showing transmission and reception of procedure signals of the fifth embodiment.
Figure 19B:
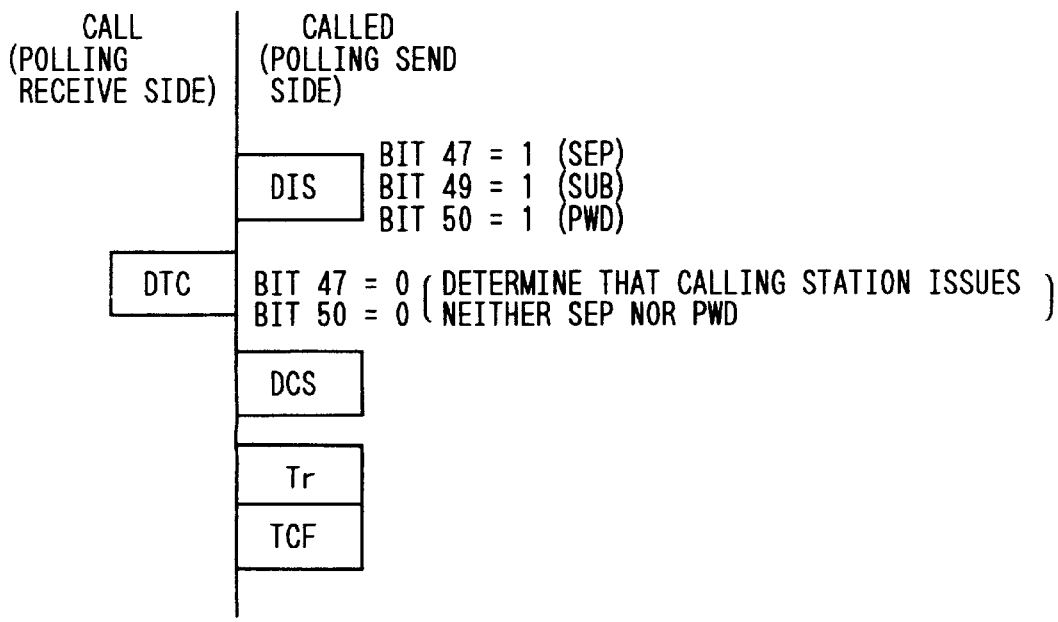

FIGS. 19A and 19B are sequence charts showing procedures of the present embodiment in polling communication. FIG. 19A shows a procedure of the present embodiment when a called station has failed to receive the SEP and PWD signals.

As illustrated, according to the procedure of the present embodiment of FIG. 19A, since both bits 47 and 50 of DTC are "1", a called station determines that a calling station has sent the SUB and PWD signals, but the called station has failed to receive them. Thus, the called station sends a DIS signal again.

Also, FIG. 19B shows a procedure of the present embodiment when the calling station has issued neither SEP signal nor PWD signal.

According to the procedure of the present embodiment of FIG. 19B, since both bits 47 and 50 of DCS are "0", the called station determines that the calling station has issued neither SEP signal nor PWD signal. Thus, after sending the DCS, Tr, and TCF signals, the called station proceeds to image transmission by polling.

As described above, according to the present embodiment, whether or not the SEP signal and PWD signal are sent can be determined definitely, and hence proper operations can be obtained.

FIGS. 10 to 18 are flowcharts showing operations of the control circuit 36 in the fifth embodiment. The same steps as those of the first embodiment are denoted by common reference numerals, and description thereof is omitted.

Figures 10, 10A:
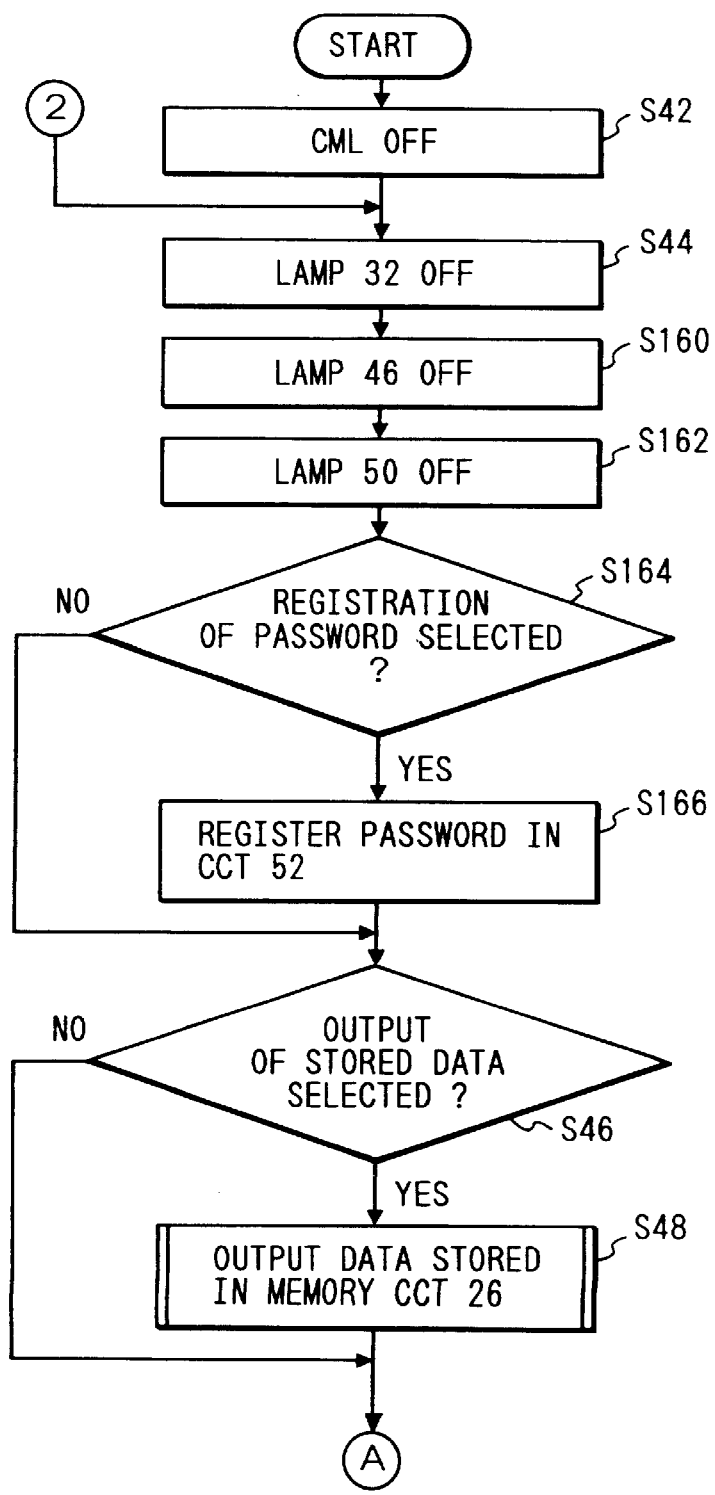
FIG. 10 is comprised of FIGS. 10A and 10B illustrating flowcharts showing operations of the fifth embodiment.
Figure 10B:
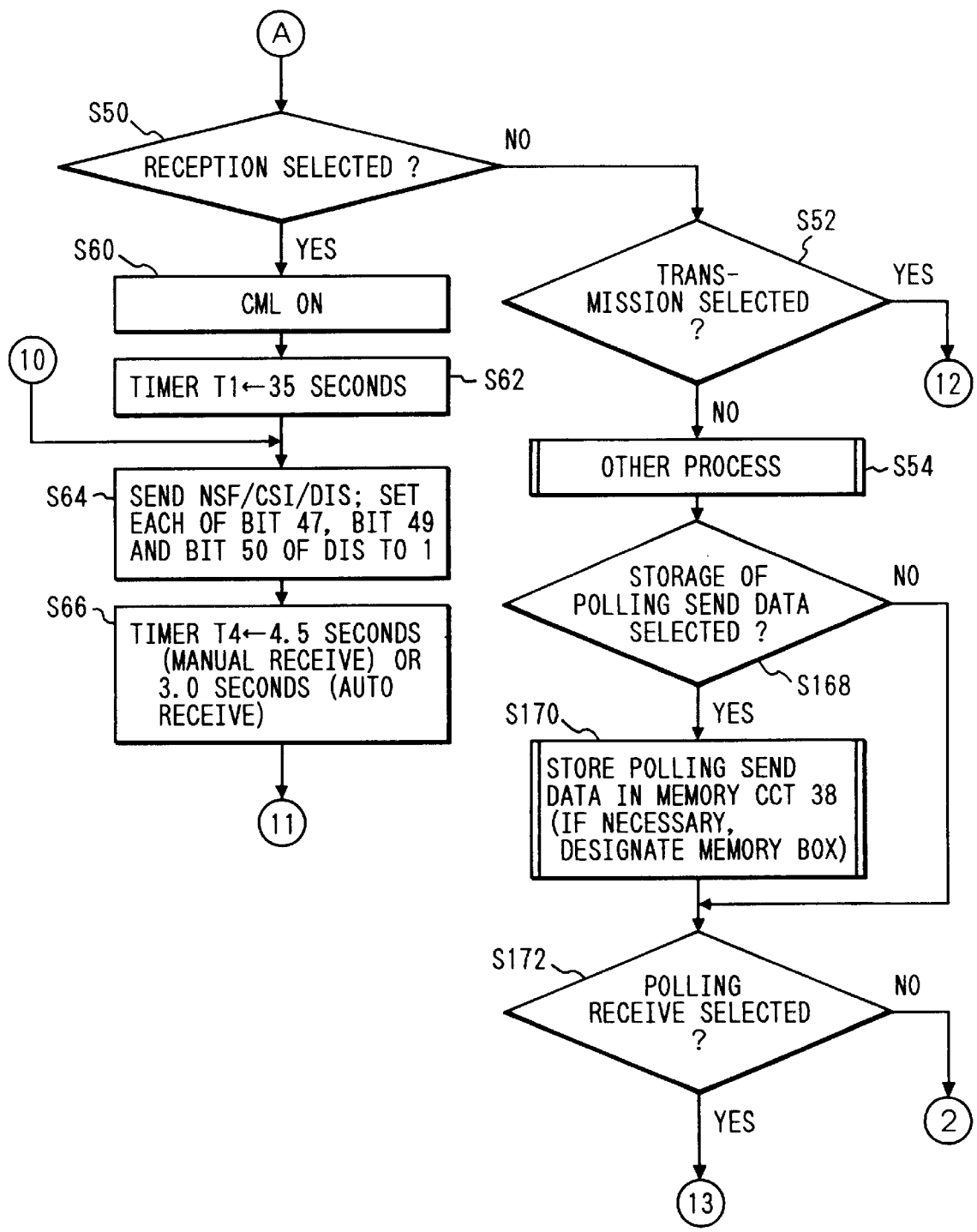

In FIG. 10, in step S160, the control circuit 36 generates a clear pulse in the signal line 36*i* to turn the memory polling designate lamp 46 off. In step S162, it generates a clear pulse in the signal line 36*j* to turn the password sending designate lamp 50 off.

Next, in step S164, the control circuit 36 takes in data outputted to the signal line 54*a* and determines whether the registration of a station password is selected. It proceeds to step S166 if the registration is selected and to step S46 if not.

In step S46, the control circuit 36 takes in data outputted to the signal lines 34*a*, 42*a*, 43*a*, and 54*a* and determines whether the output of data stored in the memory circuit 26 is selected. It proceeds to step S48 if the output is selected and to step S50 if not.

In 548, the control circuit 36 outputs a signal with signal level "1" to the signal line 36*d* and outputs data stored in the memory circuit 26 through the signal line 36*e*. Here, if a memory box is designated by the SUB signal, it outputs data stored in the designated memory box. If a password is designated by the PWD signal, it outputs data after a password is entered. On completion of recording, it outputs a signal with signal level "0" to the signal line 36*d*.

In step S168, the control circuit 36 determines whether the storage of polling send data in a memory is selected. If the storage is selected, it proceeds to step S170 to store the polling send data in the memory circuit 38. Here, it is also possible for the control circuit 36 to take in data outputted to the signal lines 42*a* and 43*a* and to designate a memory box for storage. If the storage in the memory is not selected, it proceeds to step S172.

In step S172, the control circuit 36 determines whether polling receive is selected. It proceeds to step S206 (FIG. 17) if selected and to step S44 if not.

Figure 11:
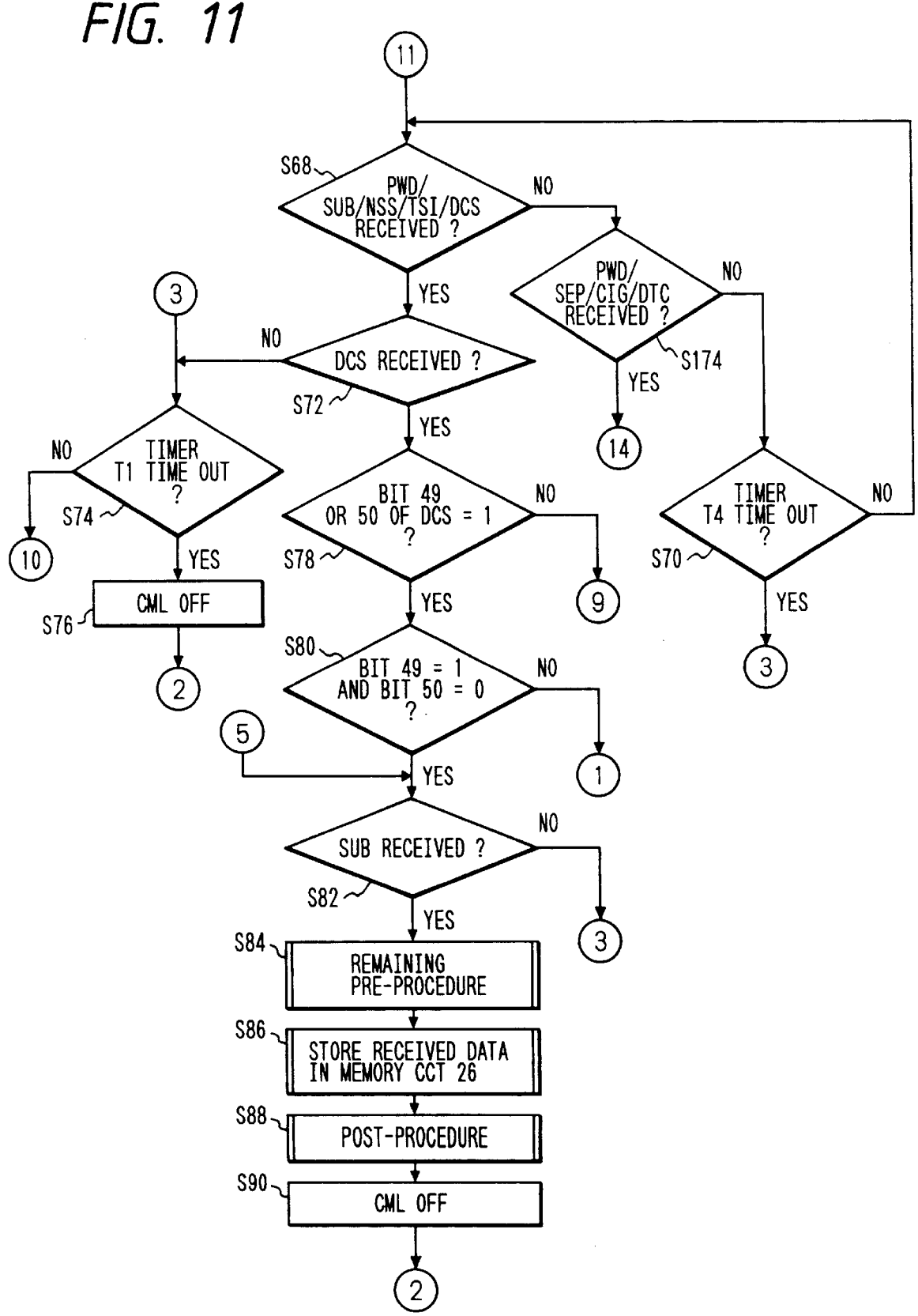
FIG. 11 is a flowchart showing operations of the fifth embodiment.
Figure 12:
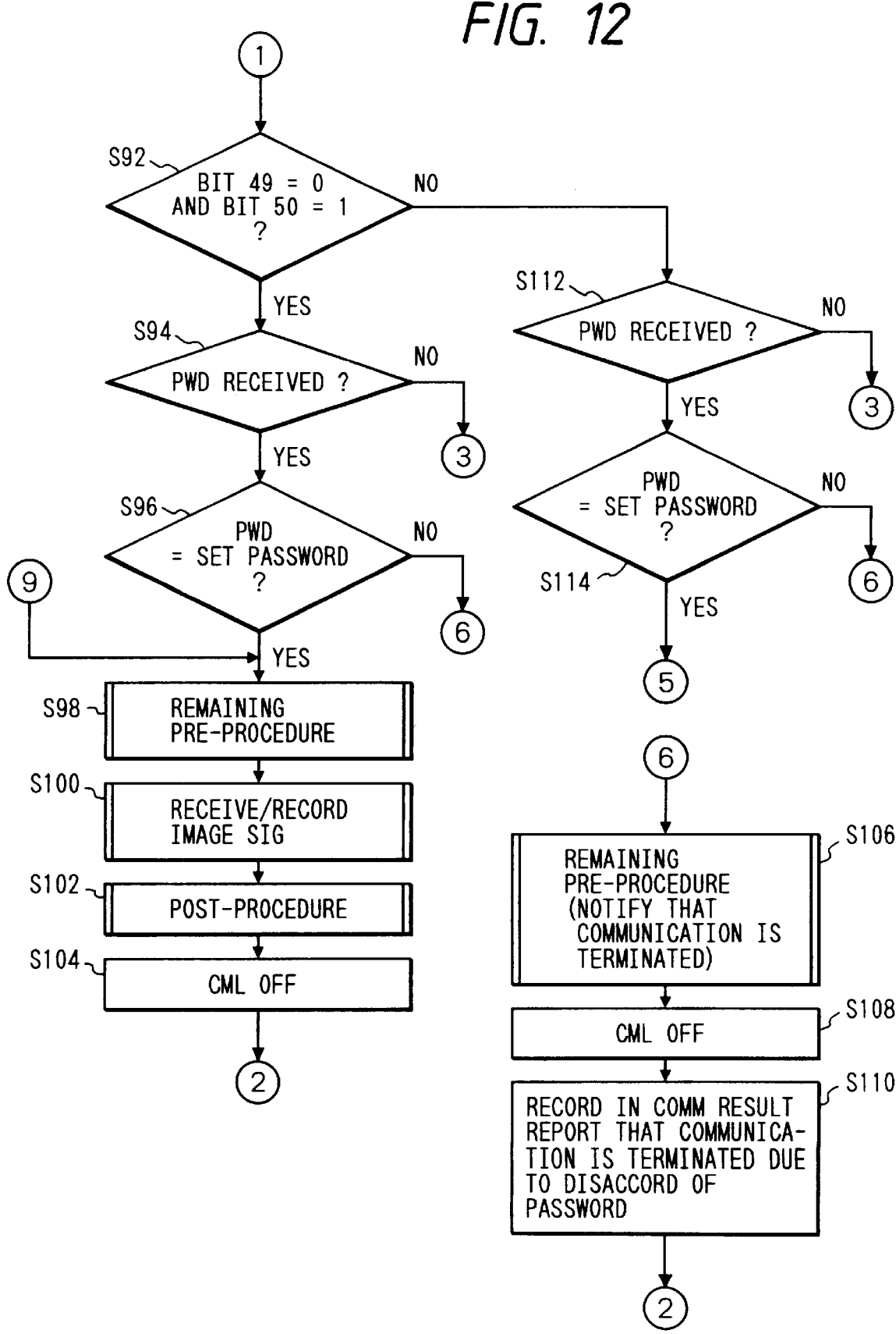
FIG. 12 is a flowchart showing operations of the fifth embodiment.

In step S174 of FIG. 11, the control circuit 36 determines whether the PWD/SEP/CIG/DTC signal is received. It proceeds to step S176 (FIG. 15) if received and to step S70 if not.

Figure 15:
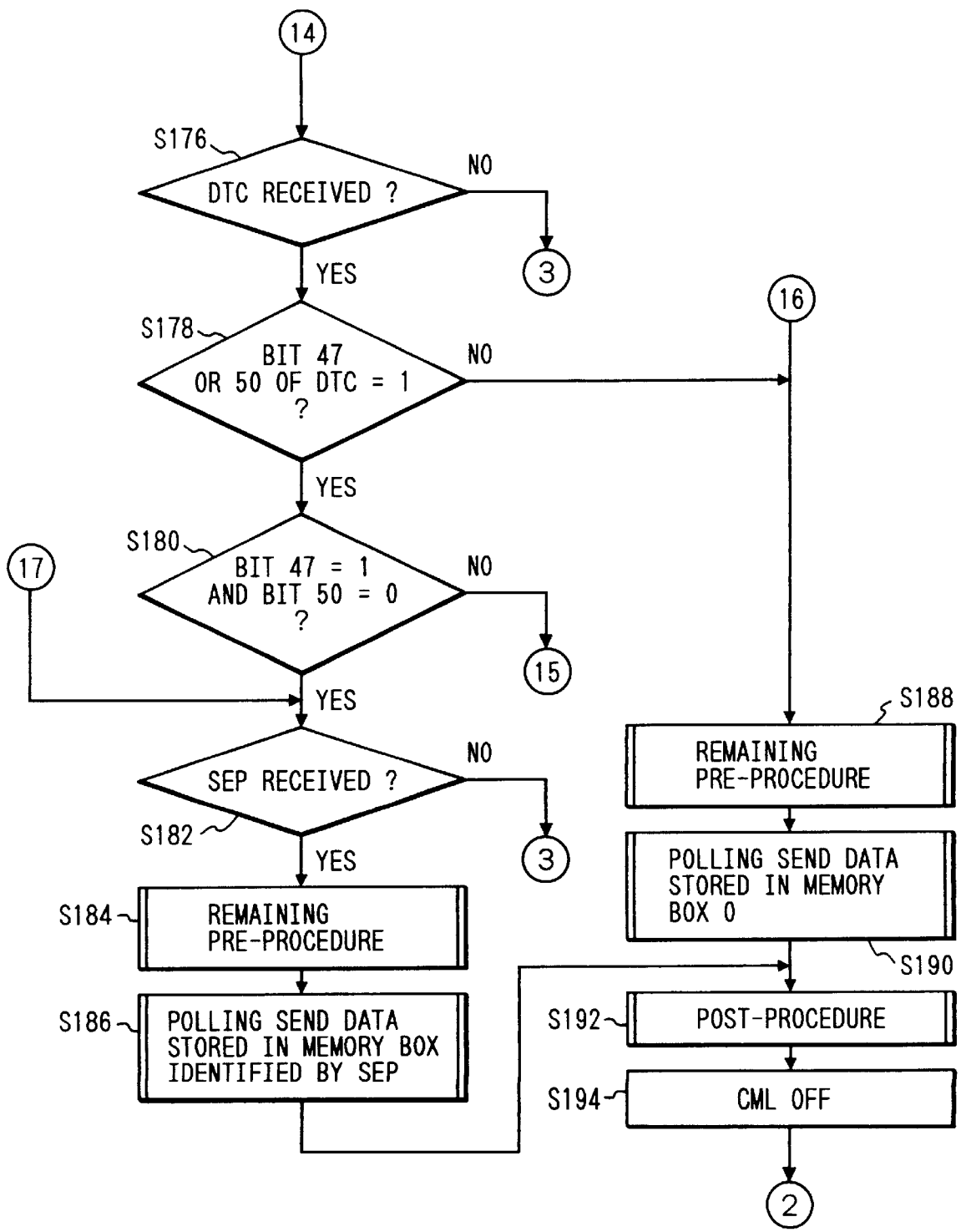
FIG. 15 is a flowchart showing operations of the fifth embodiment.
Figure 16:
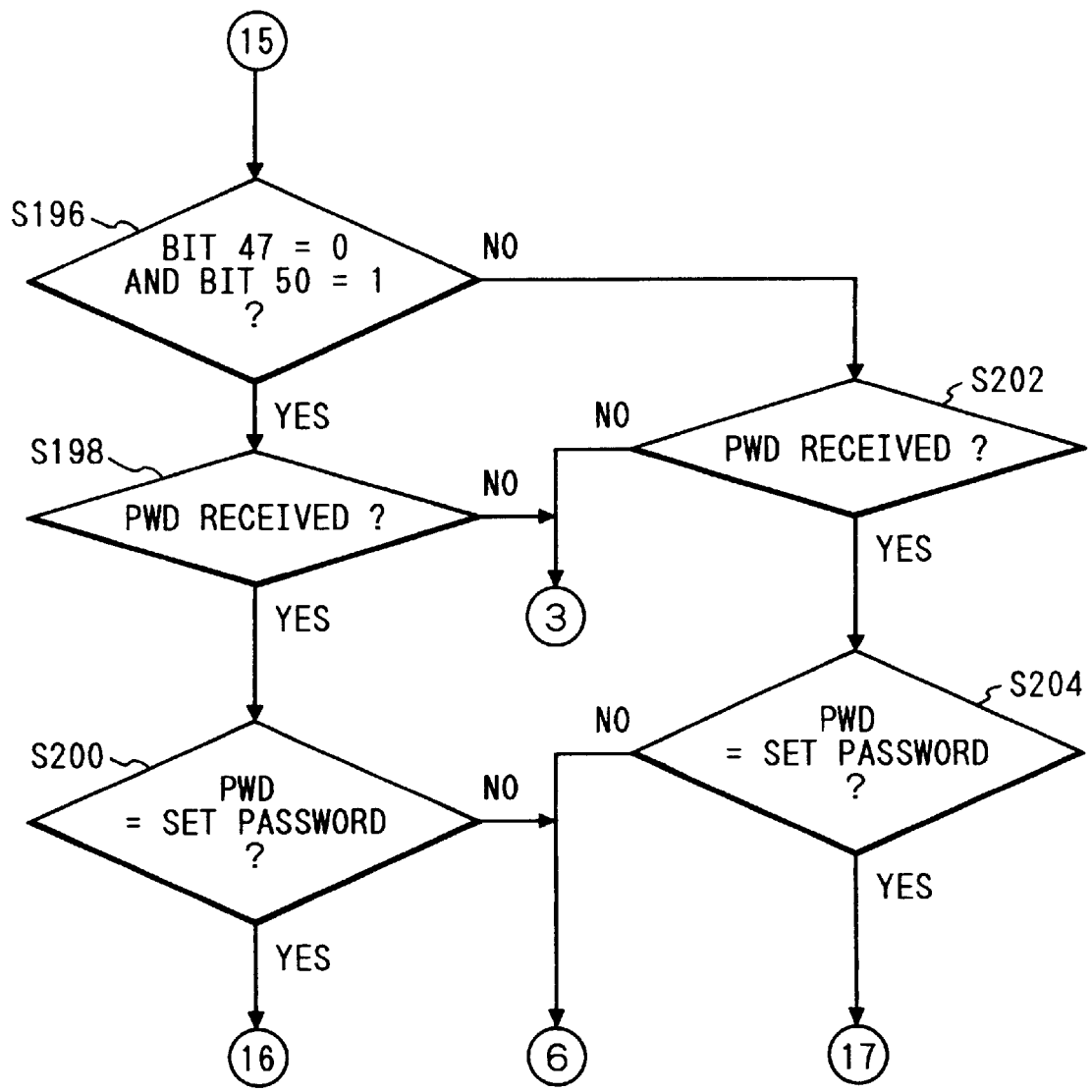
FIG. 16 is a flowchart showing operations of the fifth embodiment.
Figure 17:
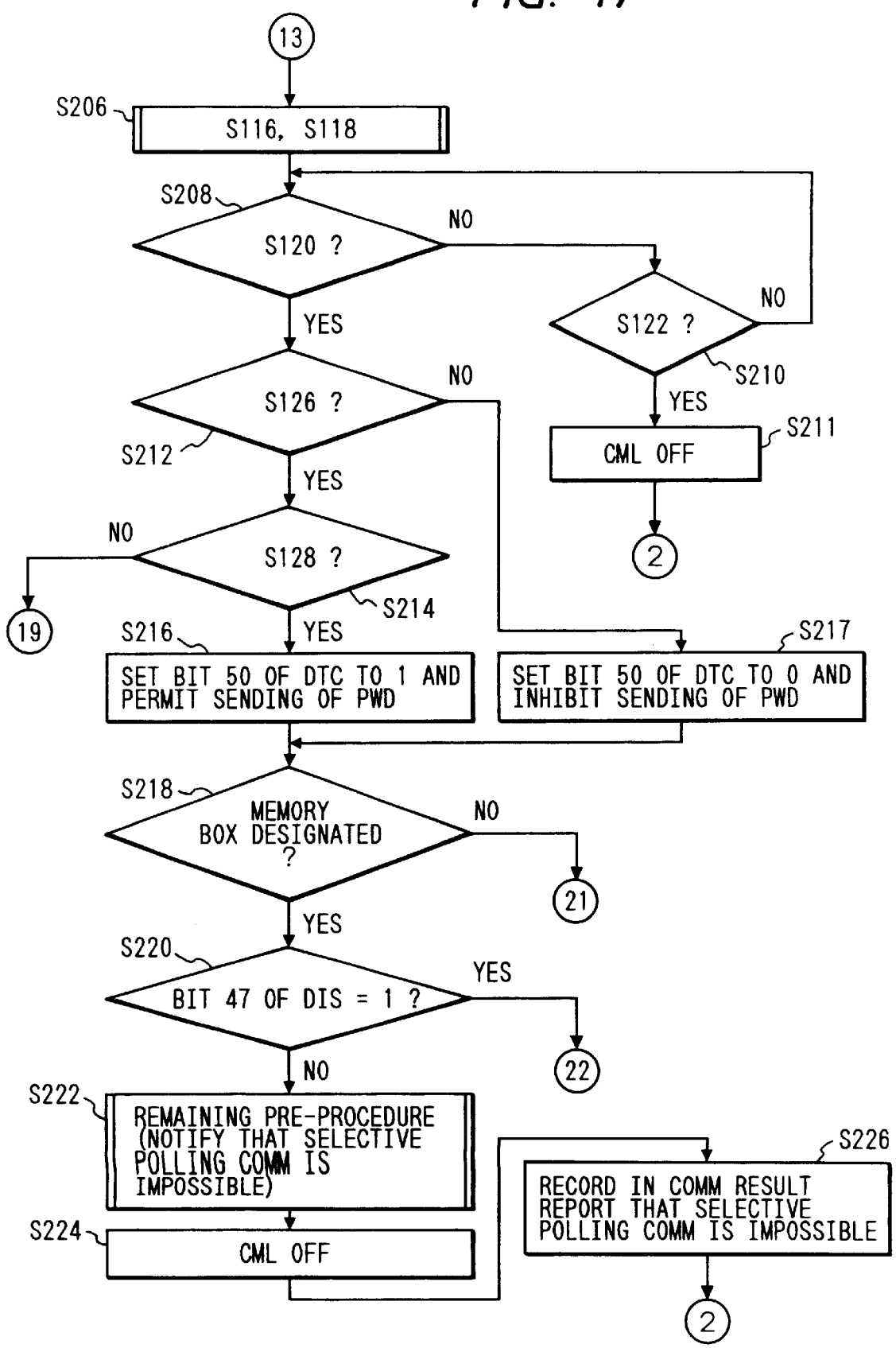
FIG. 17 is a flowchart showing operations of the fifth embodiment.
Figure 18:
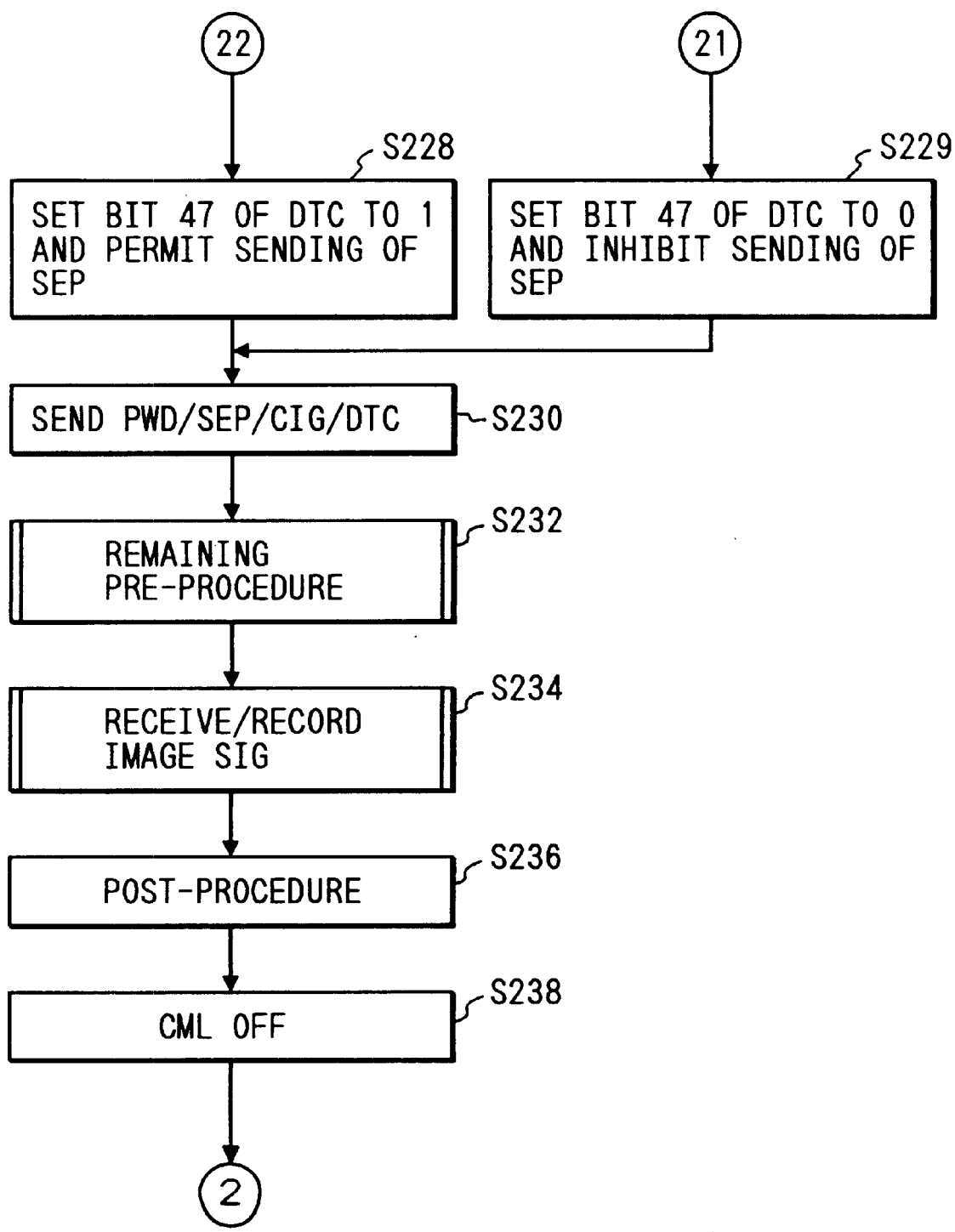
FIG. 18 is a flowchart showing operations of the fifth embodiment.

In step S176 of FIG. 15, the control circuit 36 determines whether the DTC signal is received. It proceeds to step S178 if received and to step S74 (FIG. 11) if not.

In step S178, the control circuit 36 determines whether bit 47 or 50 of FIF of the DTC signal is 1. It proceeds to step S180 if YES and to step S188 if NO.

In step S180, the control circuit 36 determines whether bit 47 of FIF of the DTC signal is 1 and also bit 50 thereof is 0, i.e. it checks for the combined state that a remote station designates the sending of the SEP signal in multiframe and that the remote station does not designate the sending of the PWD signal. It proceeds to step S182 if YES and to step S196 (FIG. 16) if NO.

In step S182, the control circuit 36 determines whether the SEP signal is received. When the SEP signal is received, it proceeds to step S184. When the SEP signal is not received, it determines that receiving the SEP signal has failed and returns to step S74 (FIG. 11).

In step S184, the control circuit 36 performs remaining pre-procedure. In step S186, it performs a polling send of data stored in the memory circuit 38 through the signal line 36h. Here, it performs a polling send of data stored in a memory box which is designated by the SEP signal.

In step S188, the control circuit 36 performs remaining pre-procedure. In step S190, it performs a polling send of data stored in the memory circuit 38 through the signal line 36h. Here, it performs a polling send of data stored in memory box 0. In step S192, it performs post-procedure. In step S194, it outputs a signal with signal level "0" to the signal line 36a to turn CML off and returns to step S44 (FIG. 10).

In step S196 (FIG. 16), the control circuit 36 determines whether bit 47 of FIF of the DTC signal is 0 and also bit 50 thereof is 1, i.e. it checks for the combined state that a remote station designates the sending of the PWD signal in multiframe and that the remote station does not designate the sending of the SEP signal. It proceeds to step S198 if YES and to step S202 if NO.

In step S198, the control circuit 36 determines whether the PWD signal is received. When the PWD signal is received, it proceeds to step S200. When the PWD signal is not received, it determines that receiving the PWD signal has failed and returns to step S74 (FIG. 11).

In step S200, the control circuit 36 determines whether the PWD signal and a password set in a station (registered in the circuit 52) accord. It proceeds to step S188 (FIG. 15) if they accord and to step S106 (FIG. 12) if not.

In step S202, the control circuit 36 determines whether the PWD signal is received. When the PWD signal is received, it proceeds to step S204. When the PWD signal is not received, it determines that receiving the PWD signal has failed and proceeds to step S74 (FIG. 11).

In step S204, the control circuit 36 determines whether the PWD signal and a password set in a station (registered in the circuit 52) accord. It proceeds to step S182 if they accord and to step S106 (FIG. 12) if not.

Figure 13:
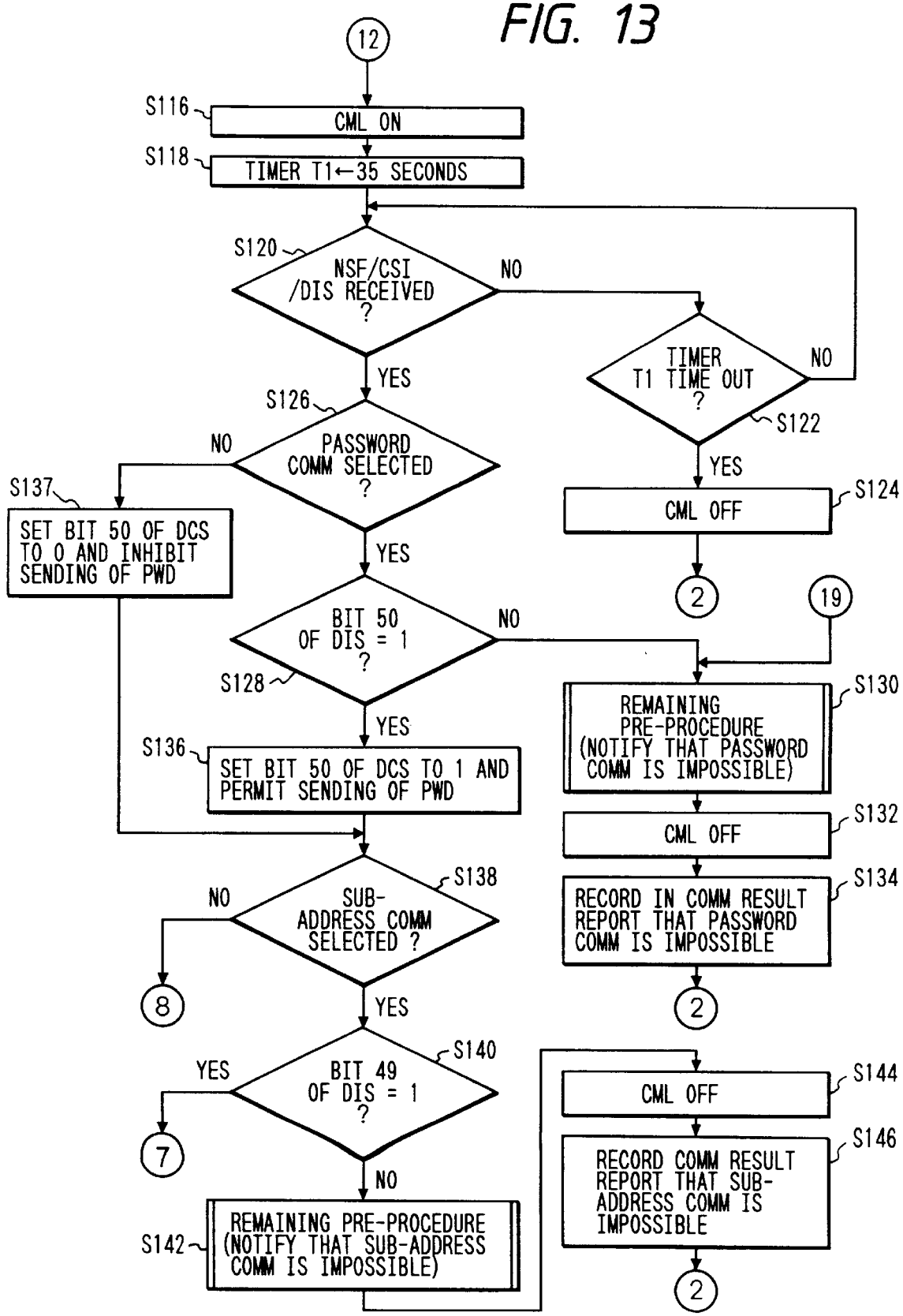
FIG. 13 is a flowchart showing operations of the fifth embodiment.
Figure 14:
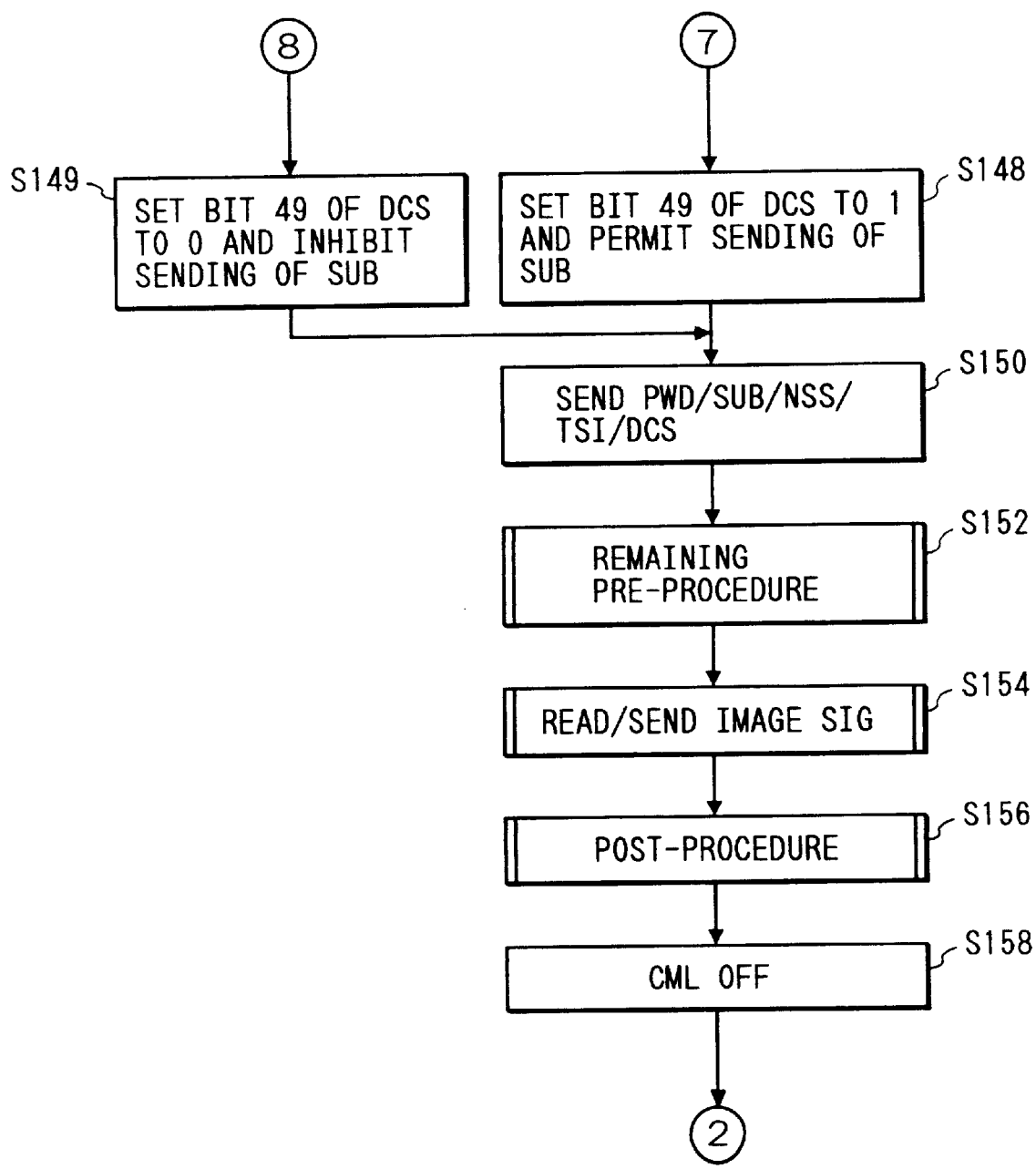
FIG. 14 is a flowchart showing operations of the fifth embodiment.

Step S206 (FIG. 17) represents steps S116 and S118 of FIG. 13. The control circuit 36 turns CML on and sets timer T1 to 35 seconds.

Step S208 represents step S120 of FIG. 13. When the NSF/CSI/DIS signal is received, the control circuit 36 proceeds to step S212. If not received, it proceeds to step S210.

Step S210 represents step S122 of FIG. 13. When a time out associated with timer T1 occurs, the control circuit 36 proceeds to step S211 to turn CML off. When no time out occurs, it proceeds to step S208.

Step S212 represents step S126 of FIG. 13. The control circuit 36 takes in data on the circuit 50. It proceeds to step S214 when password communication is selected and to step S217 if not.

Step S214 represents step S128 of FIG. 13. When bit 50 of FIF of DIS is 1, the control circuit 36 proceeds to step S216. When bit 50 of FIF of DIS is 0, it proceeds to step S130 (FIG. 13).

In step S216, the control circuit 36 sets bit 50 of FIF of the DTC signal to 1 to notify a remote station that the PWD signal is to be sent and permits the sending of the PWD signal.

In step S217, the control circuit 36 sets bit 50 of FIF of the DTC signal to 0 to notify a remote (or partner) station that the PWD signal is not to be sent and inhibits the sending of the PWD signal.

In step S218, the control circuit 36 takes in data outputted to the signal lines 46a, 42a, and 43a. It determines whether a memory box for polling send is designated, i.e. specifically, it checks for the combined state that the lamp 46 is lit and that a memory box for polling send is designated. It proceeds to step S220 if YES and to step S229 (FIG. 18) if NO.

In step S220, the control circuit 36 determines whether bit 47 of FIF of the DIS signal is 1, i.e. whether a remote station has the selective polling send function (function of receiving the SEP signal). It proceeds to step S228 (FIG. 18) if YES and to step S222 if NO.

In step S222, the control circuit 36 performs remaining pre-procedure. Here, it notifies that selective polling communication is impossible. In step S224, it outputs a signal with signal level "0" to the signal line 36a to turn CML off. In step S226, it records in the communication result report that selective polling communication is impossible.

In step S228, the control circuit 36 sets bit 47 of FIF of the DTC signal to 1 to notify a remote station that the SEP signal is to be sent and permits the sending of the SEP signal.

In step S229, the control circuit 36 sets bit 47 of FIF of the DTC signal to 0 to notify a remote station that the SEP signal is not to be sent and inhibits the sending of the SEP signal.

In step S230, it sends the PWD/SEP/CIG/DTC signal according to steps S216, S217, S228, and S229. Furthermore, in step S232, it performs remaining pre-procedure. In step S234, it polling-receives/records an image signal. Then, in step S236, it performs post-procedure. In step S238, it outputs a signal with signal level "0" to the signal line 36a to turn CML off and returns to step S44 (FIG. 10).

The SEP and SUB signals may be used for the designation or the like of a terminal connected to LAN or the like.

As described above, according to the fifth embodiment, which optional signal is to be added can be made definite by declaration in the DTC signal. Furthermore, control when a DTC group signal is received can be made definite on the side which has sent an initial identification signal.

Sixth Embodiment

The fifth embodiment has proposed a facsimile apparatus which sends again an initial identification signal when a receiving station side or polling send station side has received the notification of the presence of an optional signal, but has failed to receive a frame of the designated optional signal in such communication that the presence/absence of an optional signal is notified in a receive command signal or transmit command signal.

However, after the retransmitted initial identification signal is received, a transmitting station side resends the PWD/SUB/NSS/TSI/DCS signal, or a polling receive station side resends the PWD/SEP/NSC/CIG/DTC signal. This causes a longer procedure time.

In this connection, the German Standard has involved the following drawback: in the case where after sending a DTC group signal, the polling receive side receives a DIS group signal without receiving a DCS group signal from the polling send side, it sends a DCN signal to terminate communication. That is, there has been a drawback that communication is disabled when facsimile in Japan is a polling send side and facsimile in Germany is a polling receive side.

The present embodiment avoids a delay in communication procedure and disabled communication when a receiving station side or polling send station side has received the notification of the presence of an optional signal, but has failed to receive a frame of the designated optional signal in such communication that the presence/absence of an optional signal is notified in a receive command signal or transmit command signal.

Figure 20B:
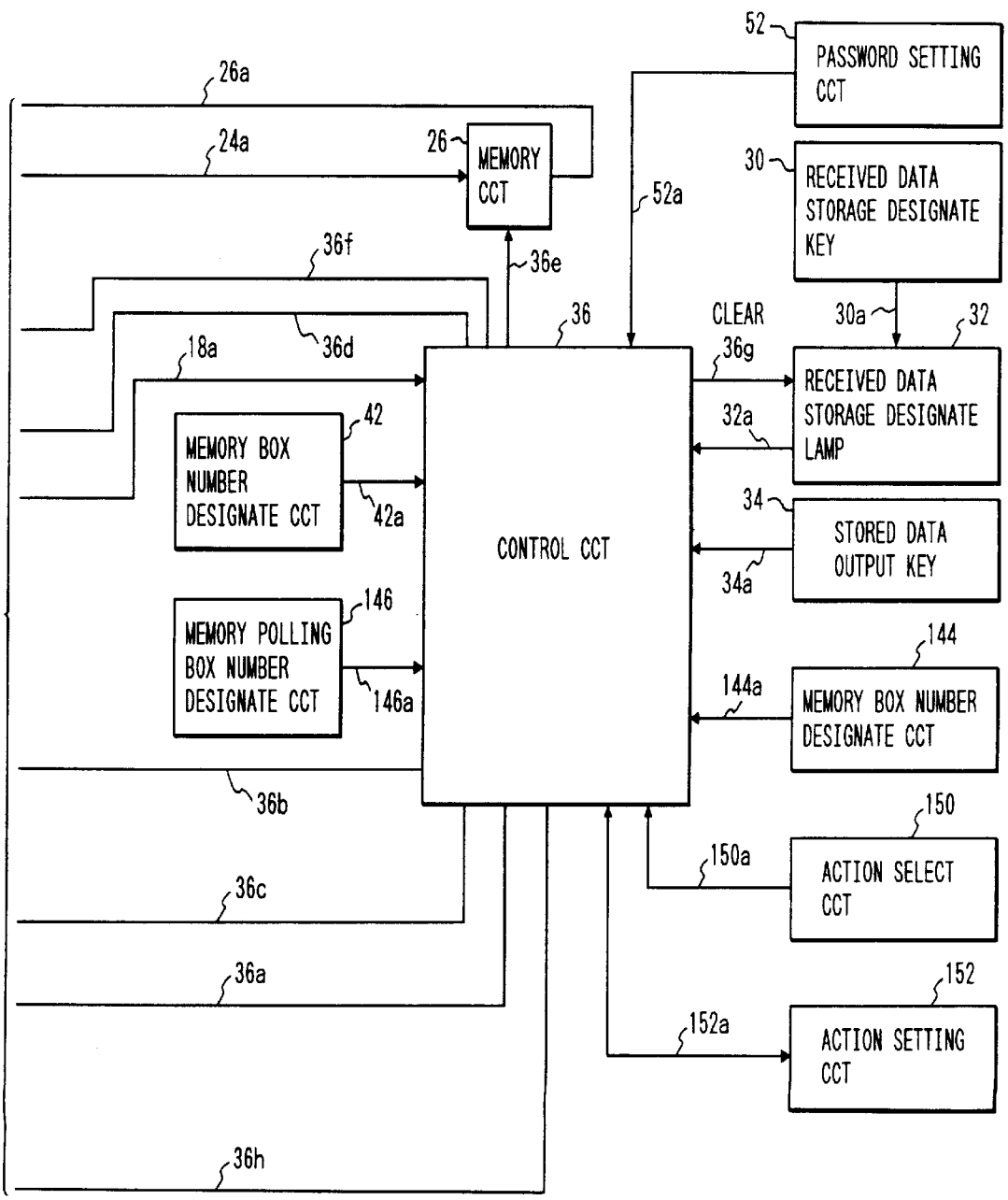
FIG. 20 is comprised of FIGS. 20A and 20B illustrating block diagrams showing the construction of a facsimile apparatus according to a sixth embodiment.

FIG. 20 is a block diagram showing a sixth embodiment of the present invention.

The description of the sixth embodiment only covers what is different from the fifth embodiment. The same features as those of the fifth embodiment are denoted by common reference numerals, and description thereof is omitted.

A memory box number designate circuit 144 is used to designate a memory box number in order to specify a memory box for outputting stored data therefrom when the output of stored data is selected by the stored data output key 34. The designated memory box number is outputted to a signal line 144a.

A memory polling box number designate circuit 146 is used to designate a memory box number for memory polling send when a memory polling receive is to be executed. The designated memory box number is outputted to the signal line 146a. A selective polling signal is used for notification from a memory polling receive station side to a memory polling send station side.

An action setting circuit 152 is used to set a password signal for a local station. When a password is set, at the time of sending and at memory polling receive, the password is sent. Also, at the time of receiving and at memory polling send, a password signal from a remote station, if received, is compared with the password set in the local station. If they accord, receiving and memory polling send will be executed. When a password is not set, a password signal is not sent at the time of sending and at memory polling receive. Here, the password signal is outputted to a signal line 152a.

When a local station is a receiving station side or polling send station side, an action select circuit 150 is used to select any one of (A) re-sending an initial identification signal, (B) sending a CRP signal, and (C) waiting for a signal from a remote station, in the case where the local station has received a digital command signal or digital transmit command signal declaring the presence of an optional signal, but has failed to receive the declared optional signal. The selected data is outputted to a signal line 150a.

In the same case as for the action select circuit 150 described above, the action setting circuit 152 is used to set an action ((1) re-sending an initial identification signal or (2) sending a CRP signal or (3) waiting for a signal from a remote station) to be selected according to a count of receiving a digital command signal or digital transmit command signal. The set data is outputted to a signal line 152a.

In addition to processes of the fifth embodiment, the control circuit 36 in the sixth embodiment exercises control according to an action selected from among (A) re-sending a DIS group signal, (B) sending a CRP signal, and (C) waiting for a receive command signal to be retransmitted, in the case where a local station has received a DCS signal declaring the inclusion of a sub-address signal or password signal, but has failed to receive the declared sub-address signal or password signal.

FIGS. 21 to 26 are flowcharts showing operations of the control circuit 36 in the present embodiment.

In step S50 (FIG. 21), the control circuit 36 determines whether reception or polling send is selected. It proceeds to step S60 if selected and to step S52 if not.

In step S52 (FIG. 21), the control circuit 36 determines whether transmission is selected. It proceeds to step S116 (FIG. 25) if selected and to step S172 if not.

In step S172 (FIG. 21), the control circuit 36 determines whether selective polling receive is selected. It proceeds to step S206 if selected and to step S54 if not.

Figure 24:
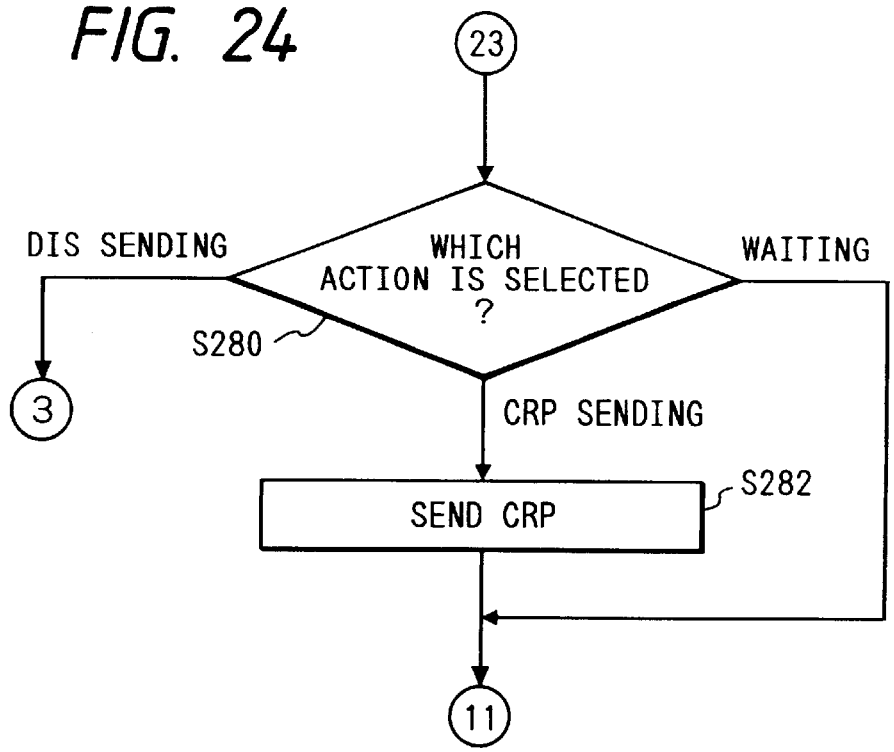
FIG. 24 is a flowchart showing operations of the sixth embodiment.

In step S82, the control circuit 36 determines whether the SUB signal is received. When the SUB signal is received, it proceeds to step S84 and subsequent steps for reception in memory. When the SUB signal is not received, it determines that receiving the SUB signal has failed and proceeds to step S280 (FIG. 24).

In step S94, the control circuit 36 determines whether the PWD signal is received. When the PWD signal is received, it proceeds to step S96. When the PWD signal is not received, it determines that receiving the PWD signal has failed and proceeds to step S280 (FIG. 24).

In step S112, the control circuit 36 determines whether the PWD signal is received. When the PWD signal is received, it proceeds to step S114. When the PWD signal is not received, it determines that receiving the PWD signal has failed and proceeds to step S280 (FIG. 24).

In step S280 (FIG. 24), the control circuit 36 takes in data outputted to the signal line 150a to read data generated by the action select circuit 150. When a local station has received a digital command signal declaring the presence of an optional signal, but has failed to receive the designated optional signal, it determines which action is selected, (A) re-sending an initial identification signal, (B) sending a CRP signal, or (C) waiting for a receive command signal to be retransmitted. When re-sending an initial identification signal is selected, it proceeds to step S74 of FIG. 22. When waiting for a signal to be sent from a remote station is selected, it proceeds to step S68 of FIG. 22. When sending a CRP signal is selected, it sends the CRP signal in step S282 and then proceeds to step S68 of FIG. 3.

Figure 27A:
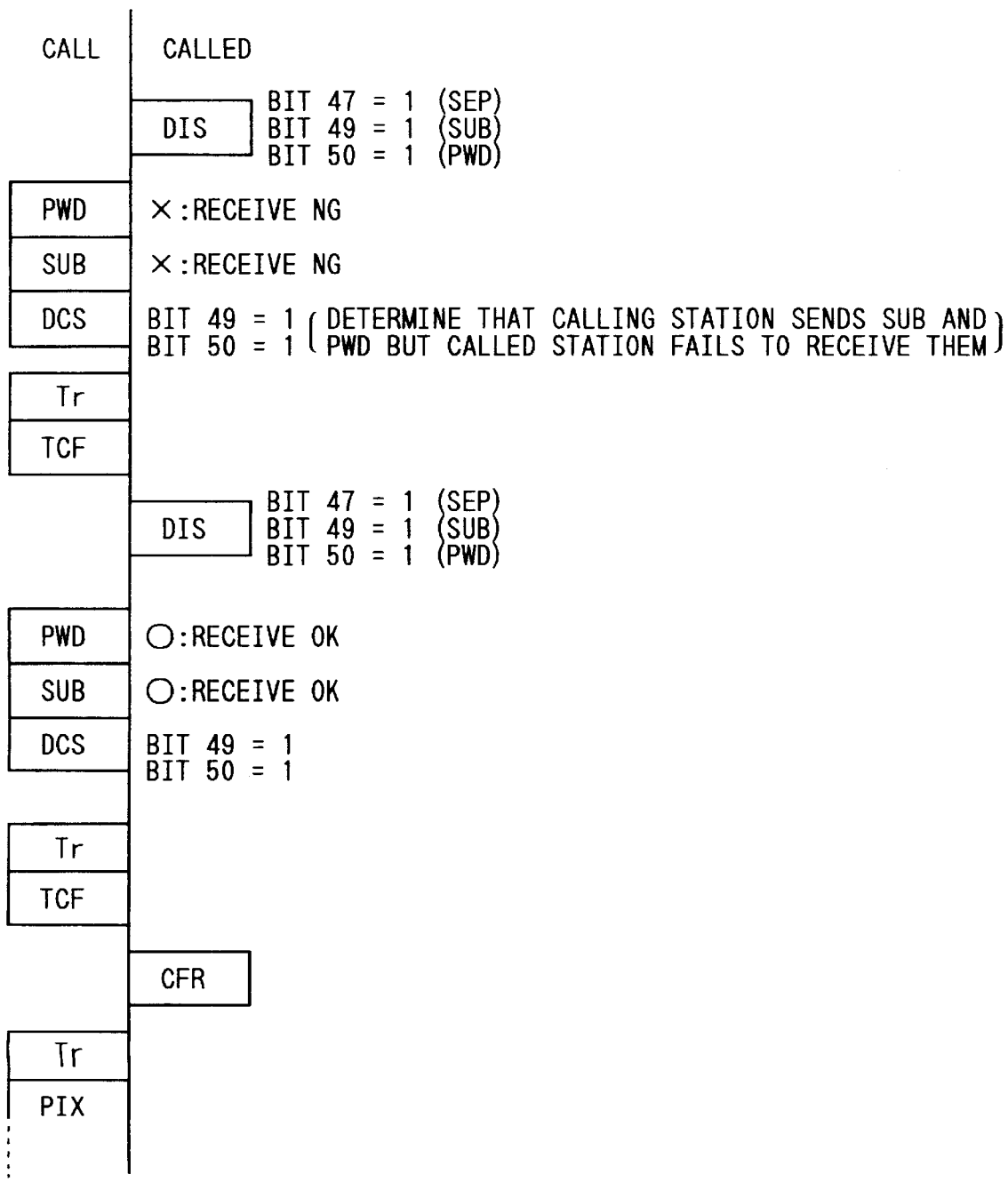
FIGS. 27A, 27B, and 27C are charts showing transmission and reception of procedure signals of the sixth embodiment.
Figure 27B:
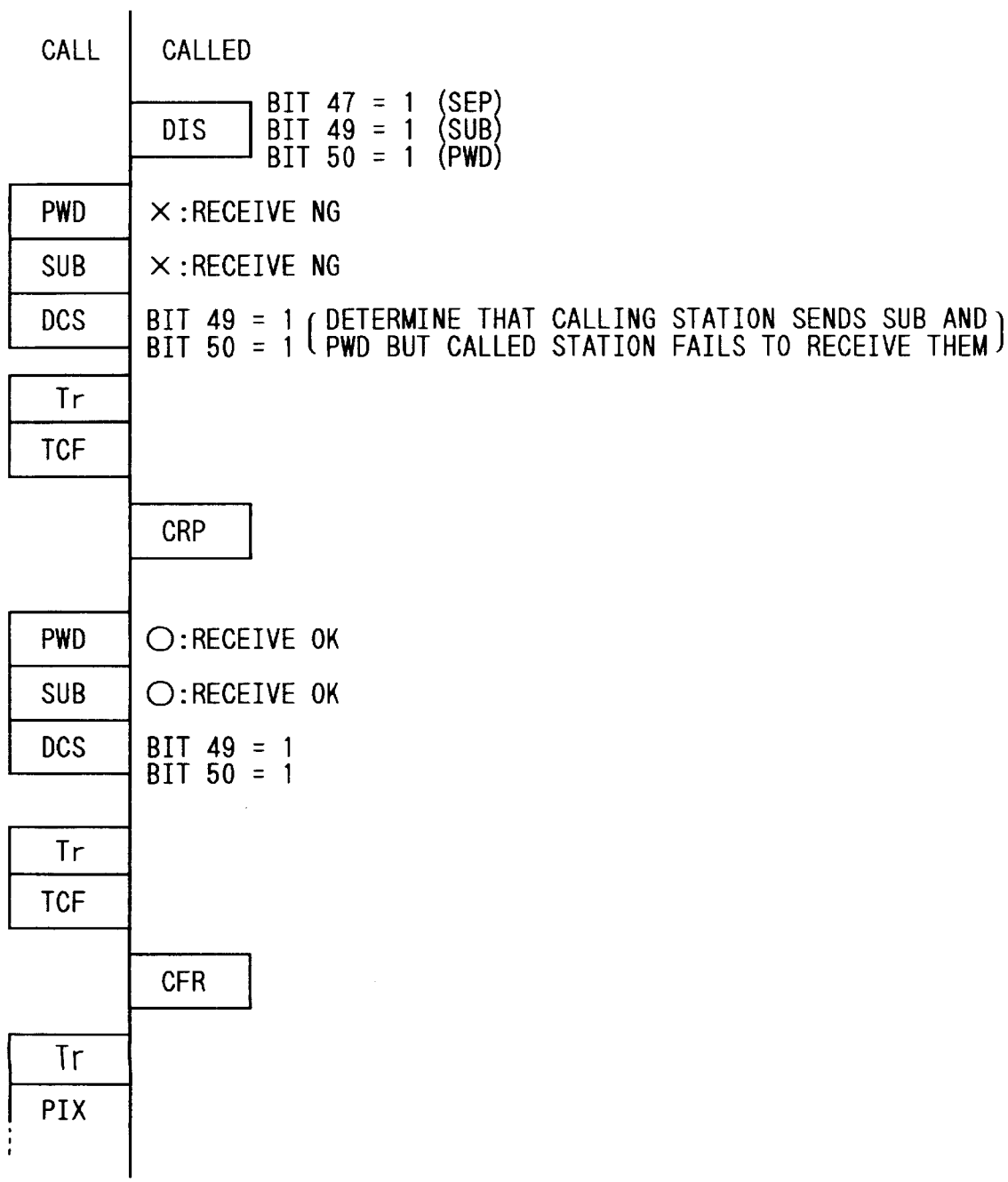
Figure 27C:
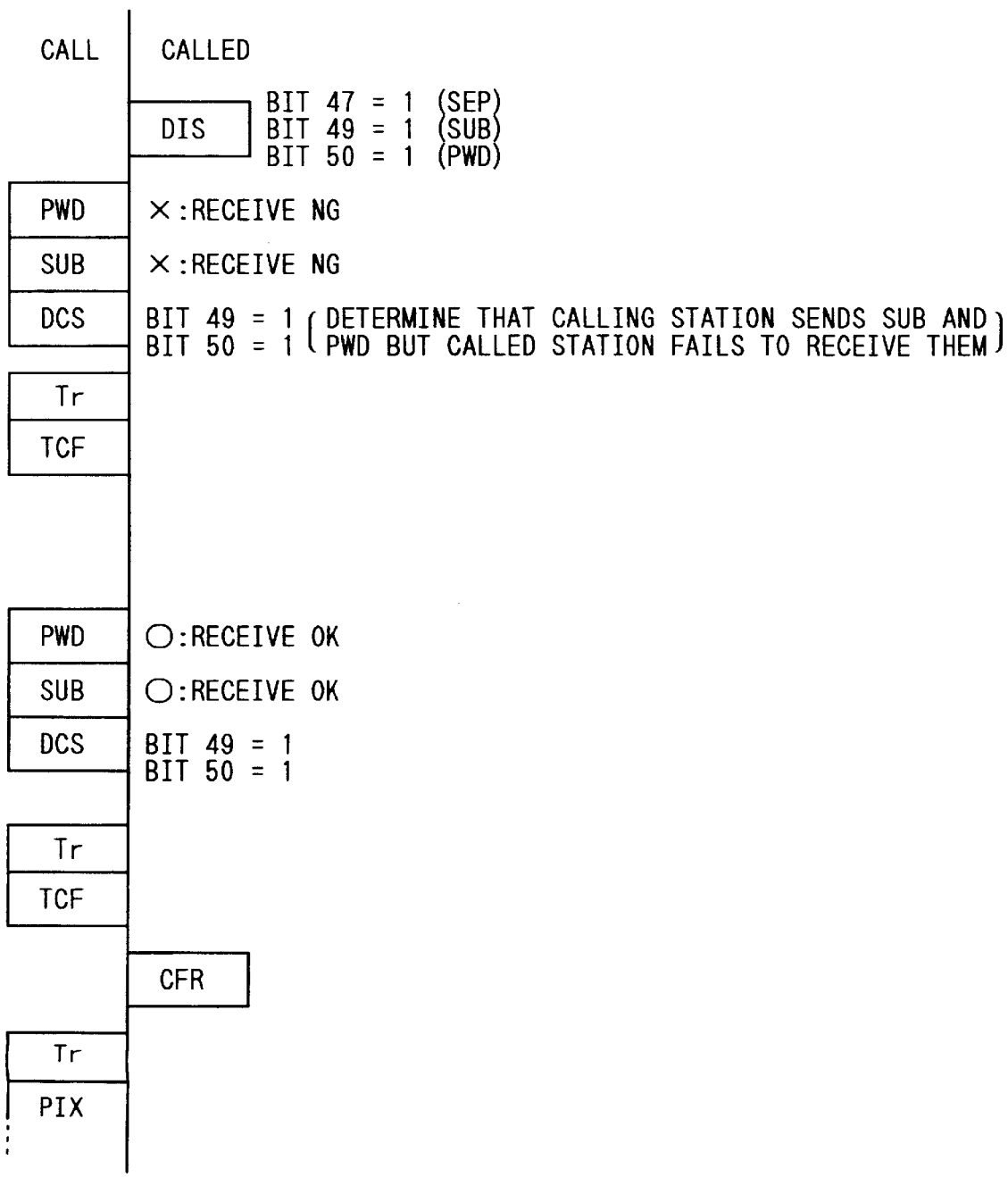

FIGS. 27A, 27B and 27C show the manner of exchanging procedure signals including DCS. FIG. 27A shows case (A) of re-sending an initial identification signal. FIG. 27B shows case (B) of sending a CRP signal. FIG. 27C shows case (C) of waiting for a receive command signal to be retransmitted.

Next, processes of the control circuit 36 in receiving DTC will be described.

As in the fifth embodiment described above, a digital transmit command signal (DTC signal) is used to notify a remote station whether an optional signal is included in a transmit command signal. In the sixth embodiment, the polling send station side can select any one of (A) re-sending an initial identification signal, (B) sending a CRP signal, and (C) waiting for a transmit command signal to be retransmitted, in the case where the polling send station side has received a digital transmit command signal declaring the presence of an optional signal, but has failed to receive the declared optional signal.

FIGS. 28 to 33C illustrate only those control features of the sixth embodiment different from those of the fifth embodiment described above. The same control features are denoted by common reference numerals, and description thereof is omitted.

Figure 30:
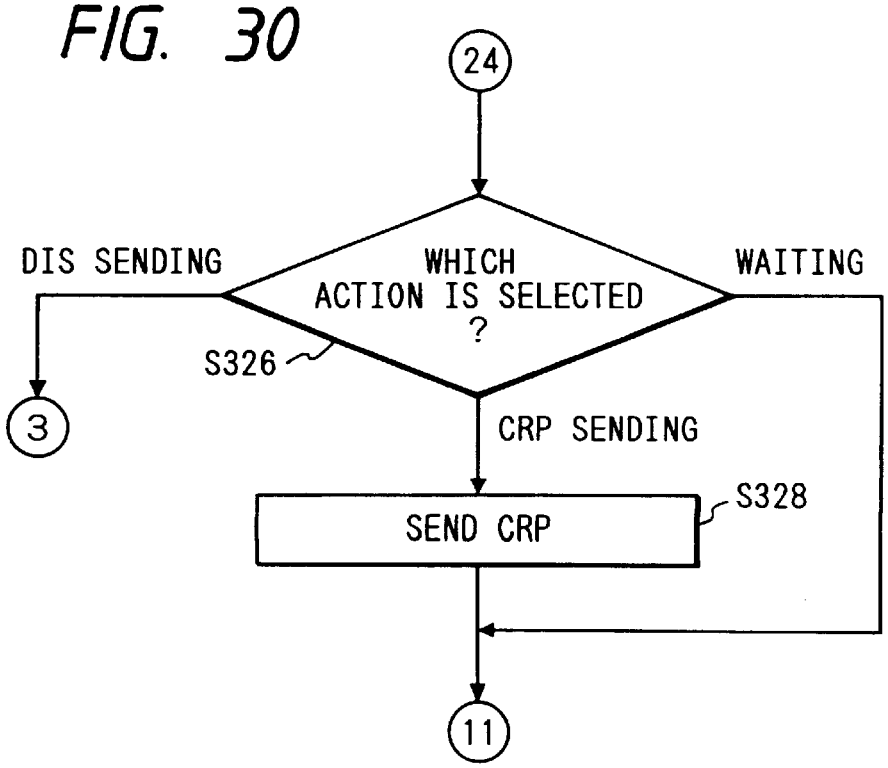
FIG. 30 is a flowchart showing operations of the sixth embodiment.
Figure 25:
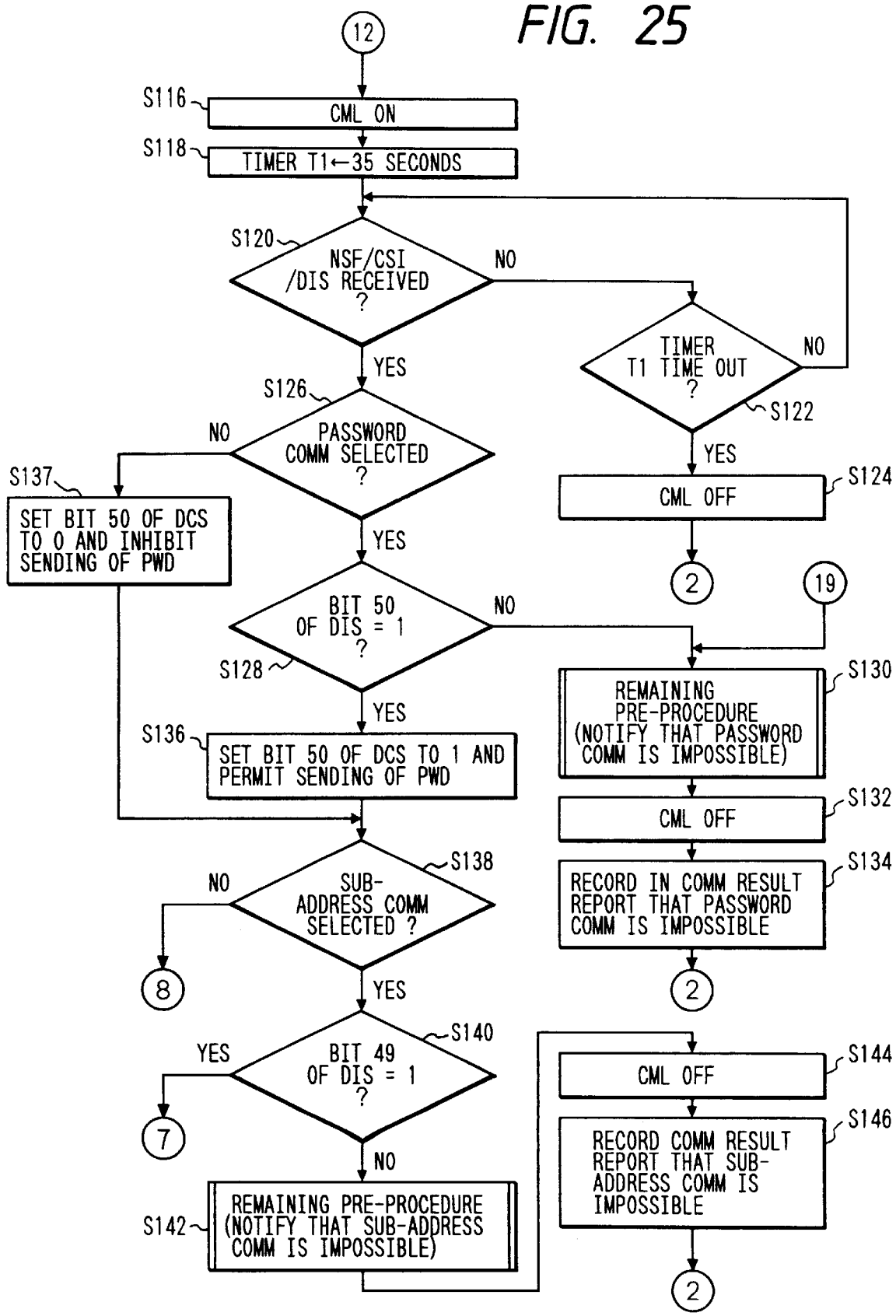
FIG. 25 is a flowchart showing operations of the sixth embodiment.
Figure 26:
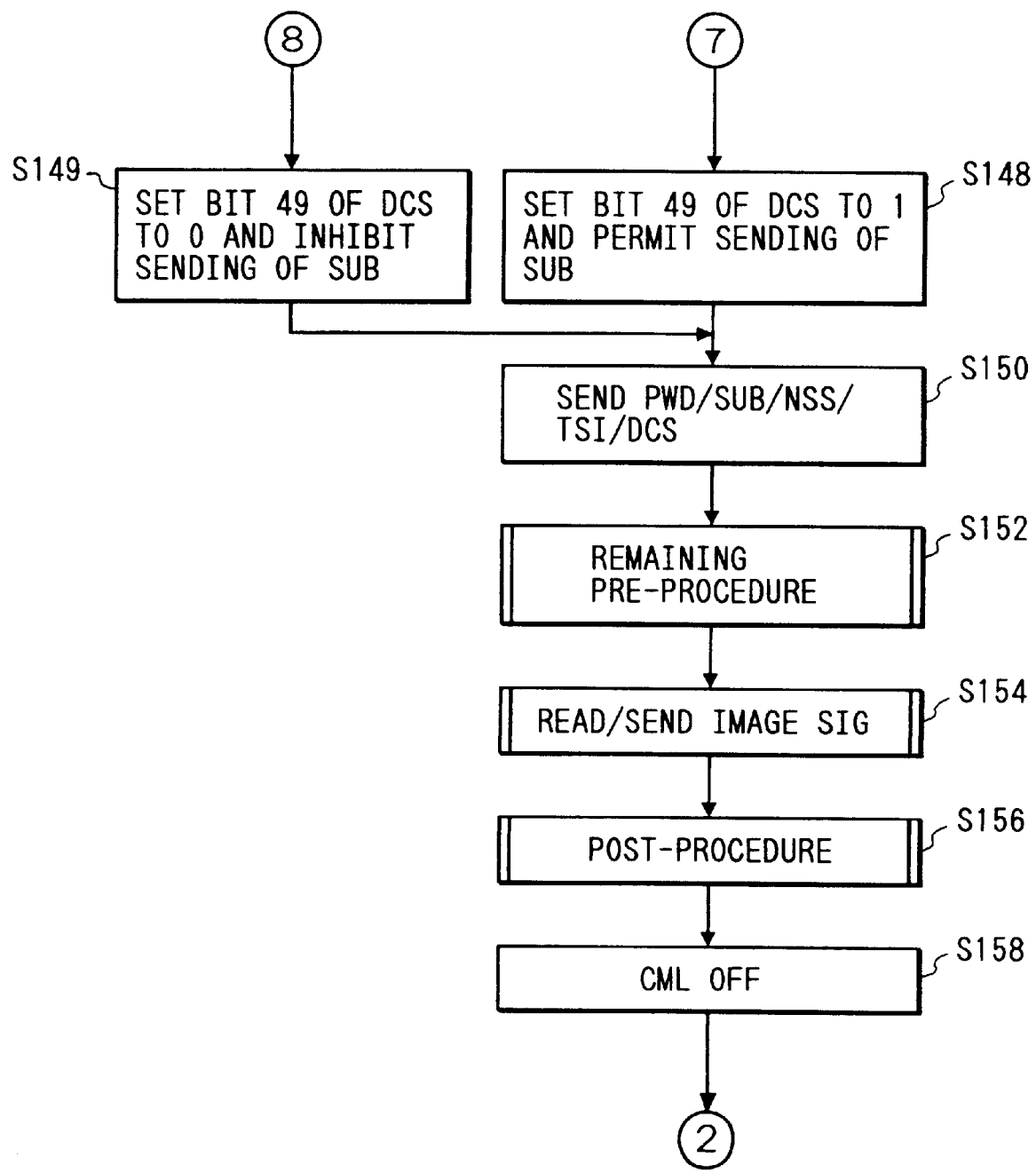
FIG. 26 is a flowchart showing operations of the sixth embodiment.

In step S182, the control circuit 36 determines whether the SEP signal is received. When the SEP signal is received, it proceeds to step S184 and subsequent steps to execute a memory polling send of data stored in a memory box designated by the SEP signal. When the SEP signal is not received, it determines that receiving the SEP signal has failed and proceeds to step S326 (FIG. 30).

In step S198, the control circuit 36 determines whether the PWD signal is received. When the PWD signal is received, it proceeds to step S200. When the PWD signal is not received, it determines that receiving the PWD signal has failed and proceeds to step S326 (FIG. 30).

In step S202, the control circuit 36 determines whether the PWD signal is received. When the PWD signal is received, it proceeds to step S204. When the PWD signal is not received, it determines that receiving the PWD signal has failed and proceeds to step S326 (FIG. 30).

Figure 22:
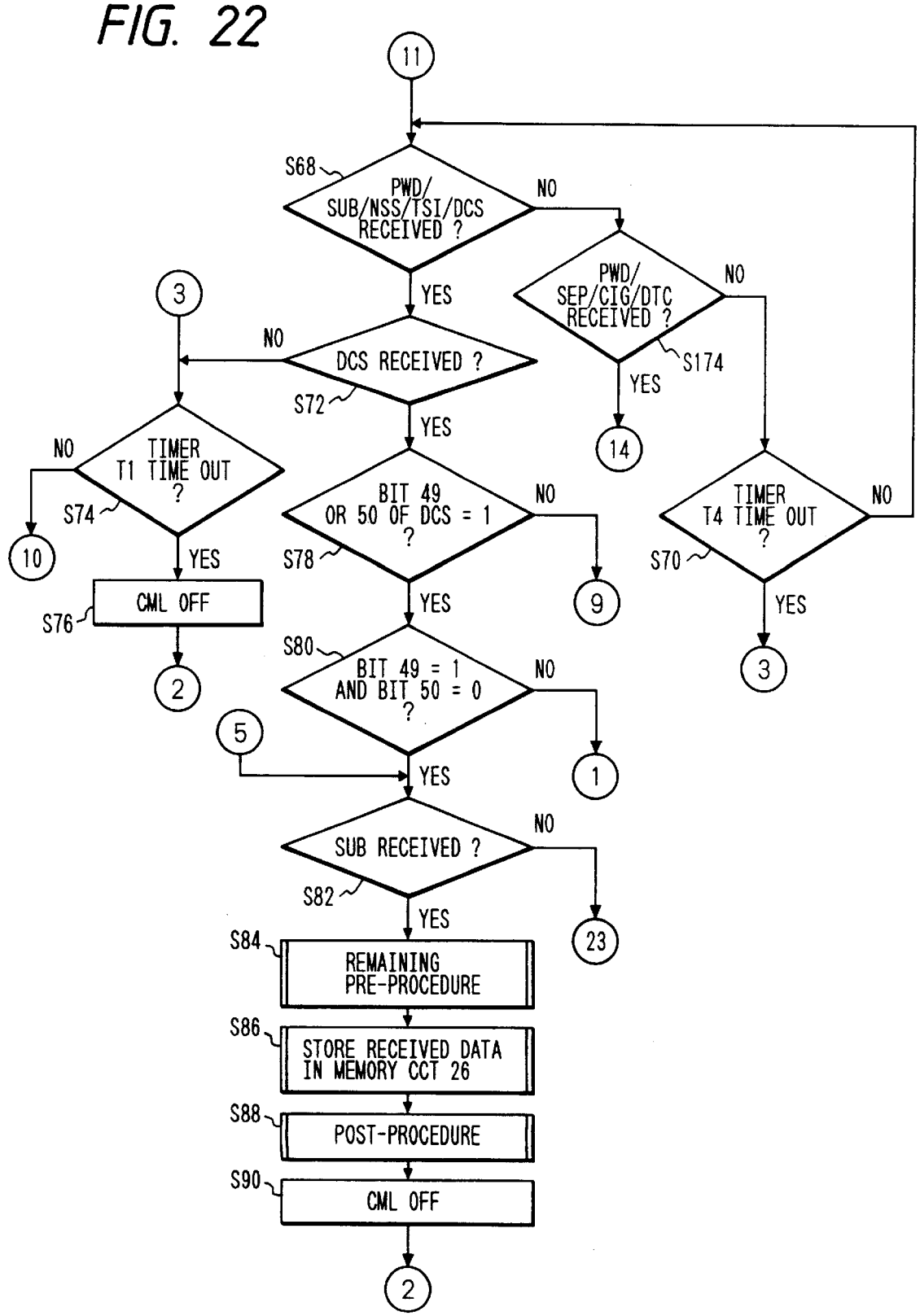
FIG. 22 is a flowchart showing operations of the sixth embodiment.

In step S326 (FIG. 30), the control circuit 36 takes in data outputted to the signal line 150a to read data generated by the action select circuit 150. When a local station has received a digital transmit command signal declaring the presence of an optional signal, but has failed to receive the designated optional signal, it determines which action is selected, (A) re-sending an initial identification signal, (B) sending a CRP signal, or (C) waiting for a receive command signal to be retransmitted. When re-sending an initial identification signal is selected, it proceeds to step S74 of FIG. 22. When waiting for a signal to be sent from a remote station is selected, it proceeds to step S68 of FIG. 22. When sending a CRP signal is selected, it sends the CRP signal in step S328 and then proceeds to step S68 (FIG. 22).

Figure 33A:
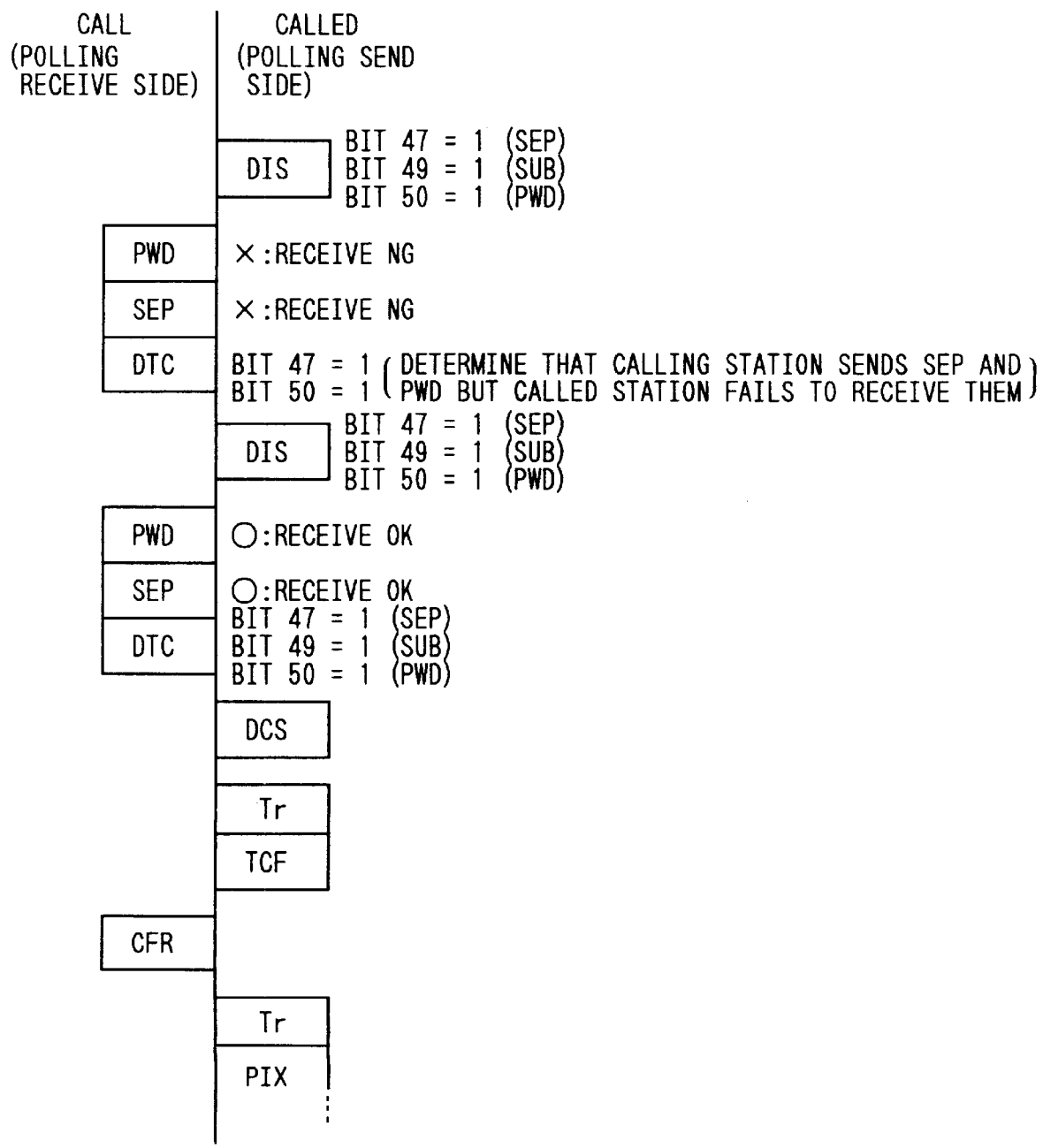
FIGS. 33A, 33B, and 33C are charts showing transmission and reception of procedure signals of the sixth embodiment.
Figure 33B:
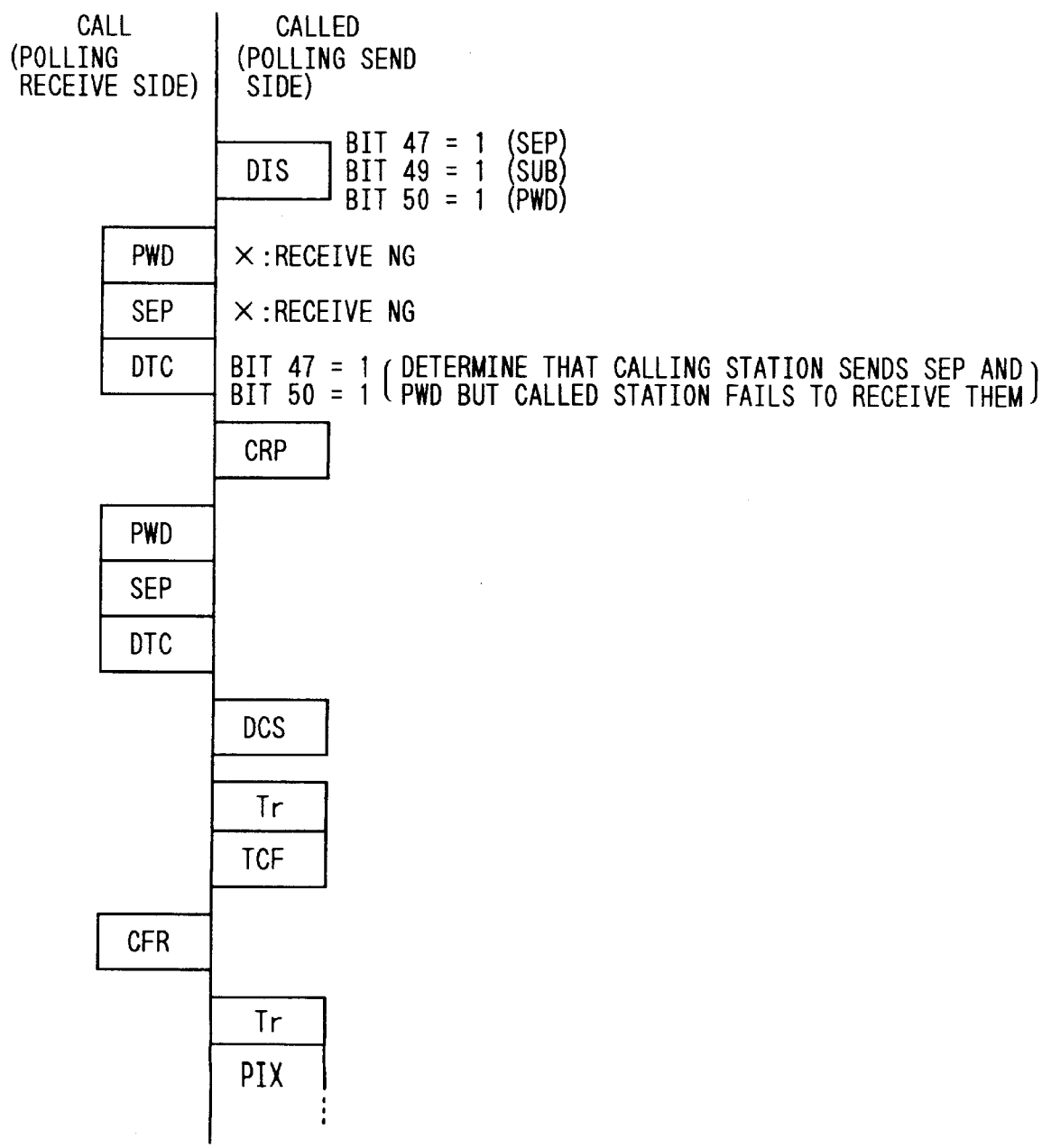
Figure 33C:
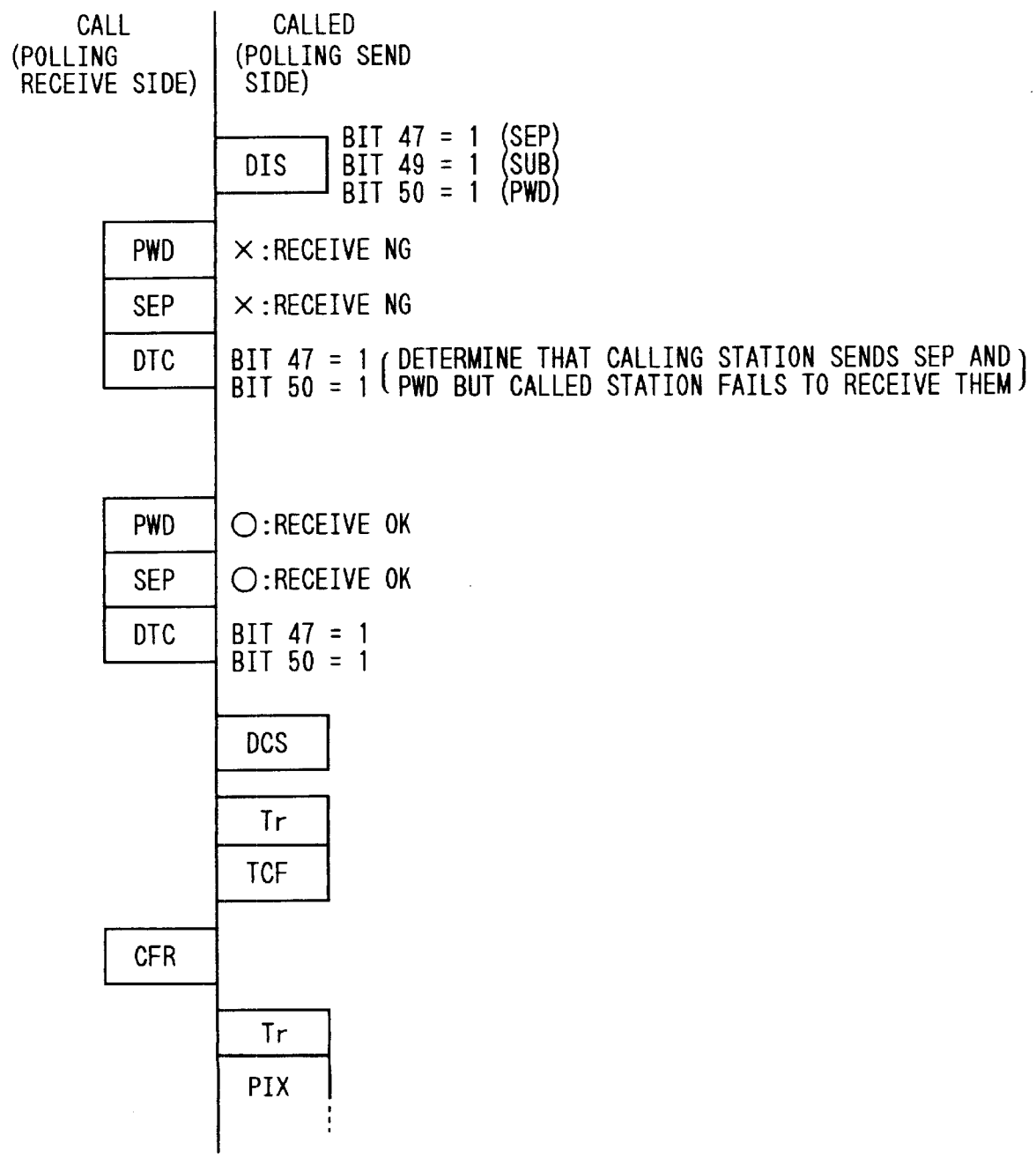

FIGS. 33A, 33B and 33C show the manner of exchanging procedure signals including DTC. FIG. 33A shows case (A) of re-sending an initial identification signal. FIG. 33B shows case (B) of sending a CRP signal. FIG. 33C shows case (C) of waiting for a transmit command signal to be retransmitted.

As described above, the sixth embodiment provides control features to select therefrom for the case where the receiving station side has received a digital command signal or digital transmit command signal declaring the presence of an optional signal, but has failed to receive the declared optional signal. By sending a CRP signal or waiting for a DCS or DTC group signal to be retransmitted, a communication time can be reduced, and an easy operation is implemented.

Also, as a seventh embodiment, in the construction of the sixth embodiment described above, whether a non-standard facilities set-up (NSS) signal is included in a receive command signal may be notified to a remote station by a digital command signal (DCS), for example, bit 67 of FIF thereof.

For example, this is effective where the DCS signal is used to designate the standard or fine mode and the NSS signal is used to designate the super fine mode.

Figure 34:
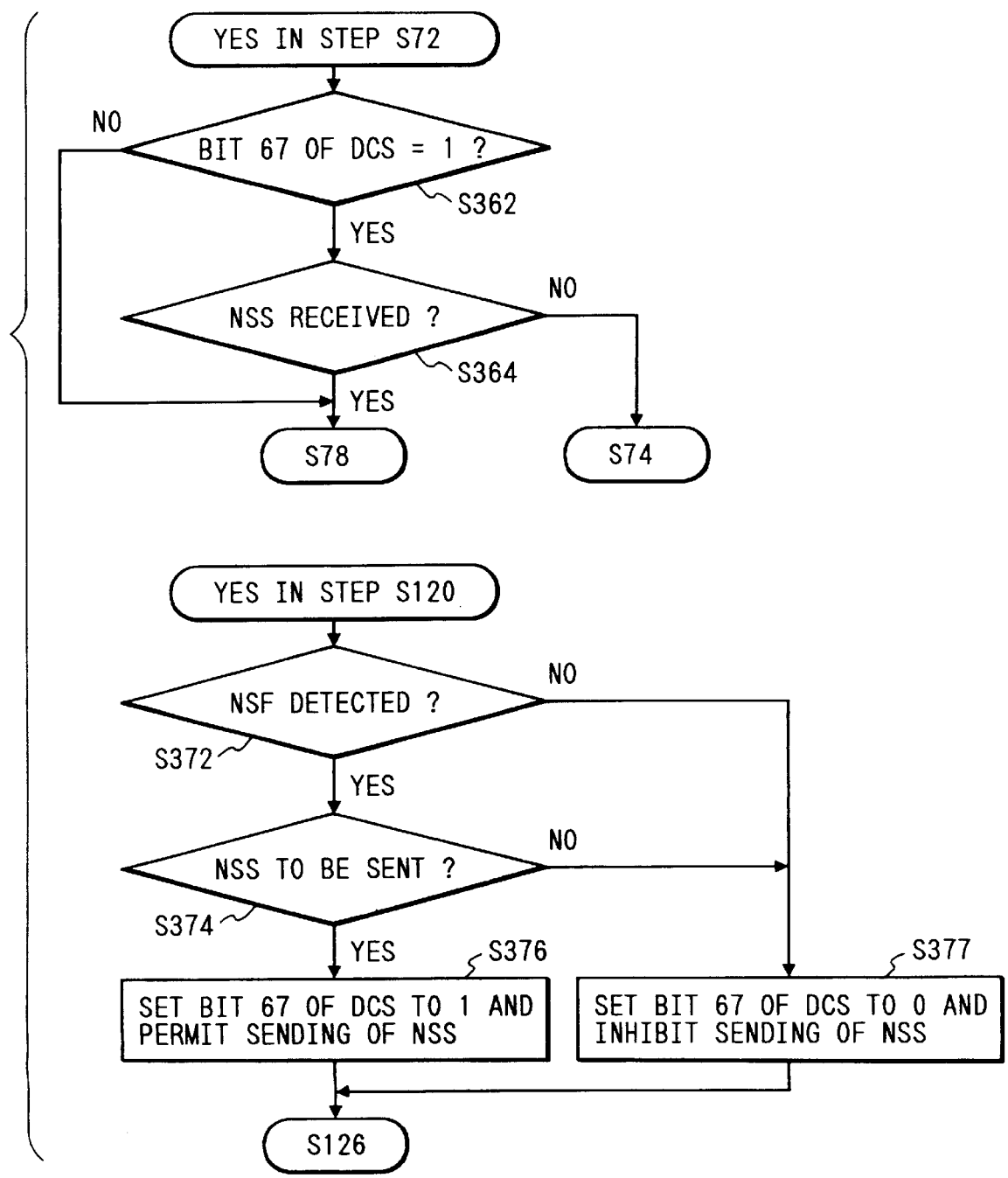
FIG. 34 is a flowchart showing operations of a seventh embodiment.

FIG. 34 is a flowchart showing a different part of control in this case from the sixth embodiment described above.

First, if YES in step S72 (FIG. 22) described above, the control circuit 36 proceeds to step S362 (FIG. 34). In step S362, it determines whether bit 67 of FIF of the DCS signal is 1, i.e. whether the NSS signal is also sent together with DCS. It proceeds to step S364 if YES and to step S78 (FIG. 22) if NO.

In step S364, the control circuit 36 determines whether the NSS signal is received. It proceeds to step S78 (FIG. 22) if received and to step S74 (FIG. 22) if not.

Also, if YES in step S120 (FIG. 25) described above, the control circuit 36 proceeds to step S372 (FIG. 34). In step S372, it determines whether the NSF signal is received. It proceeds to step S374 if received and to step 5377 if not.

In step S374, the control circuit 36 determines whether the NSS signal is to be sent. It proceeds to step S376 when the NSS signal is sent and to step S377 when the NSS signal is not sent.

In step S176, the control circuit 36 sets bit 67 of FIF of the DCS signal to 1 to designate the sending of the NSS signal to a remote receiving station and permits the sending of the NSS signal.

In step S377, the control circuit 36 sets bit 67 of FIF of the DCS signal to 0 to designate not to send the NSS signal to a remote receiving station and inhibits the sending of the NSS signal.

As an eighth embodiment of the present invention, in the sixth embodiment, whether a transmitting subscriber identification (TSI) signal is included in a receive command signal may be notified to a remote station by a digital command signal (DCS), for example, bit 68 of FIF thereof. Operations in this case are substantially identical to those of the seventh embodiment illustrated above in FIG. 34, and hence description thereof is omitted.

Furthermore, as a ninth embodiment of the present invention, an initial identification signal may be applied to the seventh and eighth embodiments described above, and whether a non-standard facilities (NSF) signal or a called station identification (CSI) signal is included may be notified to a remote station by a digital identification signal (DIS). For example, the presence or absence of NSF is assigned to bit 67 of FIF of DIS, and the presence or absence of CSI is assigned to bit 68 of FIF of DIS.

Also, as a tenth embodiment of the present invention, a transmit command signal may be applied to the seventh and eighth embodiments described above, and whether a non-standard facilities command (NSC) signal or a calling subscriber identification (CIG) signal is included may be notified to a remote station by a digital transmit command (DTC) signal. For example, the presence or absence of NSC is assigned to bit 67 of FIF of DTC, and the presence or absence of CIG is assigned to bit 68 of FIF of DTC.

Next, as an eleventh embodiment of the present invention, in control of the above mentioned embodiments, when the receiving station side has received a digital command signal declaring the presence of an optional signal, but has failed to receive the designated optional signal or when the polling send station side has received a digital transmit command signal declaring the presence of an optional signal, but has failed to receive the designated optional signal, an action in response to the reception of the receive command signal or transmit command signal may be changed according to a count of reception.

Specifically, when receiving an optional signal has failed in spite of the declaration of the presence of the optional signal, a local station waits for a receive command signal or transmit command signal to be retransmitted until they are received twice. However, in response to the third reception of them, the local station resends an initial identification signal. A series of actions for the three receptions is repeated.

Usually, a line remains connected even when the local station does not respond to up to the second reception of a DTC signal sent from a remote station. Thus, when the local station fails to properly receive an optional signal, it does not respond to up to the second reception of the DTC signal. In response to the third reception of the DTC signal, it resends DIS. This reduces time required for two times of reception of the DTC signal. Since the DIS signal is sent in response to the third reception of the DTC signal, the line is disconnected, and hence no communication error occurs.

Figure 35:
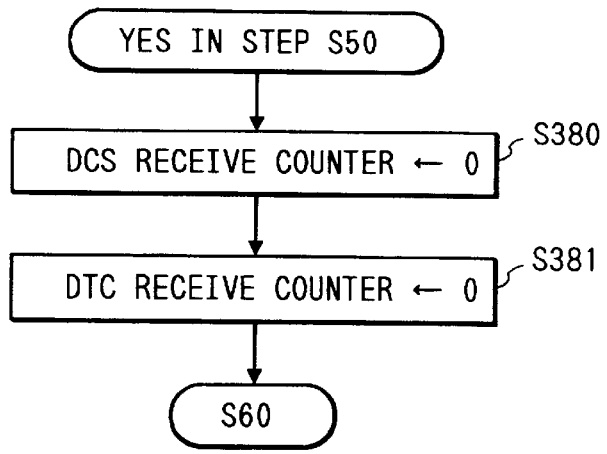
FIG. 35 is a flowchart showing operations of an eleventh embodiment.
Figure 36:
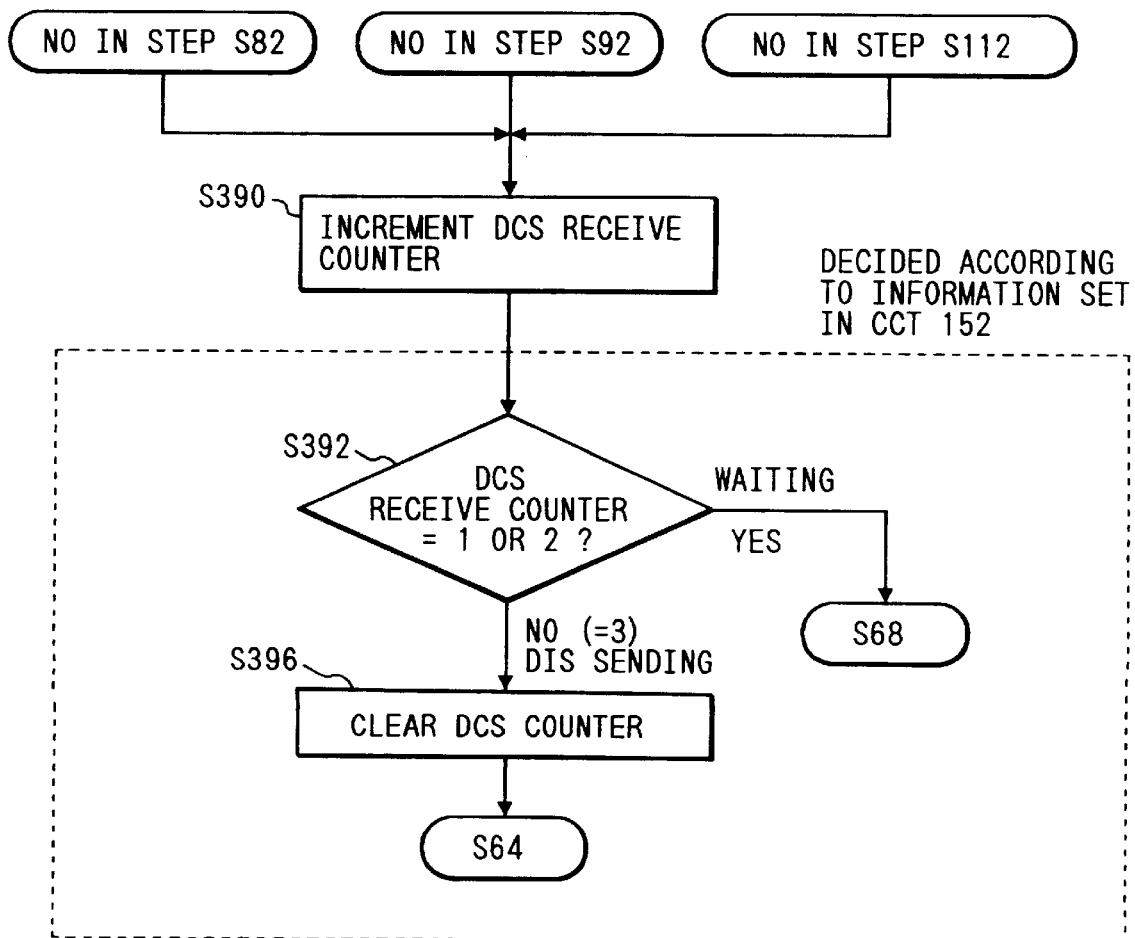
FIG. 36 is a flowchart showing operations of an eleventh embodiment.
Figure 37:
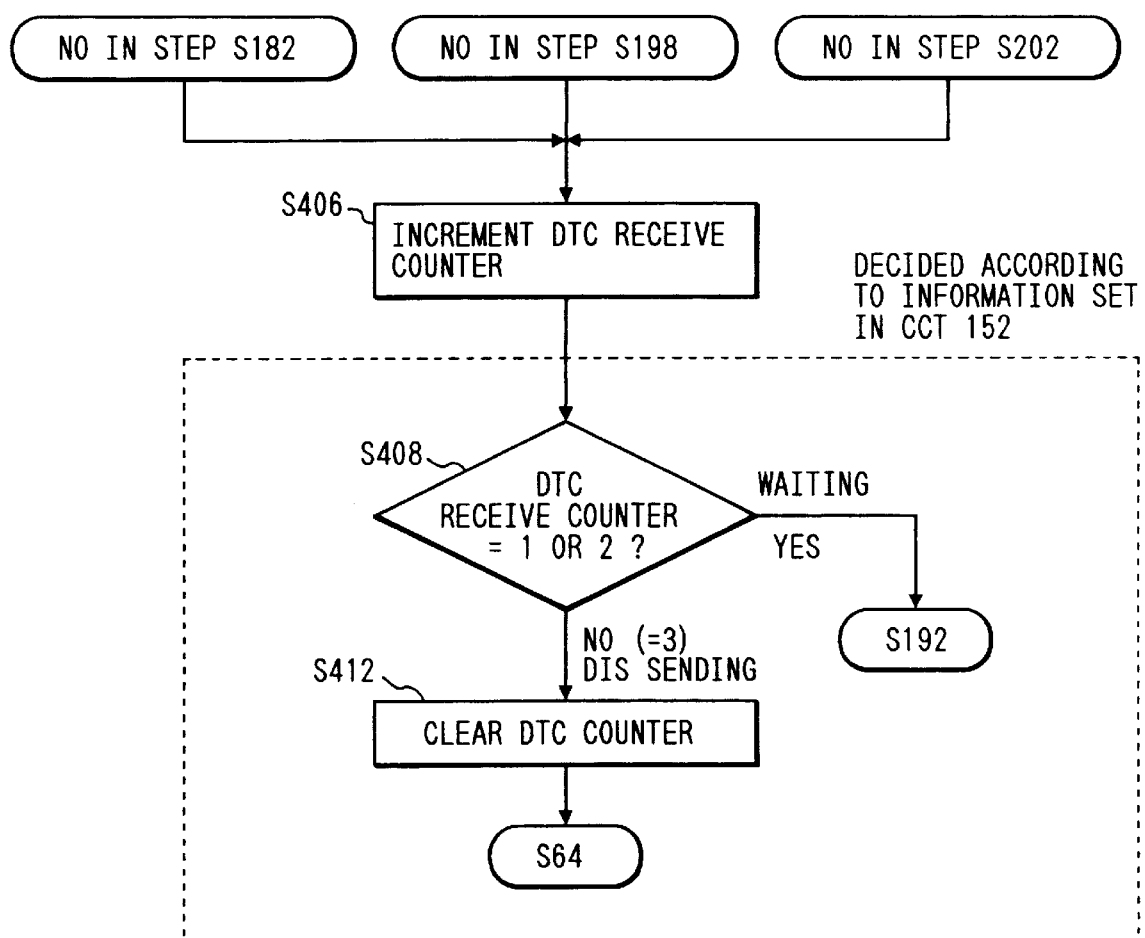
FIG. 37 is a flowchart showing operations of an eleventh embodiment.

FIGS. 35 and 36 are flowcharts showing such part of control at reception of the DCS signal in the eleventh embodiment that is different from the sixth embodiment described above. Also, FIG. 37 is a flowchart showing such part of control at reception of the DTC signal in the eleventh embodiment that is different from the sixth embodiment described above.

First, suppose that actions corresponding to a count of reception of a DCS group or DTC group signal are set in the action setting circuit 152 as described below. That is, a signal from a remote station is waited for the first and second receptions, and DIS is sent for the third reception. These three actions are repeated.

In FIG. 35, if YES in step S50 of FIG. 21, the control circuit 36 proceeds to step S380. In step S380, it sets a DCS receive counter indicative of a count of reception of DCS to 0. In step S381, it sets a DTC receive counter indicative of a count of reception of DTC to 0. Then, it proceeds to step S60 and subsequent steps of FIG. 21.

Figure 23:
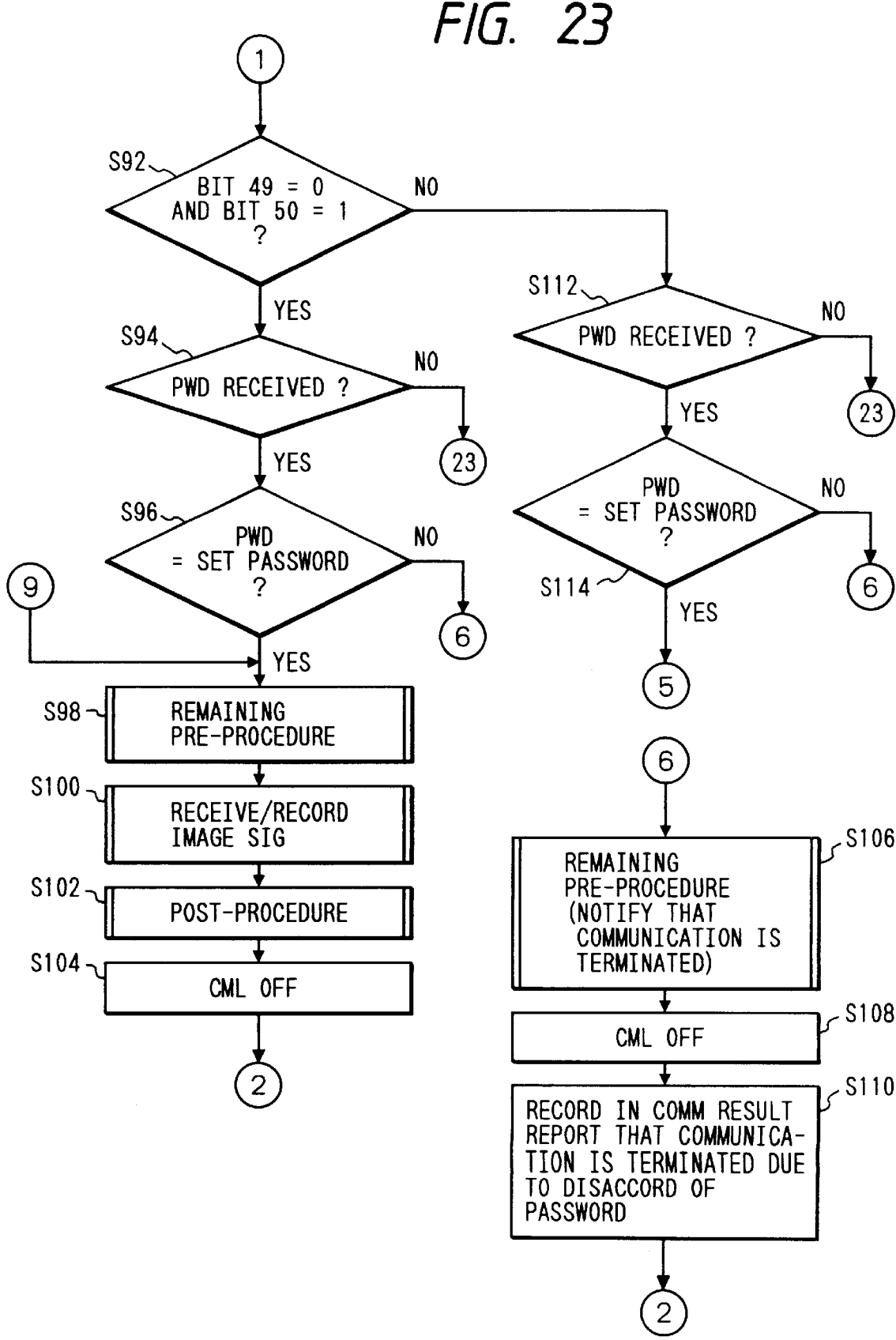
FIG. 23 is a flowchart showing operations of the sixth embodiment.

Next, in FIG. 36, if NO in step S82 of FIG. 22, step S94 of FIG. 23, or step S112 of FIG. 23, the control circuit 36 proceeds to step S390.

In step S390, the control circuit 36 increments the DCS receive counter by 1 due to reception of DCS. Next, in steps S392, S394, S396, and S398, it sets an action according to data set in the action setting circuit 152. Here, the set data is such that a signal from a remote station is waited for when the content of the DCS receive counter is 1 or 2 and such that the DIS signal is retransmitted when the content of the DCS receive counter is 3. Hence, at a counter value of 1 or 2, it proceeds to step S68 of FIG. 22. At a counter value of 3, it proceeds to step S396 to clear the DCS receive counter and then proceeds to step S64 of FIG. 21.

Figure 28:
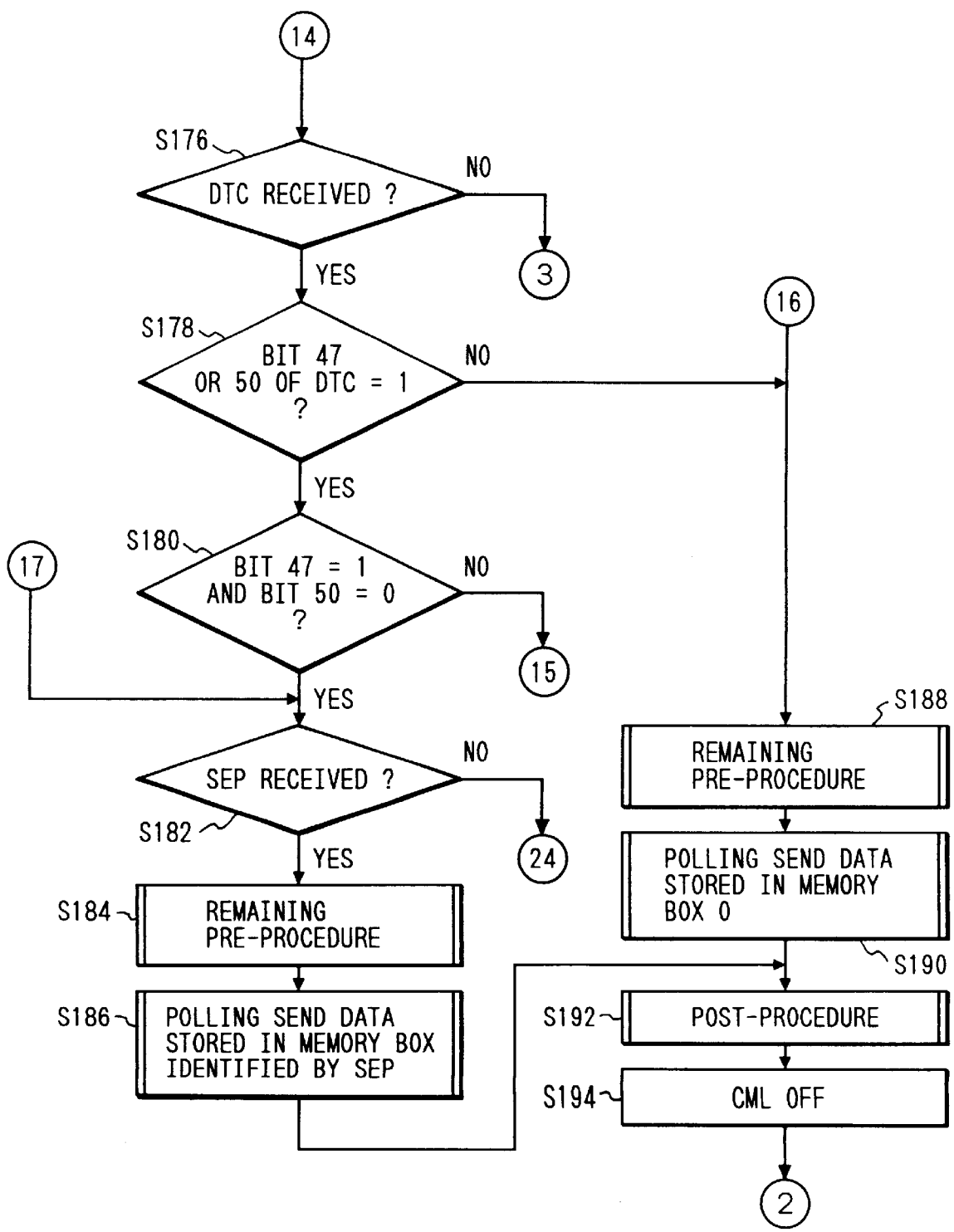
FIG. 28 is a flowchart showing operations of the sixth embodiment.
Figure 29:
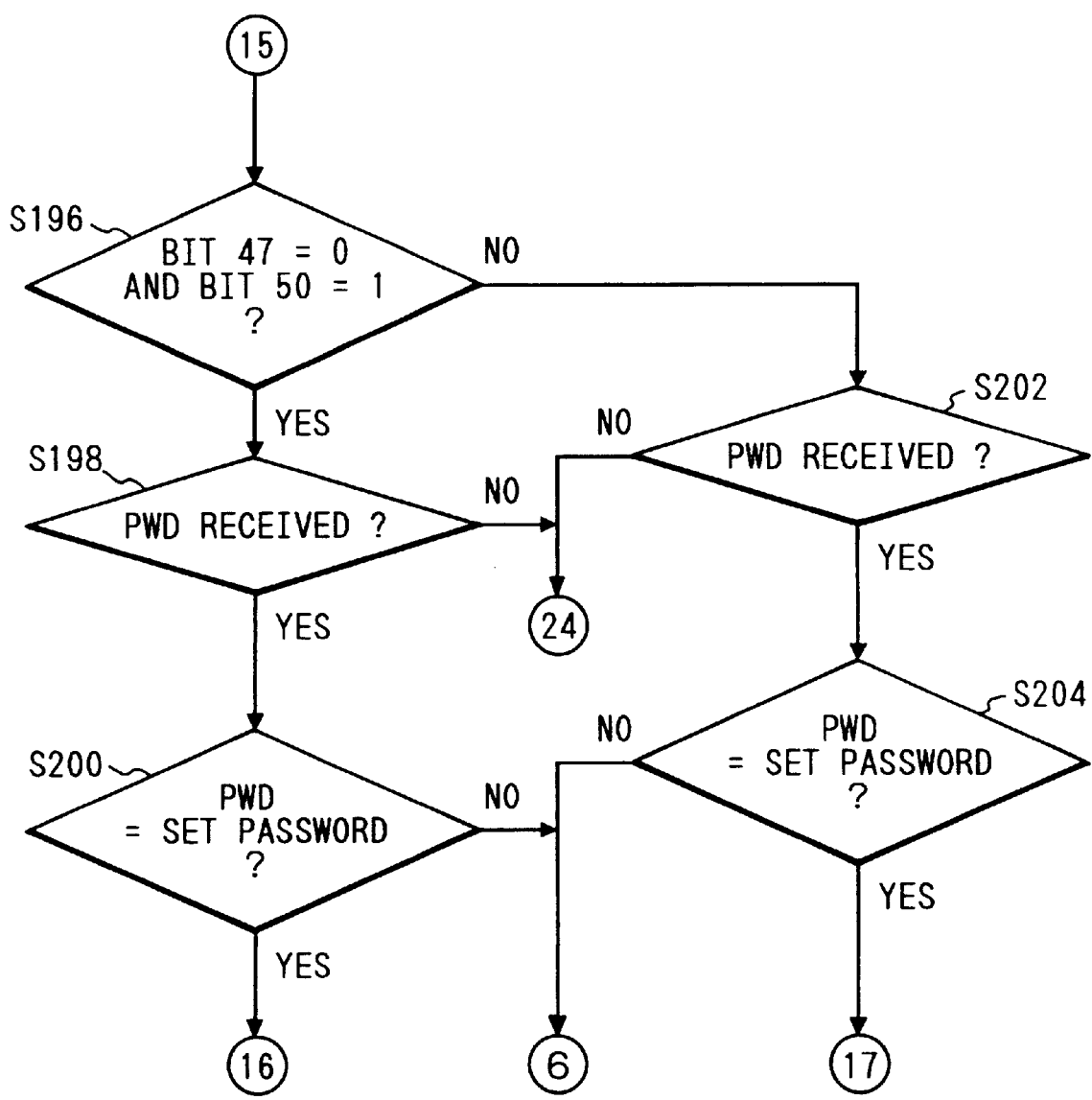
FIG. 29 is a flowchart showing operations of the sixth embodiment.
Figure 31:
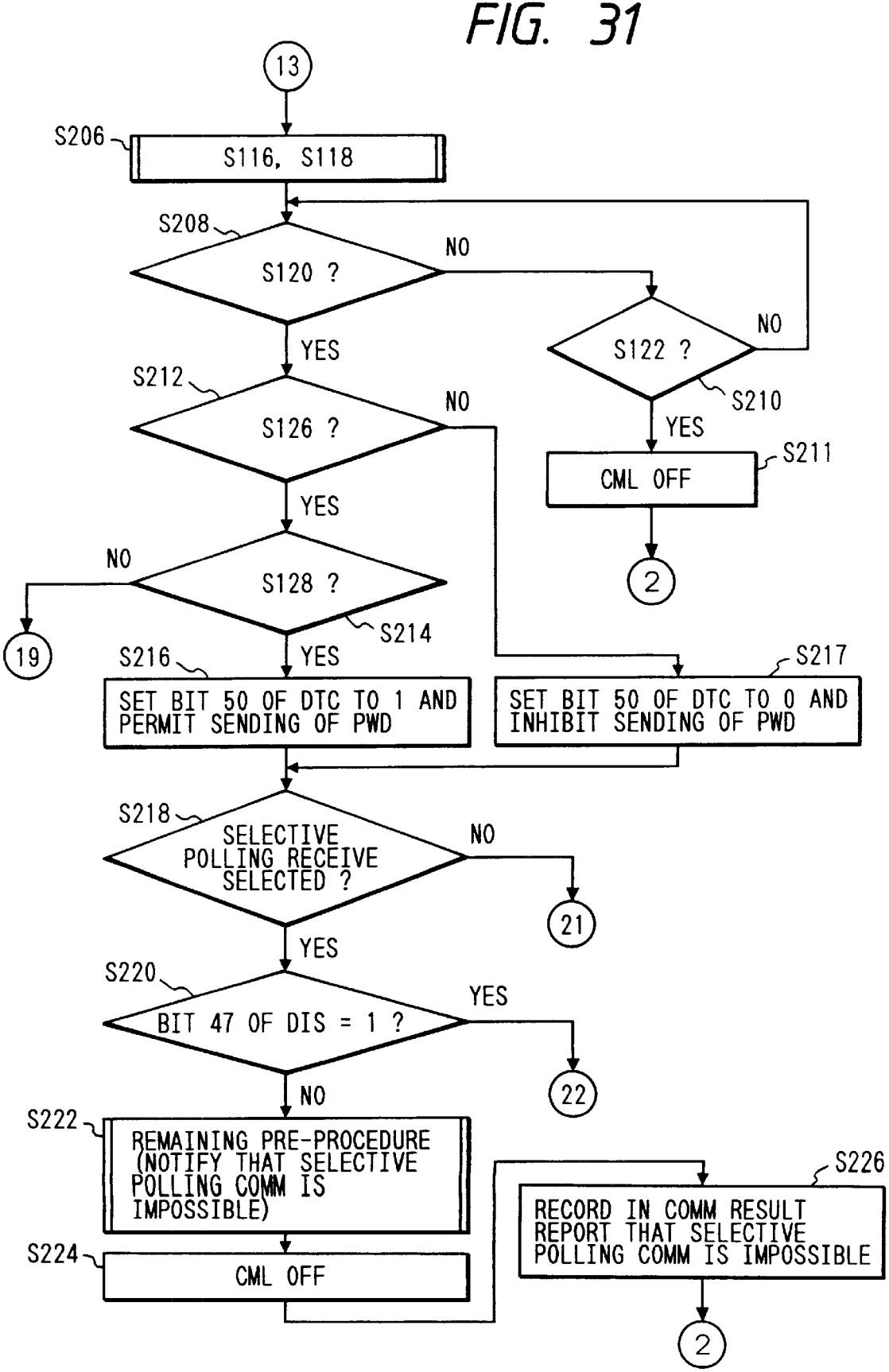
FIG. 31 is a flowchart showing operations of the sixth embodiment.
Figure 32:
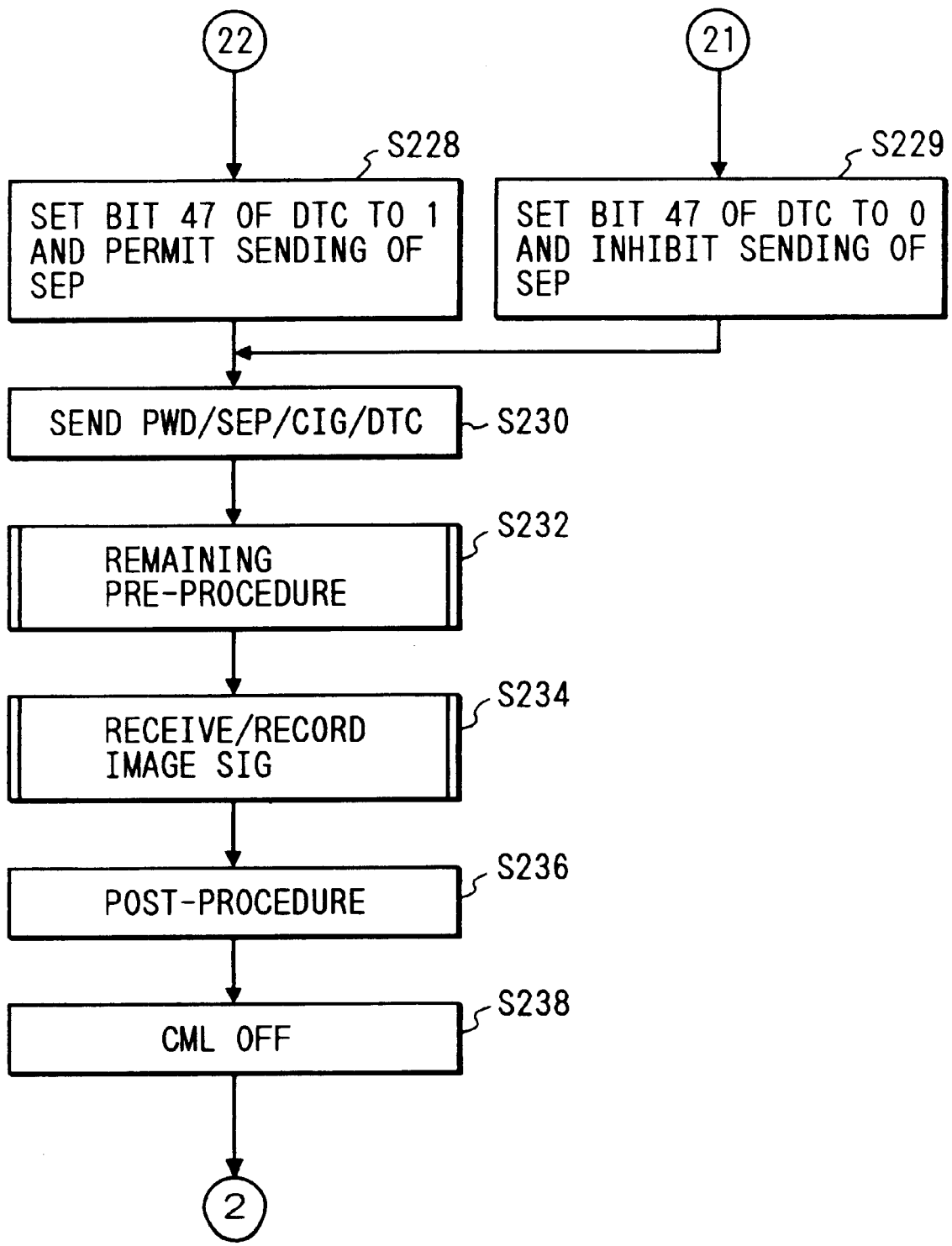
FIG. 32 is a flowchart showing operations of the sixth embodiment.

Also, in FIG. 37, if NO in step S182 of FIG. 28, step S198 of FIG. 29, or step S202 of FIG. 29, the control circuit 36 proceeds to step S406.

Next, in step S406, the control circuit 36 increments the DTC receive counter by 1 due to reception of DTC. Then, it sets an action according to data set in the action setting circuit 152. Here, the set data is such that a signal from a remote station is waited for when the content of the DTC receive counter is 1 or 2 and such that the DIS signal is retransmitted when the content of the DTC receive counter is 3. Hence, at a counter value of 1 or 2, it proceeds to step S68 of FIG. 22. At a counter value of 3, it clears the DTC receive counter (step S412) and then proceeds to step S64 of FIG. 21.

If no answer is made to up to the third reception, the transmitting station may suffer an error after the third attempt to send. However, according to the eleventh embodiment, when the receiving station side has received a digital command signal or digital transmit command signal declaring the presence of an optional signal, but has failed to receive the designated optional signal, the receiving station side does not answer first two receptions, thereby reducing communication time, and answers the third reception, thereby preventing the above mentioned error.

Twelfth Embodiment

The first embodiment has proposed notifying a remote station by a digital command signal (DCS signal) of whether an optional signal is included in a receive command signal for example.

In this connection, no problem will arise if every facsimile apparatus has the function proposed above. However, in communication, some facsimile apparatus may have the above proposed function, and some may not.

This has brought the following problem. When a facsimile apparatus having the function of the first embodiment is to receive data from a facsimile apparatus not having the facilities (hereinafter called a function of notifying the presence or absence of an optional signal; a facsimile apparatus having the function is called a new type facsimile apparatus, and a facsimile apparatus not having the function is called an old type facsimile apparatus), 0 is outputted both for the presence or absence of the sending of a sub-address signal included in the DCS signal (bit 49) and for the presence or absence of the sending of a password signal (bit 50). As a result, the new type facsimile apparats determines that both signals are not sent and thus fails to receive them even when the remote station (old type facsimile apparatus) sends the PWD signal or SUB signal.

It is an object of the present embodiment to provide a facsimile apparatus which can effectively manage reception from both facsimile apparatus having and not having the above mentioned function of notifying the presence or absence of an optional signal.

Description of the twelfth embodiment only covers what is different from the first embodiment. The same features are denoted by common reference numerals, and description thereof is omitted.

Figure 38:
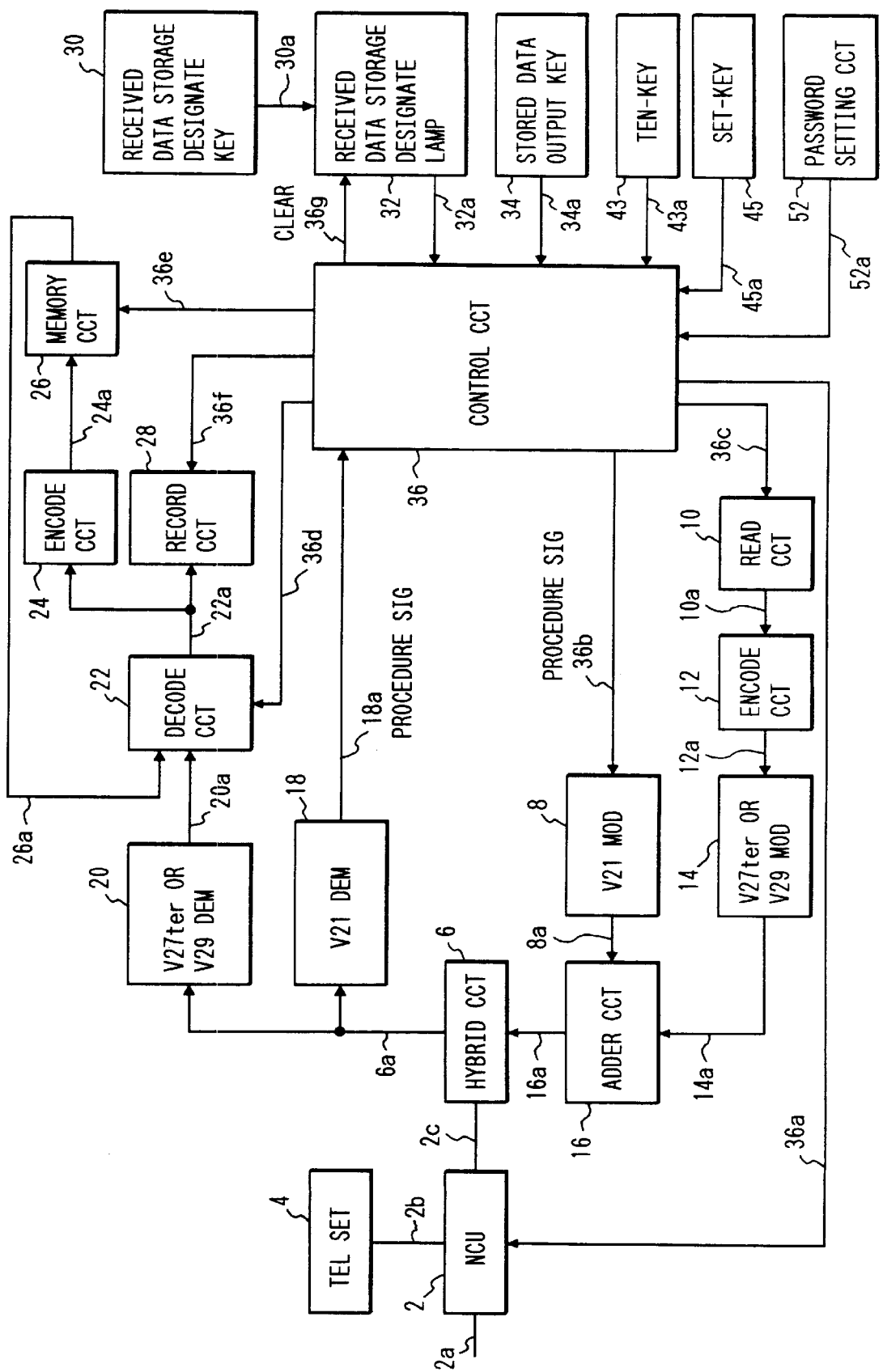
FIG. 38 is a block diagram showing the construction of a facsimile apparatus according to a twelfth embodiment.
Figure 39:
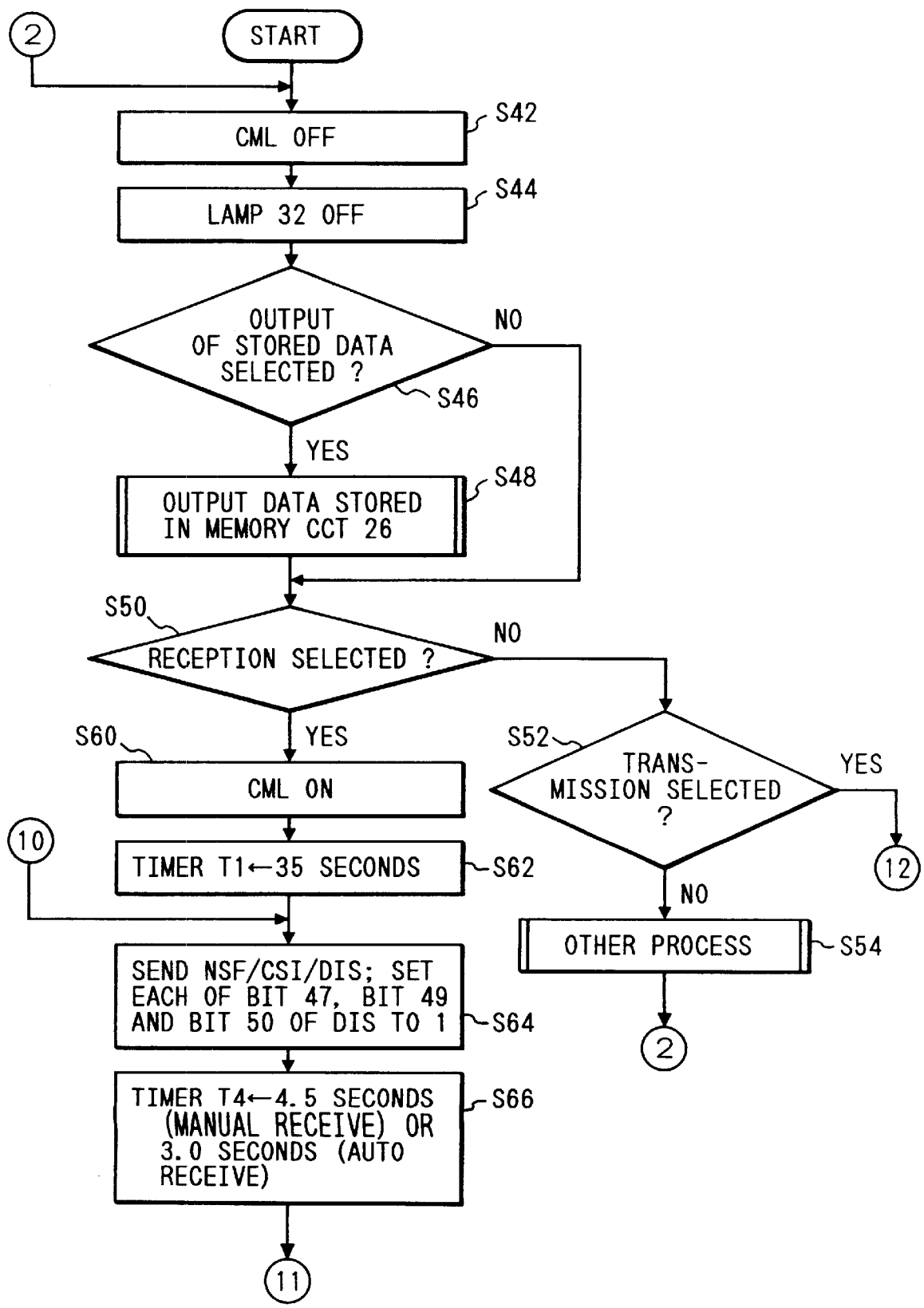
FIG. 39 is a flowchart showing operations of the twelfth embodiment.

In FIG. 38, the ten-key 43 is used, for example, to designate a memory box for storage on the receiving station side from the transmitting station side or to designate a memory box number containing received data for outputting the data. Data associated with pressed keys on the ten-key pad is outputted to the signal line 43a.

A set key 45 is used, for example, to indicate the end of data entry from the ten-key 43. Pressing the set key 45 causes pulses to be generated in a signal line 45a.

The password setting circuit 52 is used to set a password. The password setting circuit 52 takes in data outputted to the signal line 52a to recognize a set password. At the time of sending, a password, if set, is sent as the PWD signal. When the PWD signal is received, communication continues only when the received PWD signal accords with a set password.

When an apparatus of the present embodiment serves as a send side, the control circuit 36 controls a facsimile apparatus capable of notifying a remote station of whether an optional signal is included in a receive command signal, by declaration in a digital command signal (DCS signal). In this connection, apparatus assumed as a send side by the present embodiment include a conventional facsimile apparatus which is unable to notify a remote station of whether an optional signal is included in a receive command signal, by declaration in a digital command signal (DCS signal). The following description covers sending for both of them.

Next, the case where an apparatus of the present embodiment serves as a receive side will be described. In the case of reception from either of the above mentioned two facsimile apparatus, at reception from a facsimile apparatus capable of notifying a remote station of whether an optional signal is included in a receive command signal, by declaration in a digital command signal (DCS signal), (A) when the receive side has failed to receive an optional signal in spite of the presence of the optional signal being declared by the digital command signal (DCS signal), the receive side resends an initial identification signal; on the contrary, (B) when the receive side has received an optional signal in spite of the inclusion of the optional signal in a receive command signal being not declared by the digital command signal (DCS signal), the receive side handles the received optional signal as a valid one.

In this connection, the inclusion of an optional signal in a receive command signal is not declared by the digital command signal (DCS signal) in the following two cases: (1) a reception from a facsimile apparatus capable of notifying a remote station of whether an optional signal is included in a receive command signal, by declaration in a digital command signal (DCS signal), wherein not sending an optional signal is designated; (2) a reception from a facsimile apparatus which is unable to notify a remote station of whether an optional signal is included in a receive command signal, by declaration in a digital command signal (DCS signal). Optional signals considered are a password signal (PWD signal) and a sub-address signal (SUB signal).

Next, FIGS. 39 to 45 are flowcharts showing operations of the control circuit 36 in the present embodiment. The same steps of the present embodiment as those of the first embodiment are denoted by common reference numerals, and description thereof is omitted.

According to recommendations of acceleration of ITU-T, bits 47, 49, and 50 of FIF of the DCS signal are all set to 0. In the present application, a facsimile apparatus employing this sending method is called an old type facsimile apparatus. In contrast to this, according to the present application, when bit 49 of FIF of the DCS signal is 1, it indicates that the SUB signal is also sent in multiframe; when bit 49 is 0, it indicates that the SUB signal is not sent in multiframe. Also, when bit 50 of FIF of the DCS signal is 1, it indicates that the PWD signal is also sent in multiframe; when bit 50 is 0, it indicates that the PWD is not sent in multiframe. A facsimile apparatus which follows this rule for sending is called a new type facsimile apparatus (first embodiment of the present application).

In step S96, the control circuit 36 determines whether the PWD and a password set in the receiving station, i.e. in the password setting circuit 52 accord. It proceeds to step S98 if they accord and to step S106 if not.

In step S114, the control circuit 36 determines whether the PWD and a password set in the receiving station, i.e. in the password setting circuit 52 accord. It proceeds to step S82 if they accord and to step S106 if not.

In step S126, the control circuit 36 determines whether a password is set in the password setting circuit 52, i.e. whether password communication is selected. It proceeds to step S128 if selected and to step S137 if not.

In step S128, the control circuit 36 determines whether bit 50 of FIF of the DIS signal is 1, i.e. whether the password receive function is available. It proceeds to step S129 if YES and to step S130 if NO.

In step S129, the control circuit 36 determines whether the transmitting station is a new type facsimile apparatus. It proceeds to step S131 if the transmitting station is an old type facsimile apparatus and to step S136 if the transmitting station is a new type facsimile apparatus. In step S131, it sets bit 50 of FIF of the DCS signal to 0 (constant) and permits the sending of a password set in the password setting circuit 52, as the PWD signal. It proceeds to step S138 from step S131.

In step S136, the control circuit 36 sets bit 50 of FIF of the DCS signal to 1 in order to notify the receiving station of the sending of the PWD signal and permits the sending of a password set in the password setting circuit 52 as the PWD signal.

In step S140, the control circuit 36 determines whether bit 49 of FIF of the DIS signal is 1, i.e. whether the remote receiving station has the sub-address receive function. It proceeds to step S147 if YES and to step S142 if NO.

In step S147, the control circuit 36 determines whether the transmitting station is a new type facsimile apparatus. It proceeds to step S151 if the transmitting station is an old type facsimile apparatus and to step S148 if the transmitting station is a new type facsimile apparatus. In step S151, it sets bit 50 of FIF of the DCS signal to 0 (constant) and permits the sending of an entered memory box number as the SUB signal (step S149).

Also, in step S148, the control circuit 36 sets bit 49 of the DCS signal to 1 in order to notify the receiving station of the sending of the SUB signal and permits the sending of an entered memory box number as the SUB signal. Then, in step S150, it sends the PWD/SUB/NSS/TSI/DCS signal according to steps S137, S131, S136, S149, S148, and S151.

The control circuit 36 proceeds to step S560 (FIG. 45) in the case of reception from an old type facsimile apparatus, wherein bits 49 and 50 of FIF of the DCS signal are both 0, or in the case of reception from a new type facsimile apparatus with the PWD and SUB signals not transmitted.

At the time of reception from a new type facsimile apparatus, this process routine applies to the case where neither PWD signal nor SUB signal is sent. The process routine becomes effective where reception from an old type facsimile apparatus is also involved, i.e. where both old and new types of facsimile apparatus are marketed.

Figure 40:
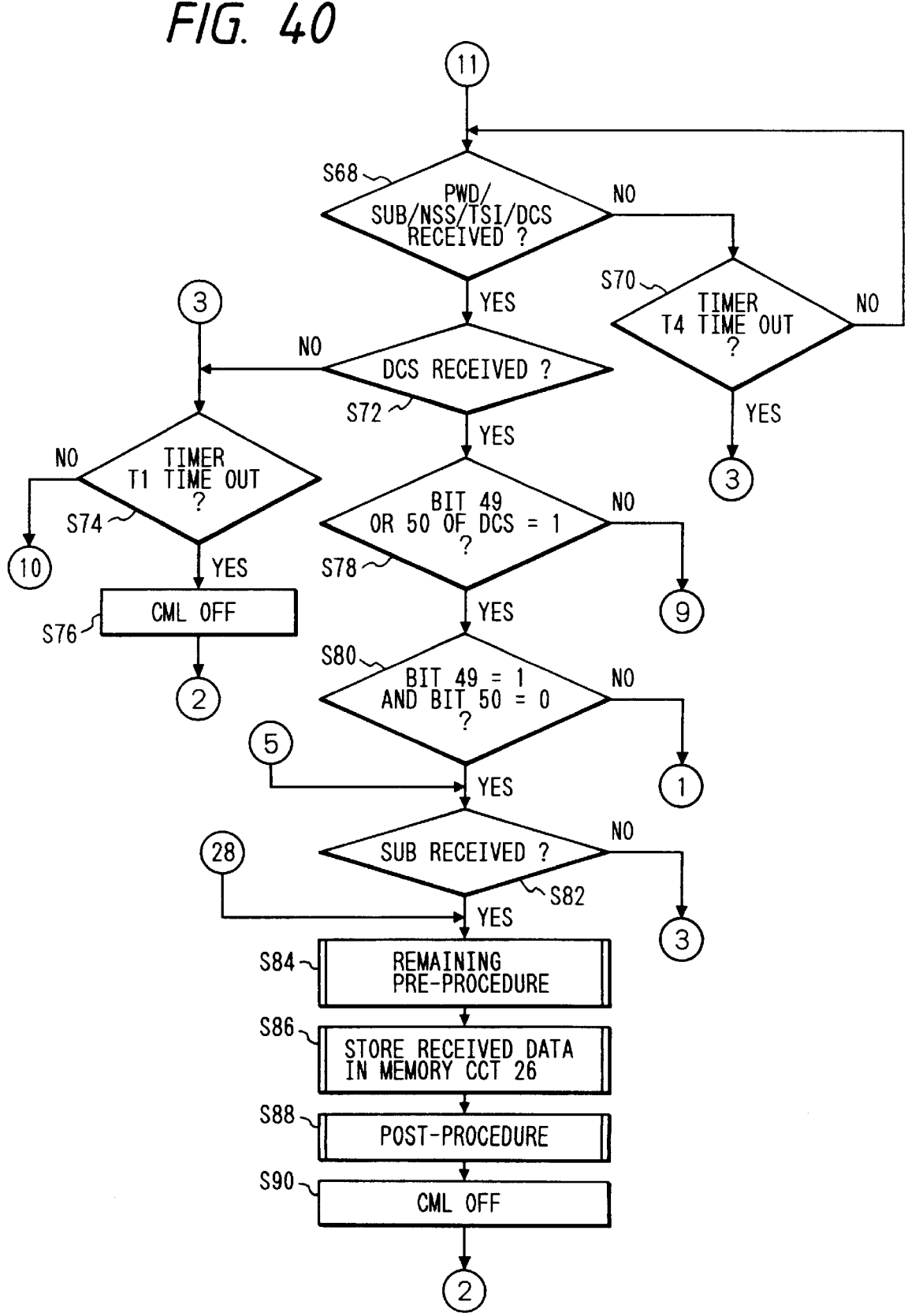
FIG. 40 is a flowchart showing operations of the twelfth embodiment.
Figure 41:
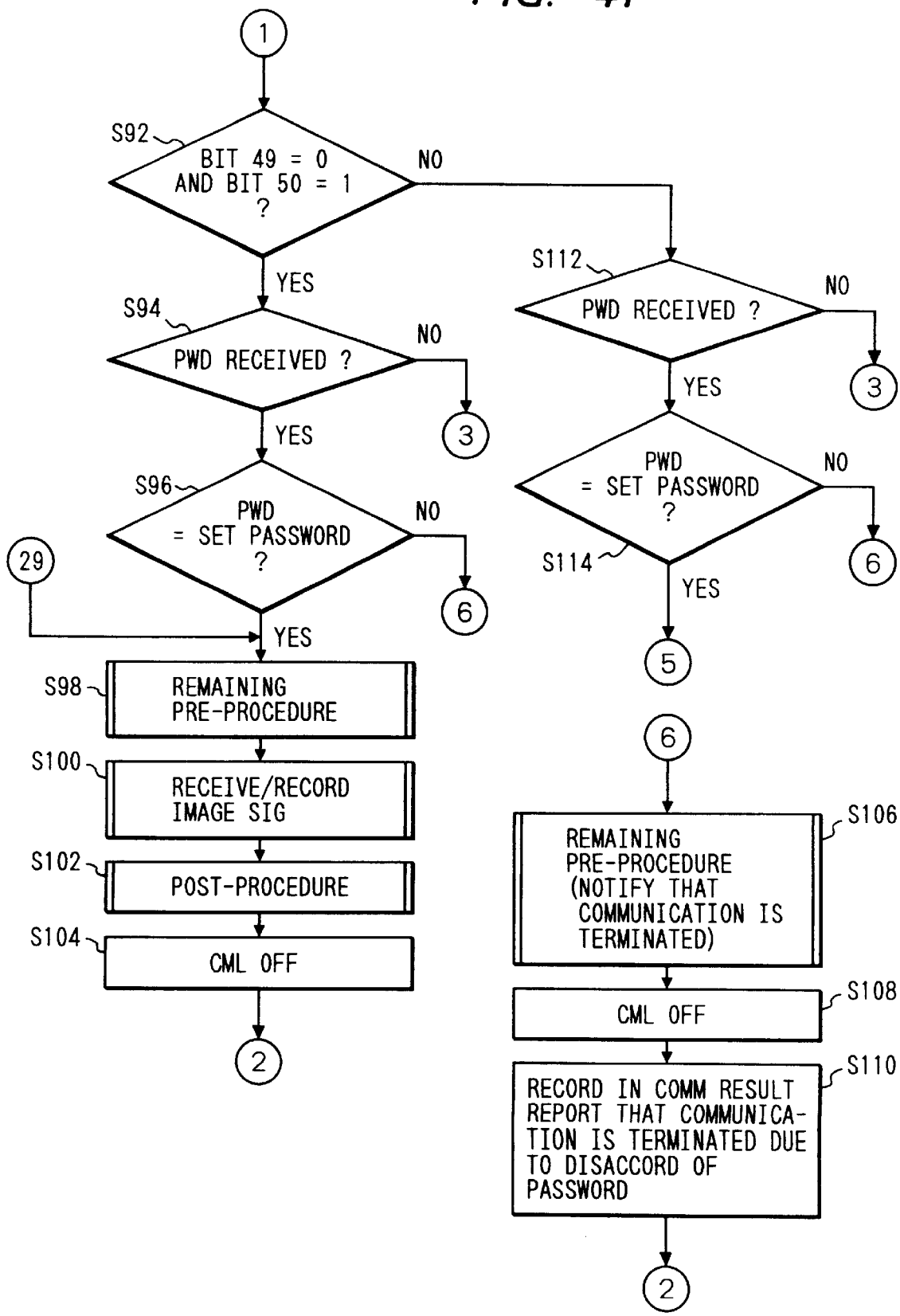
FIG. 41 is a flowchart showing operations of the twelfth embodiment.
Figure 42:
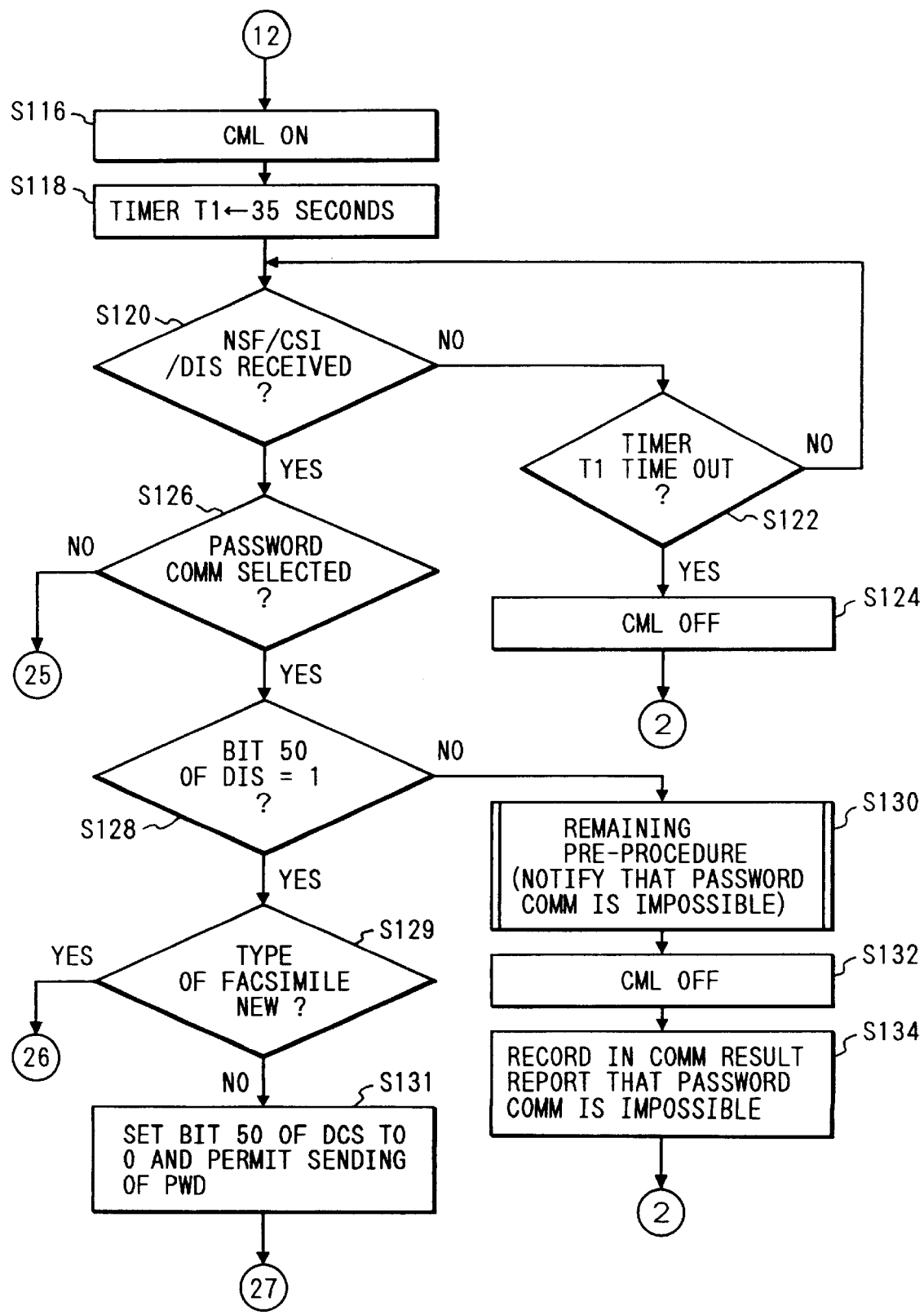
FIG. 42 is a flowchart showing operations of the twelfth embodiment.
Figure 43:
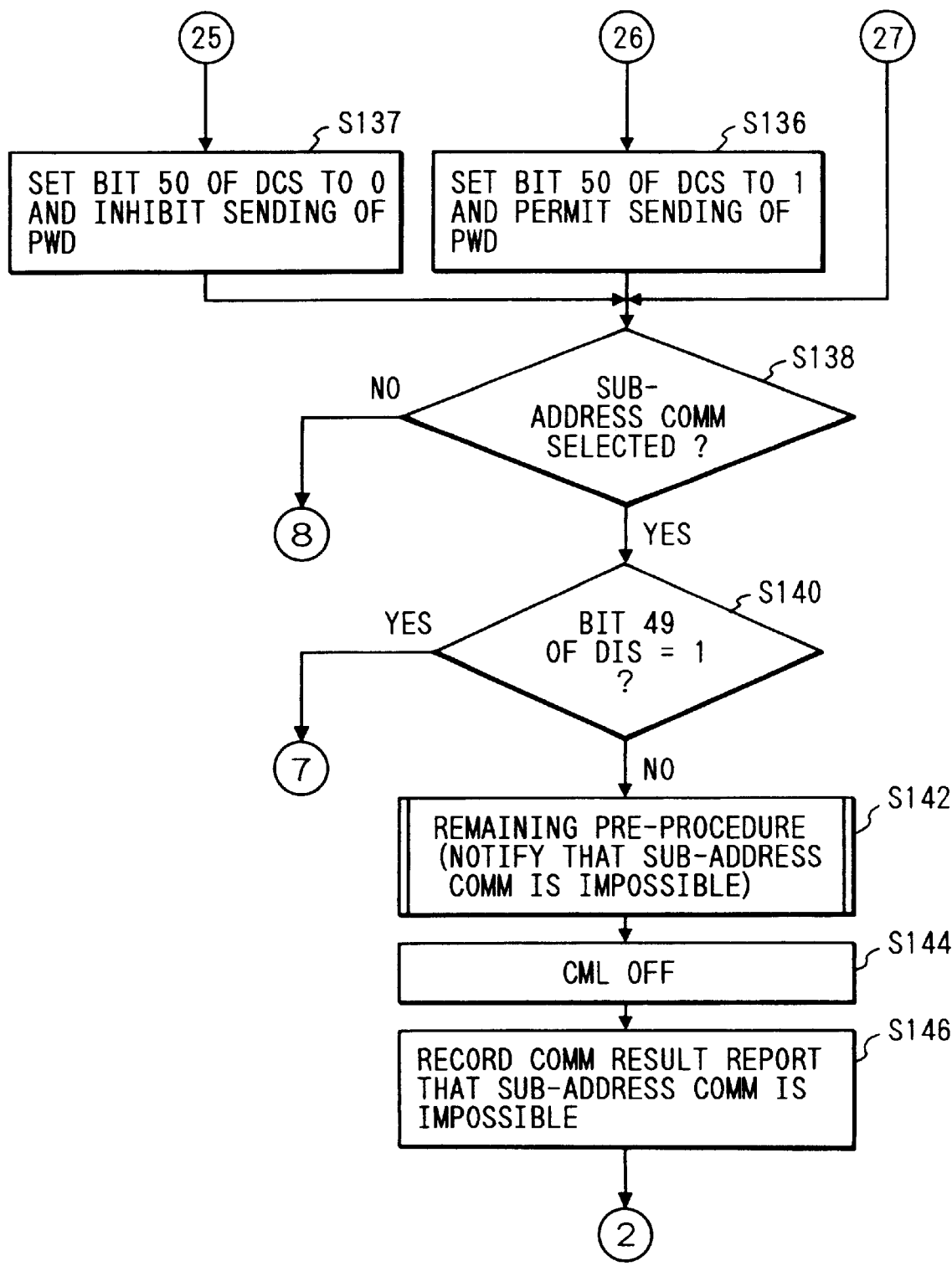
FIG. 43 is a flowchart showing operations of the twelfth embodiment.
Figure 44:
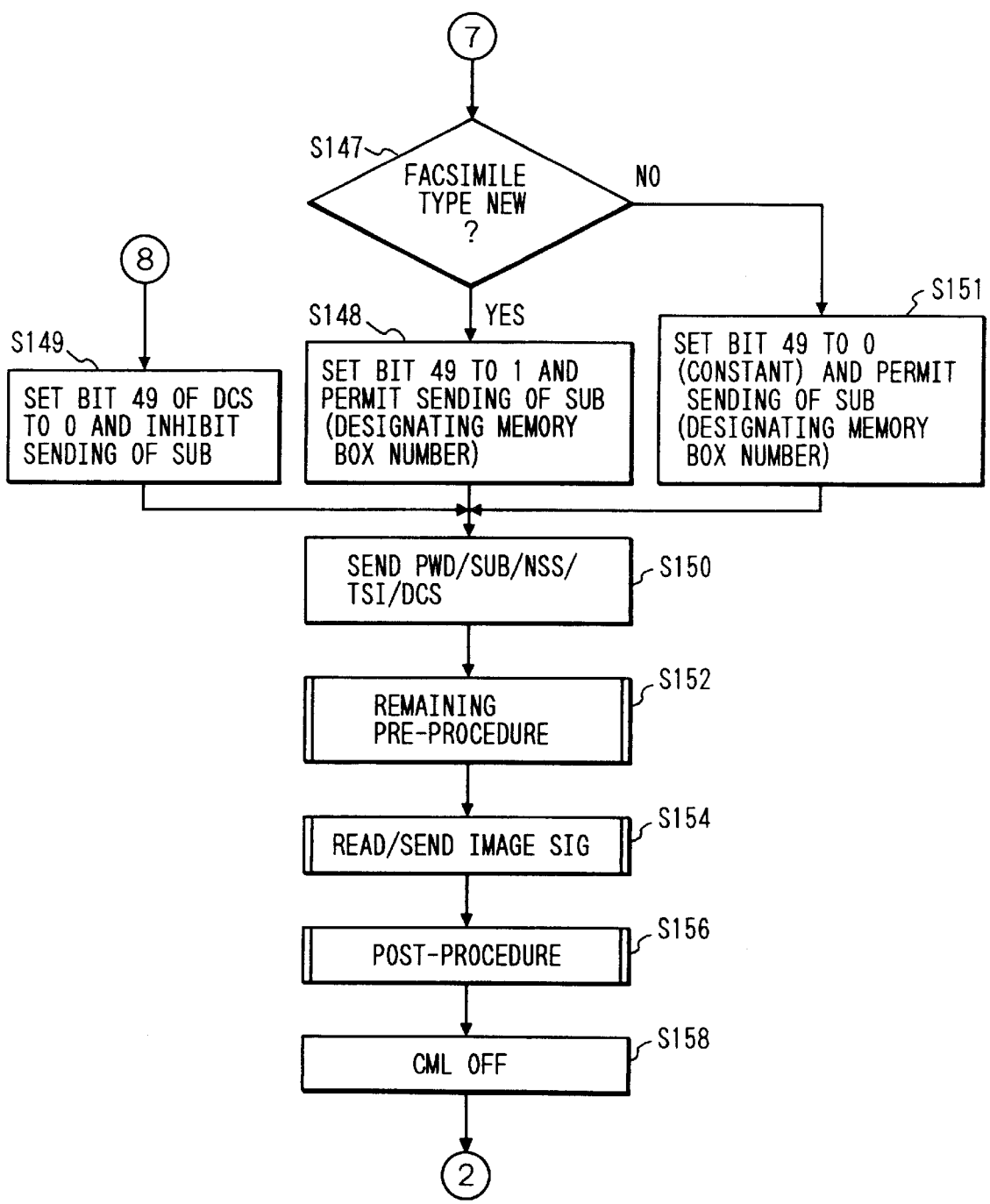
FIG. 44 is a flowchart showing operations of the twelfth embodiment.
Figure 45:
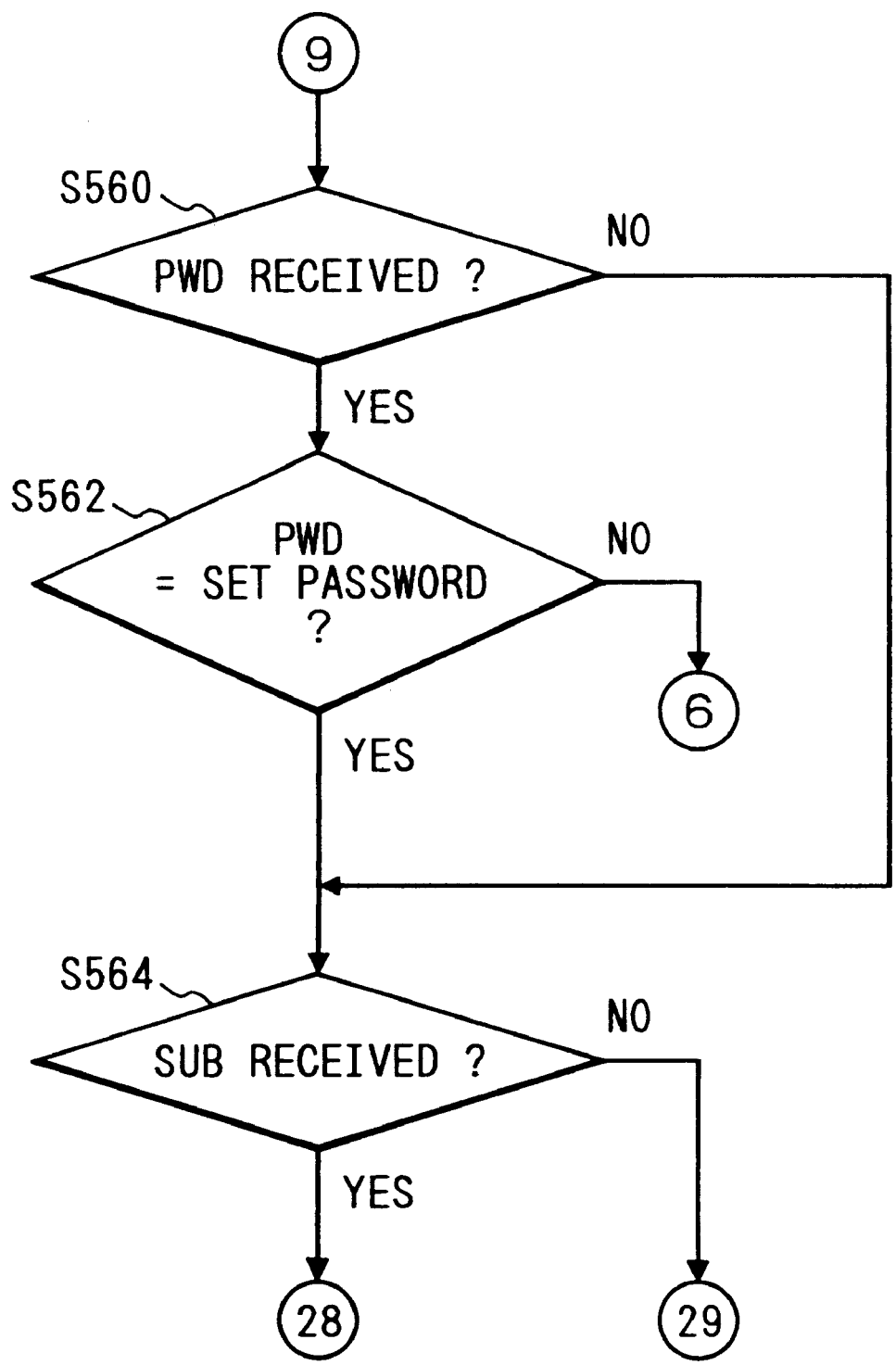
FIG. 45 is a flowchart showing operations of the twelfth embodiment.

In step S560, the control circuit 36 determines whether the PWD signal is received. When the PWD signal is received, it proceeds to step S562 and determines whether the received PWD signal and a password set in the receiving station, i.e. in the password setting circuit 52 accord. If they accord, it proceeds to step S564. If not, it proceeds to S106 (FIG. 41). When the PWD signal is not received, it proceeds to step S564 and determines whether the SUB signal is received. If received, it proceeds to step S84 (FIG. 40). If not, it proceeds to step S98 (FIG. 41).

According to the twelfth embodiment described above, the PWD and SUB signals are set as a receive command signal, and at this time the sending thereof is declared in FIF of the DCS signal for notification. However, as a thirteenth embodiment, the PWD and SEP signals may be sent as a transmit command signal, and at this time the sending thereof may be declared in FIF of the DTC signal for notification. Here, the presence or absence of the PWD signal is assigned to bit 50 of FIF of the DTC signal, and the presence or absence of the SEP signal is assigned to bit 47 of FIF of the DTC signal.

In the case where a polling send side fails to receive the PWD signal in spite of bit 50 of FIF of the DTC signal being 1 or where the polling send side fails to receive the SEP signal in spite of bit 47 of FIF of the DTC signal being 1, the polling send side re-sends an initial identification signal. Furthermore, when the PWD signal or SEP signal is received in spite of bits 47 and 50 of FIF of the DTC signal being both 0, these received signals are considered valid in executing control.

Figure 46A:
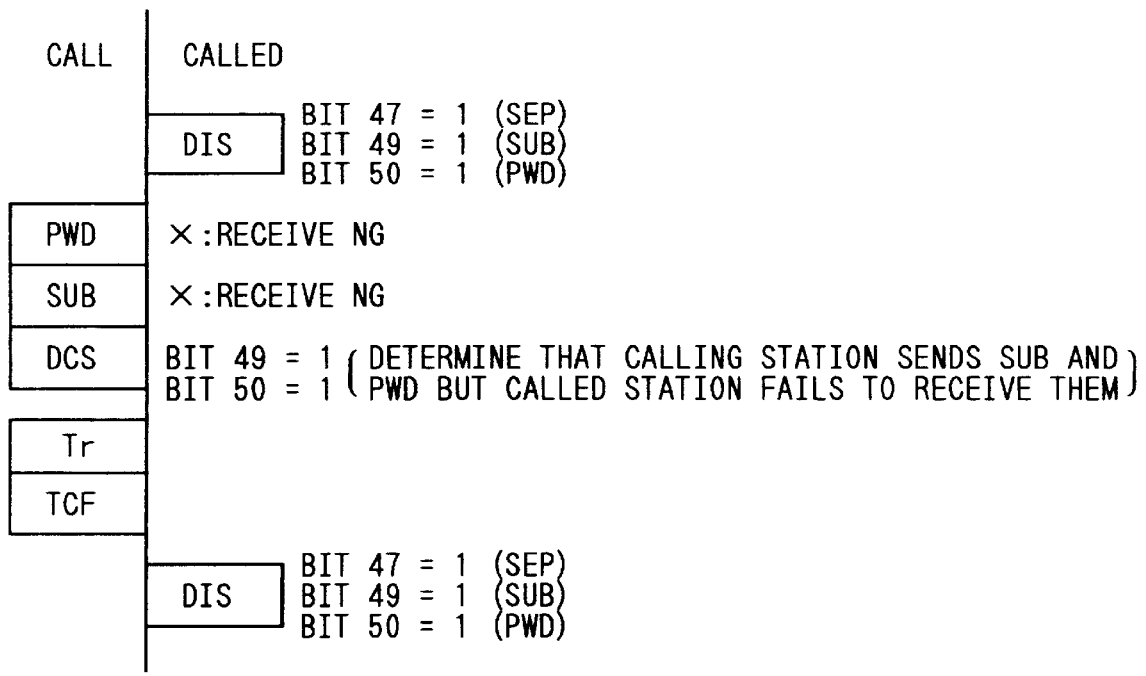
FIGS. 46A, 46B, and 46C are charts showing transmission and reception of procedure signals of the twelfth embodiment.
Figure 46B:
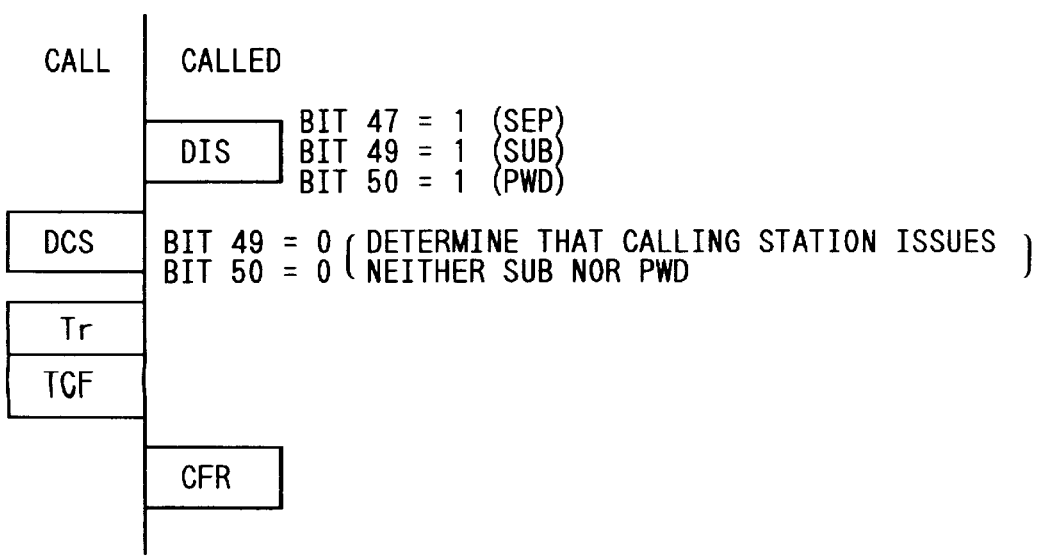
Figure 46C:
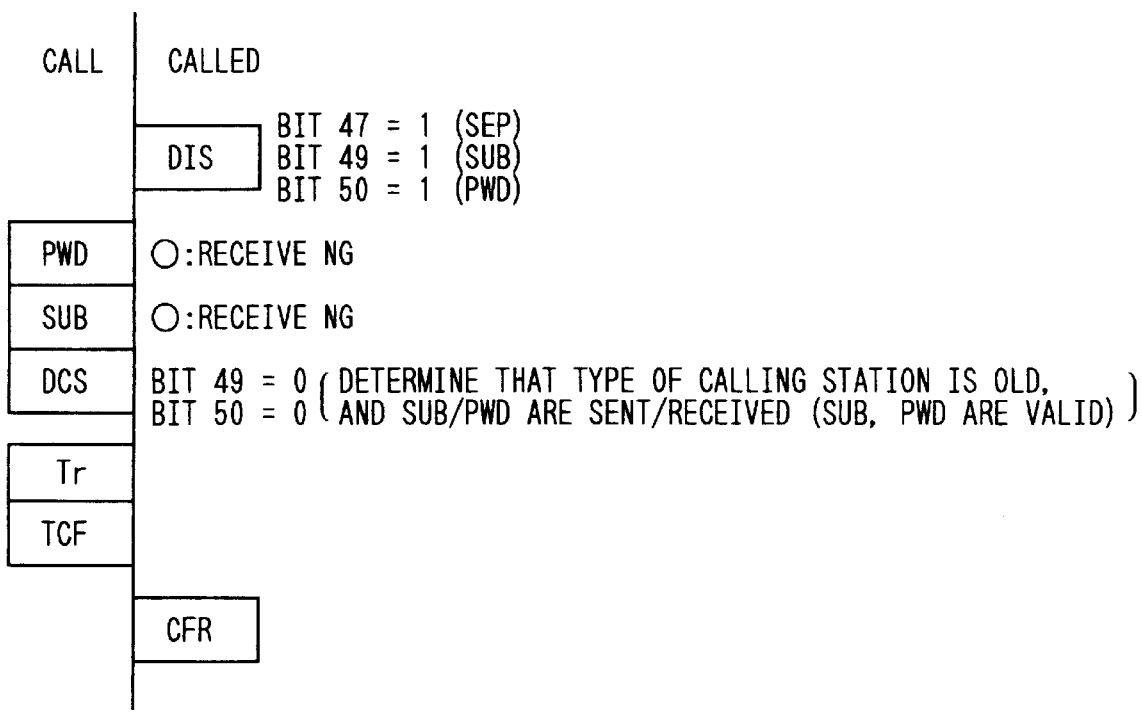

FIGS. 46A to 46C show the manner of exchanging procedure signals of the twelfth embodiment. An apparatus of the twelfth embodiment is on the called side.

The twelfth embodiment is different in operation from the first embodiment only as illustrated by FIG. 46C.

As described above, the twelfth embodiment is effective to perform a precise process at reception from either of a facsimile apparatus which declares the presence or absence of an optional signal by a digital command signal (DCS signal) and a facsimile apparatus which does not.

What is claimed is:

1. A communication apparatus having a first procedure function of communicating standard procedure signals and a second procedure function of communicating optional procedure signals, said apparatus comprising:

reception means for receiving, from a destination a first standard procedure signal capable of being set with first information indicating that the destination has the second procedure function;

discriminating means for discriminating whether or not the received first standard procedure signal includes the first information; and transmission means for transmitting, to the destination, a second standard procedure signal, including second information indicating to communication of optional procedure signals, and a first optional procedure signal for the second procedure function, when the received first standard procedure signal includes the first information.

2. A communication apparatus according to claim 1, wherein the standard procedure signals and the optional procedure signals are facsimile procedure signals defined in at least one ITU-T Recommendation.

3. A communication apparatus according to claim 2, wherein the first standard procedure signal is a digital identification signal defined in ITU-T Recommendation T.30, and the second standard procedure signal is a digital command signal defined in ITU-T Recommendation T.30.

4. A communication apparatus according to claim 2, wherein the first optional procedure signal is a sub-address signal defined in an ITU-T Recommendation.

5. A communication apparatus according to claim 2, wherein the first optional procedure signal is a password signal defined in an ITU-T Recommendation.

6. A communication apparatus according to claim 2, wherein the first optional procedure signal is a non-standard facilities set-up signal defined in an ITU-T Recommendation.

7. A communication apparatus according to claim 2, wherein the first optional procedure signal is a transmitting subscriber identification signal defined in an ITU-T Recommendation.

8. A communication apparatus according to claim 2, wherein the first standard procedure signal is a digital identification signal defined in ITU-T Recommendation T.30, and the second standard procedure signal is a digital transmit command signal defined in ITU-T Recommendation T.30.

9. A communication apparatus according to claim 8, wherein the first optional procedure signal is a selective polling signal defined in an ITU-T Recommendation.

10. A communication apparatus according to claim 8, wherein the first optional procedure signal is a password signal defined in an ITU-T Recommendation.

11. A communication apparatus according to claim 8, wherein the first optional procedure signal is a non-standard facilities command signal defined in an ITU-T Recommendation.

12. A communication apparatus according to claim 8, wherein the first optional procedure signal is a calling subscriber identification signal defined in an ITU-T Recommendation.

13. A communication apparatus according to claim 1, wherein said transmission means transmits the first optional procedure signal and the second standard procedure signal as a series of signals.

14. A communication apparatus according to claim 1, wherein, in a case where the received first standard procedure signal does not include the first information, said transmission means transmits, to the destination, the second standard procedure signal not including the second information.

15. A communication apparatus according to claim 14, further comprising means for notifying that a communication is in accordance with the second procedure function.

16. A communication apparatus having a first procedure function of communicating standard procedure signals and a second procedure function of communicating optional procedure signals, said apparatus comprising:

transmission means for transmitting, to a destination, a first standard procedure signal indicating that said apparatus has the second procedure function;

reception means for receiving either a second standard procedure signal or a first optional procedure signal and the second standard procedure signal, as a response signal corresponding to the first standard procedure signal from the destination;

determining means for discriminating whether or not information indicating communication of the optional procedure signals has been set in the received second standard procedure signal, and for determining, in a case where the first optional procedure signal has not been received from the destination, whether a reception error of the first optional procedure signal exists in accordance with a discrimination of the information in the second standard procedure signal; and communication means for performing a communication in accordance with the first procedure function or the first and second procedure functions, wherein, in a case where the information has not been set in the received second standard procedure signal and the first optional procedure signal has not been received from the destination, said communication means performs a communication accordance with the first procedure function.

17. A communication apparatus according to claim 16, wherein, in a case where the first optional procedure signal has not been received and the information has been set in the received second standard procedure signal, said determining means determines that a reception error of the first optional procedure signal exists.

18. A communication apparatus according to claim 16, wherein, a case where the first optional procedure signal have not been received and the information has not been set in the received second standard procedure signal, said determining means determines that the destination does not have the second procedure function.

19. A communication apparatus according to claim 17, further comprising means for causing said reception means to receive the first optional procedure signal retransmitted from the destination when said determining means determines that a reception error of the first optional procedure signal exists.

20. A communication apparatus according to claim 19, wherein the first standard procedure signal is a digital identification signal defined in ITU T Recommendation T.30, and the second standard procedure signal is a digital transmit command signal defined ITU-T Recommendation T.30.

21. A communication apparatus according to claim 16, wherein the standard procedure signal and the optional procedure signals are facsimile procedure signals defined in at least one ITU-T Recommendation.

22. A communication apparatus according to claim 21, wherein the first standard procedure signal is a digital identification signal defined in ITU-T Recommendation T.30, and the second standard procedure signal is a digital command signal defined in ITU-T Recommendation T.30.

23. A communication apparatus according to claim 21, wherein the first optional procedure signal is a sub-address signal defined in an ITU-T Recommendation.

24. A communication apparatus according to claim 21, wherein the first optional procedure signal is a selective polling signal defined in an ITU-T Recommendation.

25. A communication apparatus according to claim 21, wherein the first optional procedure signal is a password signal defined in an ITU-T Recommendation.

26. A communication apparatus according to claim 16, further comprising selecting means for selecting, in accordance with the determination result of said determining means, any one of the following options: (A) causing said transmission means to retransmit the first standard procedure signal; (B) causing said transmission means to transmit a third standard procedure signal indicating a failure in receiving the first optional procedure signal properly; (C) not transmitting a procedure signal to the destination, but causing said reception means to receive the first optional procedure signal retransmitted from the destination.

27. A communication apparatus according to claim 26, wherein said selecting means selects from the (A), (B) and (C) options in accordance with an error count determined by said determining means.

28. A communication apparatus according to claim 27, wherein said selecting means selects the (B) or (C) option for up to a second error determined by said determining means and selects the (A) option for a third error.

29. A communication method in a communication apparatus having a first procedure function of communicating standard procedure signals and a second procedure function of communicating optional procedure signals, said method comprising the steps of:

receiving, from a destination, a first standard procedure signal capable of being set with first information indicating that the destination has the second procedure function;

discriminating whether or not the received first standard procedure signal includes the first information; and transmitting, to the destination, a second standard procedure signal including second information indicating communication of the optional procedure signals, and a first optional procedure signal for the second procedure function, when the received first standard procedure signal includes the first information.

30. A communication method according to claim 29, wherein the standard procedure signals and the optional procedure signals are facsimile procedure signals defined in at least one ITU-T Recommendation.

31. A communication method according to claim 30, wherein the first standard procedure signal is a digital identification signal defined in ITU-T Recommendation T.30, and the second standard procedure signal is a digital command signal defined in ITU-T Recommendation T.30.

32. A communication method according to claim 30, wherein the first optional procedure signal is a sub-address signal defined in an ITU-T Recommendation.

33. A communication method according to claim 30, wherein the first optional procedure signal is a password signal defined in an ITU-T Recommendation.

34. A communication method according to claim 30, wherein the first optional procedure signal is a non-standard facilities set-up signal defined in an ITU-T Recommendation.

35. A communication method according to claim 30, wherein the first optional procedure signal is a transmitting subscriber identification signal defined in an ITU-T Recommendation.

36. A communication method according to claim 30, wherein the first standard procedure signal is a digital identification signal defined in ITU-T Recommendation T.30, and the second standard procedure signal is a digital transmit command signal defined in ITU-T Recommendation T.30.

37. A communication method according to claim 36, wherein the first optional procedure signal is a selective polling signal defined in an ITU-T Recommendation.

38. A communication method according to claim 36, wherein the first optional procedure signal is a password signal defined in an ITU-T Recommendation.

39. A communication method according to claim 36, wherein the first optional procedure signal is a non-standard facilities command signal defined in an ITU-T Recommendation.

40. A communication method according to claim 36, wherein the first optional procedure signal is a calling subscriber identification signal defined in an ITU-T Recommendation.

41. A communication method according to claim 29, wherein said transmission step transmits the first optional procedure signal and the second standard procedure signal as a series of signals.

42. A communication method in a communication apparatus having a first procedure function of communicating standard procedure signals and a second procedure function of communicating optional procedure signals, said method comprising the steps of:

transmitting, to a destination, a first standard procedure signal indicating that the apparatus has the second procedure function;

receiving either a second standard procedure signal or a first optional procedure signal and the second standard procedure signal, as a response signal corresponding to the first standard procedure signal from the destination;

discriminating whether or not information indicating communication of the optional procedure signals has been set in the received second standard procedure signal;

determining, in a case where the first optional procedure signal has not been received from the destination, whether a reception error of the first optional procedure signal exists in accordance with the discrimination of the information in the second standard procedure signal;

performing a communication in accordance with the first procedure function or the first and second procedure functions, wherein, in a case where the information has not been set in the received second standard procedure signal and the first optional procedure signal has not been received from the destination, said communication step performs a communication in accordance with the first procedure function.

43. A communication method according to claim 42, wherein, in a case where the first optional procedure signal has not been received and the information has been set in the received second standard procedure signal, said determining step determines that a reception error of the first optional procedure signal exists.

44. A communication method according to claim 43, further comprising the step of receiving the first optional procedure signal retransmitted from the destination when said determining step determines the reception error of the first optional procedure signal.

45. A communication method according to claim 42, wherein, in a case where the first optional procedure signal have not been received and the information have not been set in the received second standard procedure signal, said determining step determines that the destination does not have the second procedure function.

46. A communication method according to claim 42, wherein the standard procedure signals and the optional procedure signals are facsimile procedure signals defined in at least one ITU-T Recommendation.

47. A communication method according to claim 46, wherein the first standard procedure signal is a digital identification signal defined in ITU-T Recommendation T.30, and the second standard procedure signal is a digital command signal defined in ITU-T Recommendation T.30.

48. A communication method according to claim 46, wherein the first optional procedure signal is a sub-address signal defined in an ITU-T Recommendation.

49. A communication method according to claim 46, wherein the first optional procedure signal is a selective polling signal defined in an ITU-T Recommendation.

50. A communication method according to claim 46, wherein the first optional procedure signal is a password signal defined in an ITU-T Recommendation.

51. A communication method according to claim 42, wherein the first standard procedure signal is a digital identification signal defined in ITU-T Recommendation T.30, and the second standard procedure signal is a digital transmit command signal defined in ITU-T Recommendation T.30.

52. A communication method according to claim 42, further comprising the step of selecting, in accordance with the determination result of said determining step, any one of the following options: (A) retransmitting the first standard procedure signal; (B) transmitting a third standard procedure signal indicating a failure in receiving the first optional procedure signal properly; (C) not transmitting a procedure signal to the destination, but receiving the first optional procedure signal retransmitted from the destination.

53. A communication method according to claim 52, wherein said selecting step selects from the (A), (B) and (C) options in accordance with an error count determined by said determining step.

54. A communication method according to claim 53, wherein said selecting step selects the (B) or (C) option for up to a second error determined by said determining step and selects the (A) option for a third error.

55. A communication method between a first communication apparatus and a second communication apparatus, the first and second communication apparatuses having a first procedure function of communicating standard procedure signals and a second procedure function of communicating optional procedure signals, said method comprising the steps of:

transmitting, from the first communication apparatus to the second communication apparatus, a first standard procedure signal indicating that the first communication apparatus has the second procedure function;

transmitting, responsive to the first standard procedure signal, a second standard procedure signal including information indicating communication of the optional procedure signals and a first optional procedure signal for the second procedure function from the second communication apparatus to the first communication apparatus;

receiving at least the second standard procedure signal as a response signal corresponding to the first standard procedure signal in the first communication apparatus;

discriminating whether or not the information indicating communication of the optional procedure signals has been set in the received second standard procedure signal, and determining, in a case where the first optional procedure signal has not been received from the destination, whether a reception error of the first optional procedure signal exists in accordance with the discrimination of the information in the second standard procedure signal, in the first communication apparatus; and performing a communication in accordance with the first procedure function or the first and second procedure functions between the first and second communication apparatuses, wherein, in a case where the information has not been set in the received second standard procedure signal and the first optional procedure signal has not been received from the destination, a communication in accordance with the first procedure function is performed between the first and second communication apparatuses.

56. A communication method according to claim 55, wherein the standard procedure signals and the optional procedure signals are facsimile procedure signals defined in at least one ITU-T Recommendation.

57. A communication method according to claim 56, wherein the first standard procedure signal is a digital identification signal defined in ITU-T Recommendation T.30, and the second standard procedure signal is a digital command signal defined in ITU-T Recommendation T.30.

58. A communication method according to claim 56, wherein the first optional procedure signal is a sub-address signal defined in an ITU-T Recommendation.

59. A communication method according to claim 56, wherein the first optional procedure signal is a password signal defined in an ITU-T Recommendation.

60. A communication method according to claim 56, wherein the first optional procedure signal is a non-standard facilities set-up signal defined in an ITU-T Recommendation.

61. A communication method according to claim 56, wherein the first optional procedure signal is a transmitting subscriber identification signal defined in an ITU-T Recommendation.

62. A communication method according to claim 56, wherein the first standard procedure signal is a digital identification signal defined in ITU-T Recommendation T.30, and the second standard procedure signal is a digital command signal defined in ITU-T Recommendation T.30.

63. A communication method according to claim 62, wherein the first optional procedure signal is a selective polling signal defined in an ITU-T Recommendation.

64. A communication method according to claim 62, wherein the first optional procedure signal is a password signal defined in an ITU-T Recommendation.

65. A communication method according to claim 62, wherein the first optional procedure signal is a non-standard facilities command signal defined in an ITU-T Recommendation.

66. A communication method according to claim 62, wherein the first optional procedure signal is a calling subscriber identification signal defined in an ITU-T Recommendation.

67. A communication method according to claim 55, wherein said transmission step transmits the first optional procedure signal and the second standard procedure signal as a series of signals.

* * * * *

UNITED STATES PATENT AND TRADEMARK OFFICE
CERTIFICATE OF CORRECTION

PATENT NO. : 6,072,597

DATED : June 6, 2000

INVENTOR(S) : TAKEHIRO YOSHIDA

It is certified that error appears in the above-identified patent and that said Letters Patent is hereby corrected as shown below:

[73] ASSIGNEE

"Canon Kabushiki Kaisha, Japan" should read
--Canon Kabushiki Kaisha, Tokyo, Japan--.

COLUMN 2

Line 9, "a" should be deleted; and "of" (first occurrence) should read --for--.

COLUMN 3

Line 35, "an" should read --the--.
Line 37, "an" should read --the--.

COLUMN 7

Line 52, "determined" should read --determines--.

COLUMN 12

Line 37, "In 548," should read --In S48,--.

UNITED STATES PATENT AND TRADEMARK OFFICE
CERTIFICATE OF CORRECTION

PATENT NO. : 6,072,597
DATED : June 6, 2000
INVENTOR(S) : TAKEHIRO YOSHIDA

It is certified that error appears in the above-identified patent and that said Letters Patent is hereby corrected as shown below:

COLUMN 17

Line 63, "step 5377" should read --step S377--.

COLUMN 20

Line 39, "as" should read --to be--.
Line 40, "include" should read --includes--.
Line 58, "being not" should read --not being--.

COLUMN 22

Line 29, "as" should read --in--.

COLUMN 23

Line 3, "to" should be deleted.

UNITED STATES PATENT AND TRADEMARK OFFICE
CERTIFICATE OF CORRECTION

PATENT NO. : 6,072,597
DATED : June 6, 2000
INVENTOR(S) : TAKEHIRO YOSHIDA

Page 3 of 3

It is certified that error appears in the above-identified patent and that said Letters Patent is hereby corrected as shown below:

COLUMN 24

Line 33, "a" should read --in a--.
Line 34, 'have" should read --has--.
Line 46, "ITU T" should read --ITU-T--.
Line 58, "command" should read --transmit command--.

COLUMN 26

Line 36, "nal;" should read --nal; and--.
Line 60, "have" (both occurrences) should read --has--.

Signed and Sealed this

First Day of May, 2001

NICHOLAS P. GODICI

Attest:

Attesting Officer

Acting Director of the United States Patent and Trademark Office